US006300863B1

(12) United States Patent
Cotichini et al.

(10) Patent No.: US 6,300,863 B1
(45) Date of Patent: *Oct. 9, 2001

(54) METHOD AND APPARATUS TO MONITOR AND LOCATE AN ELECTRONIC DEVICE USING A SECURED INTELLIGENT AGENT VIA A GLOBAL NETWORK

(75) Inventors: Christian Cotichini; Fraser Cain, both of Vancouver; David G. Ashworth, North Vancouver; Peter Michael Bruce Livingston, Pitt Meadows; Gabor Solymar, Stittsville, all of (CA)

(73) Assignee: Absolute Software Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/047,030

(22) Filed: Mar. 24, 1998

Related U.S. Application Data

(63) Continuation-in-part of application No. 08/871,221, filed on Jun. 9, 1997, which is a continuation-in-part of application No. 08/826,098, filed on Mar. 24, 1997, which is a continuation-in-part of application No. 08/558,432, filed on Nov. 15, 1995, now Pat. No. 5,764,892, which is a continuation-in-part of application No. 08/339,978, filed on Nov. 15, 1994, now Pat. No. 5,715,174, which is a continuation-in-part of application No. 08/558,432, which is a continuation-in-part of application No. 08/339,978.

(51) Int. Cl.[7] ....................... G06F 7/00
(52) U.S. Cl. ............ 340/5.8; 340/426; 340/539; 340/10.42; 714/45; 709/200; 709/217; 709/219

(58) Field of Search ................. 340/825.34, 426, 340/539, 10.42; 714/45; 709/200, 217, 219; 342/457

(56) References Cited

U.S. PATENT DOCUMENTS

| 5,764,892 | * | 6/1998 | Cain et al. ............. 340/825.34 |
| 5,778,367 | * | 7/1998 | Wesinger, Jr. et al. ...... 709/218 |
| 5,802,280 | * | 9/1998 | Cotichini et al. .......... 709/200 |

* cited by examiner

Primary Examiner—Brian Zimmerman
Assistant Examiner—Yves Dalencourt
(74) Attorney, Agent, or Firm—Liu & Liu LLP

(57) ABSTRACT

A system for locating and monitoring electronic devices utilizing a security system that is secretly and transparently embedded within the software, firmware, or hardware of a computer. This security system initiates the client computer to periodically and conditionally call a host system to provide unique identifying indicia and location information. In one embodiment, the security system calls the host through a public switched telephone network (PSTN) and transmits the indicia in encoded form. In an alternative embodiment, which may be incorporated concurrently with the PSTN application, the security system calls the host system through the Internet and provides the host with indicia encoded within the DNS query sent. The host system is able to identify the calling computer from the indicia and is able to physically locate the computer through either caller identification or by referencing the Internet links which were used to connect the calling computer with the host system.

94 Claims, 39 Drawing Sheets

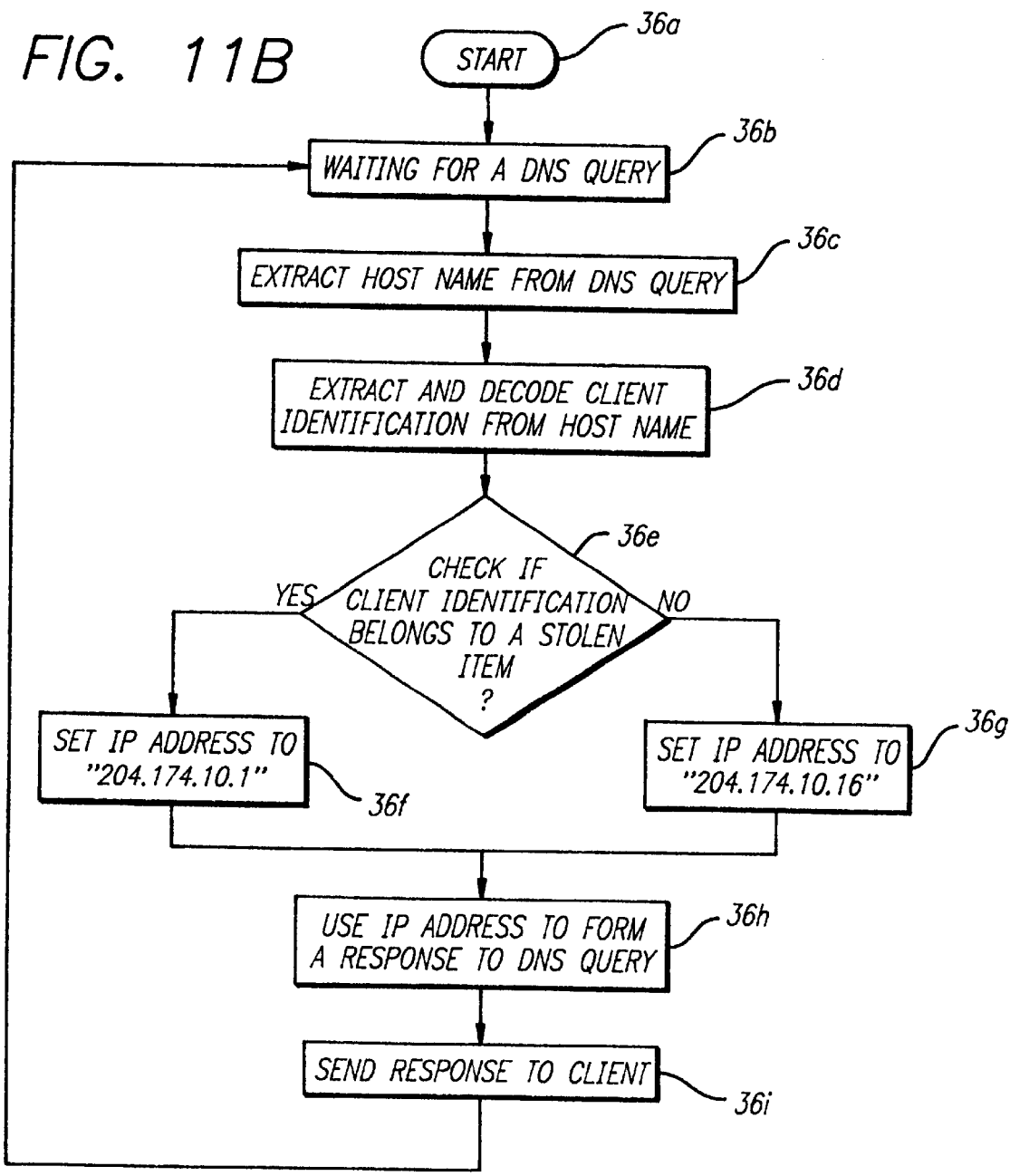

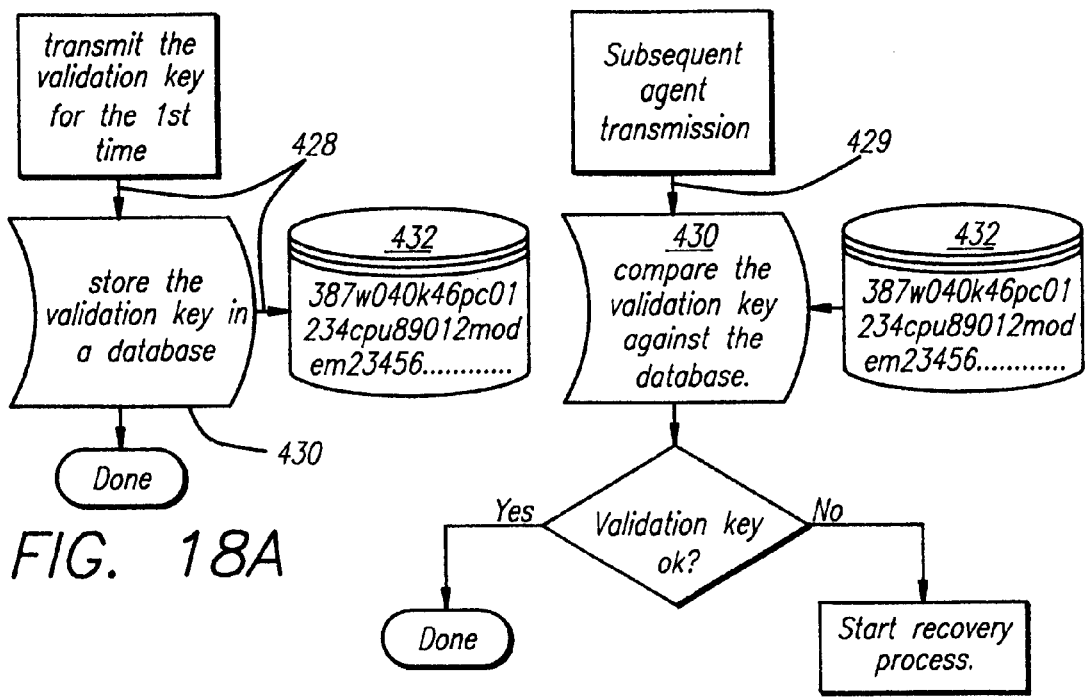
FIG. 18A
FIG. 18B
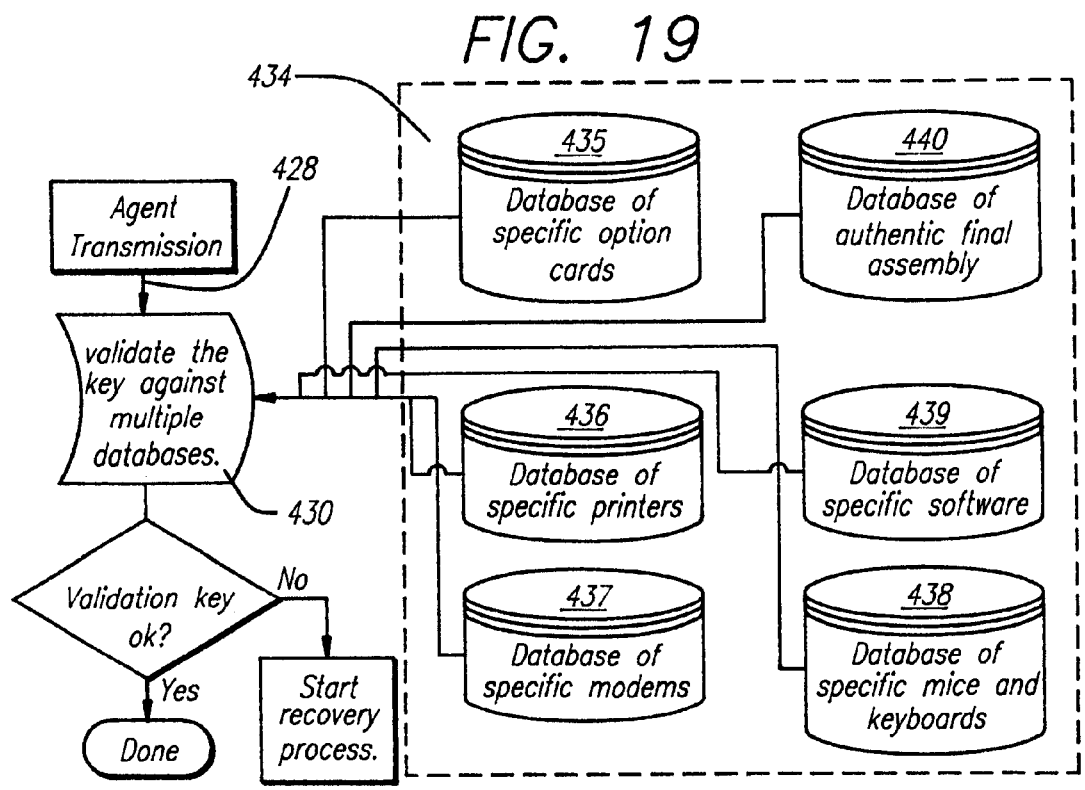
FIG. 19

METHOD AND APPARATUS TO MONITOR AND LOCATE AN ELECTRONIC DEVICE USING A SECURED INTELLIGENT AGENT VIA A GLOBAL NETWORK

RELATED APPLICATIONS

This application is a continuation-in-part application of U.S. application Ser. No. 08/826,098 filed on Mar. 24, 1997 which is a continuation-in-part application of application Ser. No. 08/558,432 filed Nov. 15, 1995 now U.S. Pat. No. 5,764,892 which is a continuation-in-part of Ser. No. 08/339,978 filed Nov. 15, 1994 now U.S. Pat. No. 5,715,174; continuation-in-part application of U.S. application Ser. No. 08/871,221 filed on Jun. 9, 1997 which is a continuation-in-part application of application Ser. No. 08/558,432 filed Nov. 15, 1995 which is a continuation-in-part of Ser. No. 08/339,978 filed Nov. 15, 1994.

BACKGROUND OF THE INVENTION

Many electronic devices, such as laptop computers and cellular telephones, are becoming more compact and portable. While such portability is extremely convenient for the user, it has given rise to an increased risk of theft. These electronic devices are often very expensive and are easily lost or stolen.

Previously, attempts have been made to provide means for retrieving lost or stolen items of various types. The simplest approach is marking the item with the name and the address of the owner, or some other identification such as a driver's license number. If the item falls into the hands of an honest person, then the owner can be located. However, this approach may not deter a thief who can remove visible markings on the device.

Password protection schemes are of dubious value in discouraging theft or retrieving an item. Although the data can be protected from theft, the computer hardware cannot be found or retrieved. Another approach has been to place a radio transmitter on the item. This has been done in the context of automobile anti-theft devices. The police or a commercial organization monitors the applicable radio frequency to try to locate a stolen vehicle. This method is not suitable for smaller items such as cellular telephones or laptop computers. First, it is inconvenient to disassemble such devices in order to attempt to install a transmitter therein. Second, there may not be any convenient space available to affix such a transmitter. Furthermore, a rather elaborate monitoring service, including directional antennas or the like, is required to trace the source of radio transmissions.

It is therefore an object of the invention to provide an improved means for tracing or locating smaller lost or stolen objects, particularly laptop computers, cellular telephones, desktop computers and other small, portable electronic devices or expensive home and office electronic equipment. It is also an object of the invention to provide an improved means for tracing such electronic devices which can be installed without disassembly or physical alteration of the devices concerned.

It is a further object of the invention to provide an improved means for locating lost or stolen items, this means being hidden from unauthorized users in order to reduce the risk of such means being disabled by the unauthorized user.

It is a still further object of the invention to provide an improved means for locating lost or stolen items which actively resist attempts to disable the means by an unauthorized user.

It is a still further object of the invention to provide an improved means for inexpensively and reliably locating lost or stolen items.

This invention also overcomes disadvantages associated with the prior art that may interfere with the operating system or running applications. This is accomplished by disposing the means for initiating communication with a host system in the firmware such as on the ROM BIOS or the modem component of a client electronic device. This security system operates independently of the operating system running on the electronic device.

In addition, a feature whereby the security system transmits through the Internet is disclosed. This feature enables the security system to initiate a call to the host monitoring system even when the client is simultaneously running a different Internet application. This represents an advantage over the prior art including co-pending Continuation-in-Part Application (Ser. No. 08/558,432), which is hereby incorporated by reference, which could not transmit while an application was using the modem since interference could alert the user to the presence of the security system. This security system operates independently of the operating system running on the electronic device.

SUMMARY OF THE INVENTION

This invention relates to a security apparatus and method for retrieving lost or stolen electronic devices such as portable computers, PCs (including stolen components such as CPU, hard drives, etc.), cablevision devices, personal digital assistants (PDAs), cellular telephones, etc. This invention enables electronic devices to be surveyed or monitored by implanting thereon an intelligent agent with a pre-defined task set. This agent communicates with a pre-selected host monitoring system which is capable of multiple services including; tracing location, providing identifying indicia such as an electronic serial number (ESN), and electronically notifying the end user/owner of its location. The agent hides within the software/firmware/hardware of the electronic device, and operates without interfering with the regular operation of the device. According to one embodiment of the invention, the Agent is disposed on the ROM BIOS of the electronic device and the Agent takes control of the electronic device and its facilities during its boot-up. According to another embodiment of the invention, the Agent is disposed on the modem component of the electronic device and the Agent operates independently of the electronic device. Another embodiment of the Agent is on the processing unit (e.g., microprocessor) of the electronic device. Yet another embodiment of the Agent is a hardware implementation, such as hard-wired circuitry or a single integrated circuit. The Agent is further designed to evade detection and resist attempts to disable it by an unauthorized user.

The invention overcomes disadvantages associated with the prior art by yielding a security device for small computers, cellular telephones and the like which can be programmed as firmware onto the non-volatile memory (such as ROM BIOS, ROM, Flash ROM, EPROM, EEPROM or the like) of such devices. Accordingly, no physical alteration is necessary or apparent to a thief. The existence of the security device is well cloaked and thus it cannot be readily located or disabled even if the possibility of its existence is suspected. Apparatuses and methods according to the invention can be very cost effective, requiring relatively inexpensive modifications to software or hardware and operation of relatively few monitoring devices.

According to one aspect of the invention there is provided an electronic device with an integral security system. The security system includes means for sending signals to a remote station at spaced apart intervals of time. The signals include identifying indicia for the electronic device. The means for sending signals includes a telecommunications interface connectable to a telecommunications system, and means for dialing a preselected telecommunications number. In an alternative embodiment, signals are sent through a global network interface. This can be accomplished via the standard public telecommunications system which may be linked to a global network service provider, or through a private network (LAN) link to the global network. The remote station includes a telecommunications receiver having the preselected telecommunications number. The remote station and the electronic device may also simultaneously be connected through the global network.

In one embodiment of the invention the electronic device is a computer, and the means for sending signals includes means for providing signals to the telecommunication interface to dial a preselected telecommunication number and send the identifying indicia. The telecommunication interface may be a modem. The means for providing signals may include security software installed as a firmware onto the non-volatile memory (such as ROM BIOS, ROM, Flash ROM, EPROM, EEPROM, or the like) of the computer, a software program, a micro-code program, a digital signal processor ("DSP") program or a built-in function of the operating system.

The security system may be recorded on the boot sector of a hard disk, on a hidden system file such as IO.SYS, MSDOS.SYS, IBMBIO.COM or IBMDOS.COM, or alternatively on the ROM BIOS of the computer, or a combination of both. The security system functions without interfering with the operating system or any running applications. The security system is loaded into memory whenever the electronic device is powered on or reset. It is loaded before the operating system. Alternatively, the security system may be recorded on the Flash ROM of the modem component of the electronic device. The security system functions independently of the main processor of the electronic device. Consequently, the security system as provided in either the ROM BIOS or the modem Flash ROM is operating system independent.

The Agent may be implemented in the firmware or software of any electronic device, such as a computer. Alternatively, the Agent may be implemented in any component of a computer, as with an electronic component such as the DSP in a modem or the CPU in the computer. Furthermore, the functionality of the Agent may be implemented in the circuitry of any hardware device capable of establishing a communication link through sending and receiving packets of data.

There is provided according to another aspect of the invention a method for tracing lost or stolen electronic devices whereby a telecommunications interface is connectable to a telecommunications system at a first telecommunications station. The method includes providing the electronic device with means for sending signals to the telecommunications interface. The means is instructed by the agent to send first signals to the telecommunications interface that then calls a remote telecommunications station. These first signals contain the encoded identification (serial number) of the sending computer. Upon detecting an incoming signal, the remote computer determines the identification of the sending computer by decoding its serial number, and can retrieve the caller phone number from the Telephone Company. The remote computer compares the serial number with a predefined listing of serial numbers of reported lost or stolen computers. The call will only be answered if the sending computer is on the predefined list. In an alternative embodiment, this call filtering feature can be removed and the remote computer will answer all incoming calls.

In an alternative embodiment, if the remote computer answer the incoming call then the means for sending signals automatically sends second signals to the telecommunications interface. The telecommunications interface then transmits identifying indicia for the device as well as any other pertinent information to the remote telecommunications station.

There is provided according to another aspect of the invention a method for tracing lost or stolen electronic articles through a global network such as the Internet. The client computer sends DNS queries that contain encoded identification information to a remote station through the Internet. The remote station receives the queries and decodes the encoded identification information in order to determine if the client computer matches an entry on a list of reported lost or stolen computers. If so, the host sends a predefined response to the client computer indicating that it should initiate a traceroute to provide the host with the Internet communication links connecting the client computer to the host. Additionally, when the client computer receives this predefined response from the host it immediately attempts to contact the host via the telecommunications system.

BRIEF DESCRIPTION OF THE DRAWINGS

These and other objects and advantages will become apparent by reference to the following detailed description and accompanying drawings, in which:

FIGS. 3-1 and 3-2 is an illustrative embodiment in the form of a flowchart of the process by which the operating system and agent are able to start up and run simultaneously.

FIG. 4A-1 and 4A-2 is an illustrative embodiment in the form of a flowchart showing the Agent's work cycle according to an embodiment of the invention.

FIG. 11B is an illustrative embodiment in the form of a flowchart of a process by which the host Internet monitoring subsystem exchanges data with an agent.

FIG. 11C is an illustration of a manner in which the client identification is encoded within the host name according to one aspect of the invention.

FIG. 18A is a high level diagram showing the elements and steps of creating and storing a validation key the first time.

FIG. 18B is a high level diagram showing the elements and steps of creating and checking a validation key.

FIG. 19 is a high level diagram showing the elements and steps of creating and checking a validation key against stored databases.

DESCRIPTION OF THE PREFERRED EMBODIMENTS

System Overview

Figure 1:
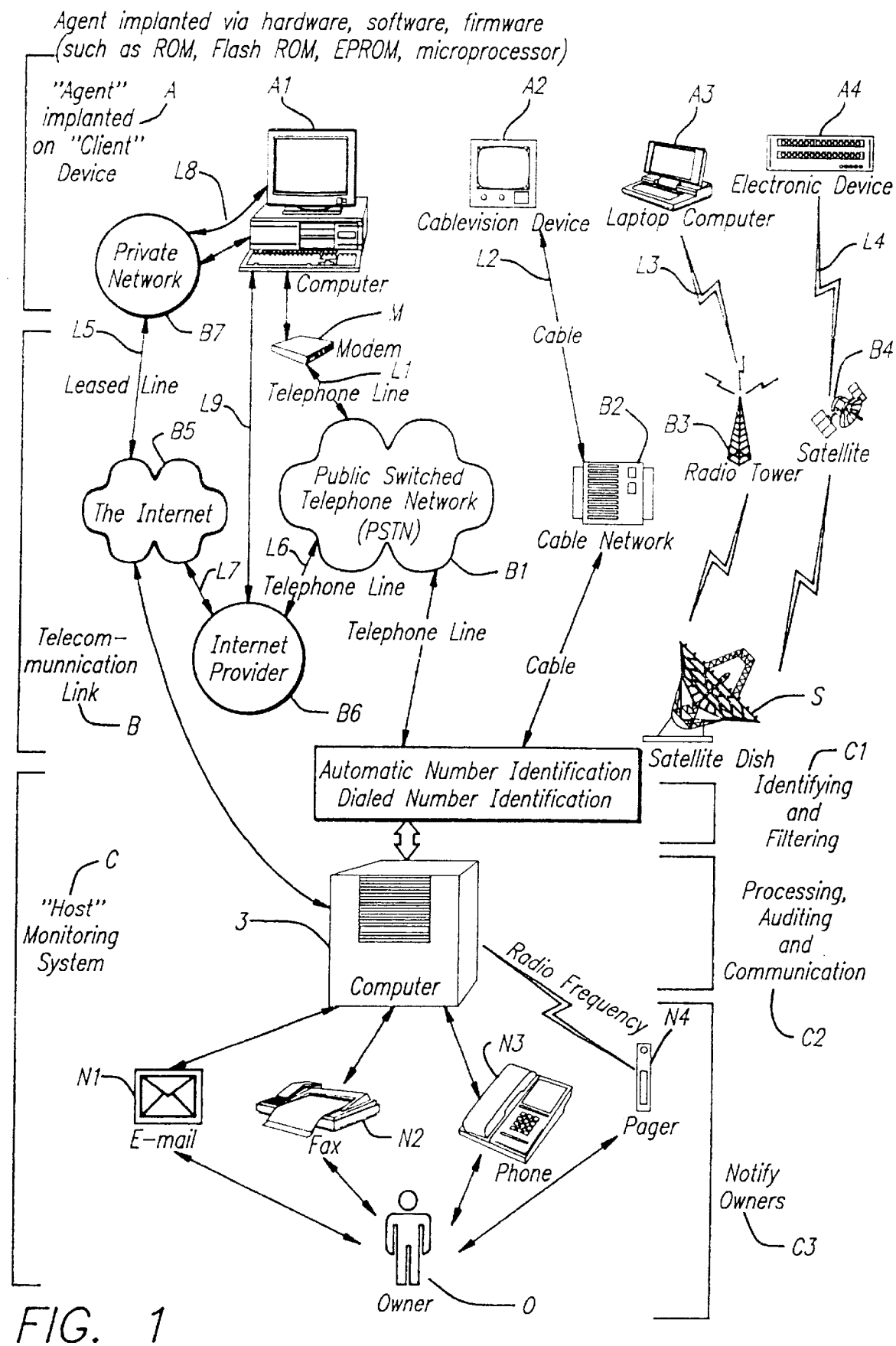
FIG. 1 is a functional block diagram of a preferred embodiment of the electronic article surveillance system in accordance with the teachings of this invention.

Referring to FIG. 1, the preferred embodiment of the electronic article surveillance system is comprised of three main components: (1) client device A consisting of any one of the electronic devices shown which have been implanted with the agent; (2) A telecommunication link B such as a switched communications system, the Internet, radio tower, satellite and cable networks; and (3) The host monitoring system C which controls the communications between the client device A and the host monitoring system C.

Referring to FIG. 1, the client device can be a cablevision device A2, laptop computer A3, or other type of electronic device A4 including a cellular telephone or personal digital assistant (PDA). However, for illustrative purposes, the client device consists of a client computer A1 attached to modem M. The host monitoring system C sends and receives data packets from the client computer A1 over a suitable bi-directional transmission medium, such as a common telephone line L1. Telephone line L1 couples the client computer A1 to the host monitoring system C and the host computer 3 through Public Switched Telephone Network B1 (Telephone Company). The host computer 3 notifies the appropriate parties C3 (owner O, law enforcement agency, or monitoring company) of the status of the client device A via suitable communication means such as electronic mail N1, fax N2, telephone N3 or pager N4. Host monitoring system C also identifies and can filter incoming calls C1, and provide processing, auditing and communication functions C2.

In another embodiment of the invention cablevision device A is connected to cablevision network B2 via cable L2. This cable L2 further connects cablevision network B2 to the host monitoring system C.

In another embodiment of the invention laptop computer A3 is connected to radio tower B3 via radio frequency (RF) transmissions L3. These RF transmissions are received by satellite dish S at the host monitoring system C.

In another embodiment of the invention electronic device A4 is connected to satellite B4 via microwave signal L4. Microwave signal L4 further connects satellite B4 to satellite dish S at the host monitoring system C.

In yet another embodiment of the invention client computer A1 is connected to private network (such as a LAN) B7 which is connected to a global network such as the Internet B5 via leased line L5. The connection between client computer A1 and private network B7 can be provided through wireless connection L8. Leased lines L5 and L7 can, according to one embodiment of the invention, transmit data to and from client computer A1 digitally. Host computer 3 is also connected to the Internet B5. In an alternative embodiment of this global network or Internet application, client computer A1 can alternatively, or simultaneously, be coupled to the Internet B5 through modem M which connects client computer A1 to telephone line L1. Telephone line L1 connects to Public Switch Telephone Network (PSTN) B1 which provides access to Internet provider B6 (such as AOL, Netcom, etc.) via telephone line L6. Internet provider B6 provides access to Internet B5 via leased line L7. Alternatively, client computer A1 may be linked directly to Internet provider B6 via wireless communication link L9. Although this aspect of the invention is described in the context of the Internet, it will be understood by one of ordinary skill in the art that the application of this invention to any currently existing of future global network is contemplated herein. Further, although the Internet aspect of this invention is described and illustrated with respect to client computer A1 it should be understood that the Internet application is readily applicable to the other described devices (including laptop computers, cablevision networks, cellular telephones, personal digital assistants, and other electronic devices).

Figure 2:
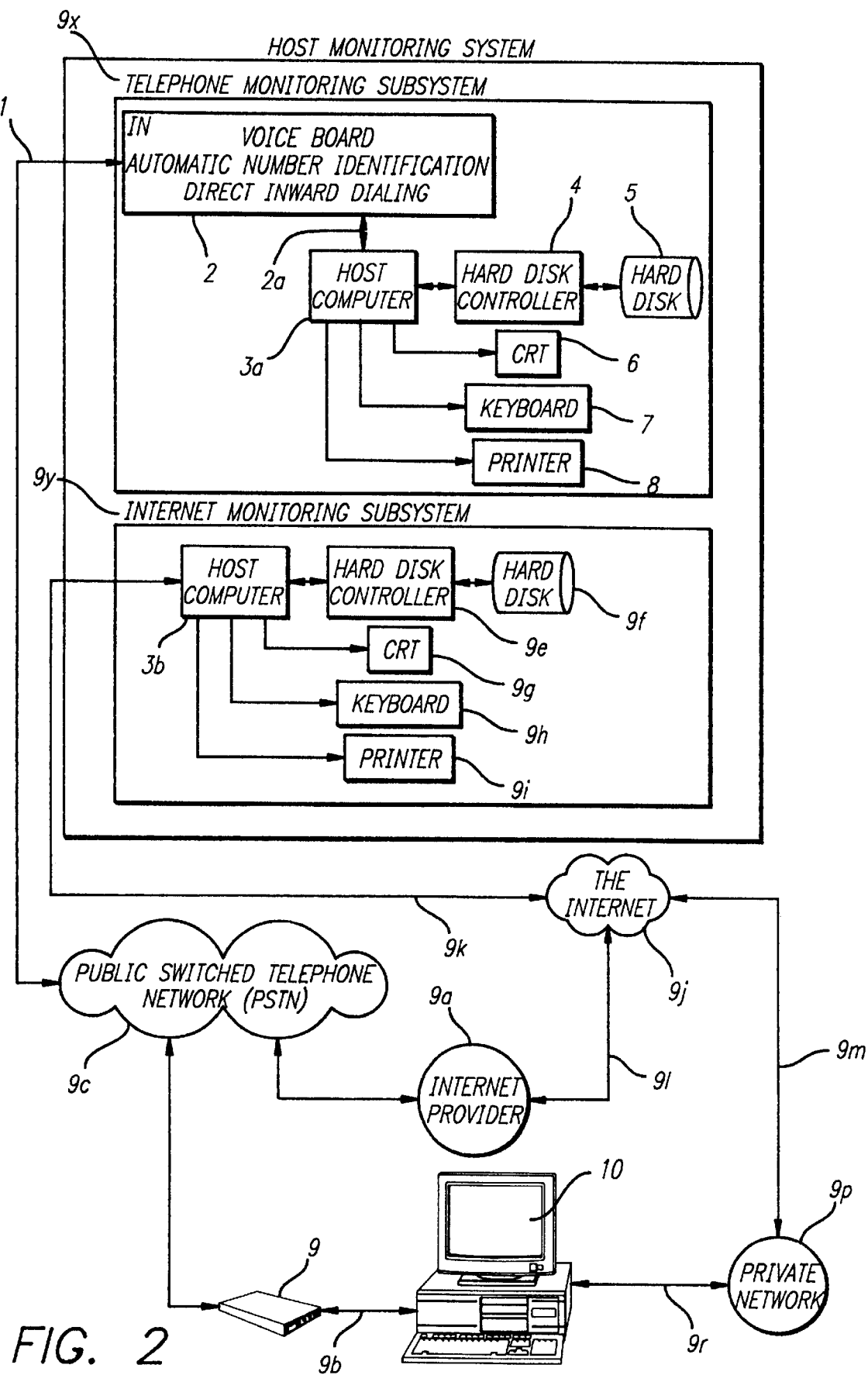
FIG. 2 is a simplified illustration of the functional block diagram of FIG. 1 for the purpose of showing an illustrative embodiment of the present invention.

Referring to FIG. 2, the host monitoring system C has two monitoring subsystems: telephone monitoring subsystem 9x and Internet monitoring subsystem 9y. Telephone monitoring subsystem 9x monitors information transmitted via telephone line 1 from client computer 10 which has an agent installed thereon. Internet monitoring subsystem 9y monitors information transmitted via the Internet 9j from client computers 10 which have agents installed thereon.

Telephone monitoring subsystem 9x includes voice board 2, host computer 3a, hard disk controller 4, hard disk 5, CRT 6, keyboard 7, and printer 8. Host computer 3a is coupled to a suitable display device, such as CRT 6, keyboard 7, and printer 8. The keyboard 7 permits the operator to interact with the host monitoring system C. For example, the operator may use keyboard 7 to enter commands to print out a log file of the clients that have called into the system. The host computer 3a illustratively takes the form of an IBM personal computer. The source codes for the host monitoring system C, in Visual C++ by Microsoft, are disclosed in copending application Ser. Nos. 08/826,098 and 08/558,432 and are incorporated herein by reference.

Telephone line 1 is connected to the host computer 3a by a voice board 2 which is adapted to receive and recognize the audible tones of both caller ID and dialed numbers transmitted via the telephone line 1. Client computer 10 is connected to modem 9 via serial ports 9b. Host computer 3a is connected to voice board 2 via data bus 2a. The modem 9 and voice board 2 are connected to telephone line 1 which is routed through Public Switched Telephone Network (PSTN) 9c in accordance with a conventional telephone system. Client computer 10 and modem 9 form a first telecommunication station, while computer 3 and voice board 2 form a second, or remote telecommunications system. The host monitoring system C sends and receives data packets from client computer 10.

Ring signals are received on phone line 1 as an input to voice board 2. In an illustrative embodiment of the invention, voice board 2 may take the form of the DID/120, DTI/211, and D/12X voice boards manufactured by Dialogic Corporation. The voice board 2 is operative to recognize the ring signal. Then it receives the caller ID and dialed numbers and converts them into corresponding digital signals. As explained in greater detail below, in one embodiment of the invention, the dialed numbers provide in encoded form the unique serial number of the client computer. Host computer 3a decodes the encoded serial number for comparison against a list of reported lost and stolen computers stored in hard disk 5.

In an illustrative embodiment of the invention, the hard disk controller 4 may comprise memory control boards manufactured by Seagate Tech under the designation Hard Disk Controller. The hard disk controller 4 is particularly suitable to control the illustrative embodiment of the hard disk memory 5 manufactured by Seagate Tech under their designation ST-251.

Similarly, the Internet monitoring subsystem 9y is comprised of a host computer 3b, hard disk controller 9e, hard disk 9f, CRT 9g, keyboard 9h, and printer 9i. The host computer 3b is coupled to a suitable display device such as CRT monitor 9g, keyboard 9h, or printer 9i.

Leased line 9k connects host computer 3b to the Internet 9j. Client computer 10 is connected to modem 9 via serial port 9b. Modem 9 and host computer 3b may be connected to the Internet 9j by an Internet provider 9o which uses a communication link such as Serial Line Interface Protocol (SLIP), or Point to Point Protocol (PPP). Alternatively, or simultaneously, client computer 10 may be connected to the Internet 9j through private network (LAN) 9p having gateway to the Internet or the equivalent. In alternative embodiment, client computer 10 may be linked to Internet provider 9o and private network 9p via wireless links L9 and L8 respectively. For illustrative purposes, the communication link is a SLIP link. The Internet monitoring subsystem 9y sends and receives data packets from client computer 10 over the Internet 9j.

Domain Name Service (DNS) queries from the agent that are transmitted through the Internet 9j are received as input to the host computer 3b. Host computer 3b extracts the host name from the DNS query, and then extracts and decodes the agent identification (serial number) from this host name. Host Internet monitoring computer 3b uses the decoded agent identification for comparison against a list of reported lost and stolen computers stored in hard disk 9f. The Internet and DNS queries are discussed in more detail below.

According to one embodiment of the invention, the unique identification associated with each electronic device can be an Electronic Serial Number (ESN). These ESN codes can comprise a string of alphanumeric characters that can be encrypted and encoded. The ESN can be generated randomly by a central delegating body to assure that each electronic device has an ESN that is unique. The ESN can be permanently associated with an agent security system to enable the unique identification of the electronic device in which the agent is installed.

The agent is a software program such as a terminated stay resident program, VXD (Virtual Device driver program), application program (such as Windows service or Windows NT service), or a file filter program. The Agent is installed on hardware, software, or firmware. Some alternative methods of installation are described in co-pending U.S. application Ser. No. 08/558,432 which is hereby incorporated by reference. Once the Agent is installed it will report its identity and its location to the host after specified periods of time have elapsed, and upon the occurrence of certain predeterminedconditions. This is further illustrated in co-pending U.S. application Ser. No. 08/558,432.

Referring now to FIG. 2, once the Agent is installed and running it will periodically (every four hours) report its identity and location on the Internet 9j to the Internet monitoring subsystem 9y. The Agent can also concurrently report its identity and location to the telephone monitoring subsystem 9x through PSTN 9c after specified periods have elapsed, and upon the occurrence of certain pre-determined conditions.

Internet and DNS Queries

The Internet is a collection of networks linked together by IP routers and high-speed digital links. Computers which have access to one of these networks can run Internet applications to send and retrieve digitally recorded files such as audio and video files. Some of the popular Internet applications are Netscape (used to surf the web), Eudora (for e-mail), Telnet (for logging on to another computer, ping (Internet utility for checking the status of a particular machine). These Internet applications can be run simultaneously. Thus, a computer can be running client programs such as Eudora and Netscape and at the same time operate as an FTP Server (File Transfer) for other clients that want to transfer files. The applications share the same communications links to the Internet and computer resources (CPU and memory). Thus, multiple applications can simultaneously run without interfering with each other. There is, however, a resultant diminishing effect on performance. The agent of the instant invention would have virtually no effect on the performance of other applications since it transmits such a small data packet.

Each computer linked to the Internet has a unique Internet host name/IP address. Computer networks comprising one or more of these computers are also given names to form a hierarchical naming structure. For instance, the web site for IBM is "www.ibm.com." The prefix "www" is the name of the computer (server) which is attached to the ibm.com network. Addresses could be coded using numbers, but this would make administration of the Internet extremely difficult. Instead, a method providing for the mapping of Internet host names to network addresses was implemented. This mapping system is the Domain Name System (DNS). It is a distributed, hierarchical administrative system. At the top of the hierarchy is the root domain containing the top-level domains (com, edu, net, ca, us, etc.). At the bottom end is a domain name such as cs.berkeley.edu. which corresponds to the computer science department of the University of California at Berkeley. Each domain has more than one authoritative server that can map its Internet host name to its IP (numerical) address.

If a user wants to access the site at www.psmith.cs.berkeley.edu from the address pliving.absolute.com, the user would first input www.psmith.cs.berkeley.edu. into his web browser. The web browser would then send a DNS query to the absolute.com authoritative server to determine if the desired address had been recently resolved (DNS resolutions are cached to enhance the performance of the DNS system). If the absolute.com DNS server cannot resolve this address, then the next DNS server up the chain is checked (the DNS server at the "com" level). If that higher level server also cannot resolve the address, then the root server directs the process down the chain to the top-level "edu" DNS server. If the "edu" DNS server cannot resolve the address, then the DNS server at berkeley.edu is contacted. Ultimately, a DNS server is found that can determine the appropriate IP address based on the Internet host name. The IP address is provided to the web browser to enable communication with www.p-smith.cs.berkeley.edu.

Once the desired IP address has been determined, packets of data can be sent across the Internet through IP routers. These IP routers can read the numerical addresses and determine where to send each packet. Each IP router has a unique IP address. Typically, several IP routers need to be contacted to link a user with his desired Internet site. As explained in more detail below, the traceroute routine provides a listing of all IP routers used to enable communication between a client and host.

Functions of the Agent

The Agent may be implemented in the firmware or software of any electronic device, such as a computer. Alternatively, the Agent may be implemented in any component of a computer, as with an electronic component such as the DSP in a modem or the CPU in the computer. Furthermore, the functionality of the Agent may t implemented in the circuitry of any hardware device capable of establishing a communication link through sending and/or receiving packets of data.

One of the important functions of the agent is to contact the host monitoring system C to report the identity, location, and other information relating to its associated client computer 10. The agent has to determine the appropriate time for it to call the host monitoring system C. The agent can contact the host monitoring system C through the PSTN 9c connecting to the telephone monitoring subsystem 9x, or through the Internet 9j which connects the Internet monitoring subsystem 9y. Thus, the agent can communicate with a host monitoring system C using either the Internet or the PSTN techniques. Alternatively, the agent may rely concurrently on both techniques.

Figures 1, 3:
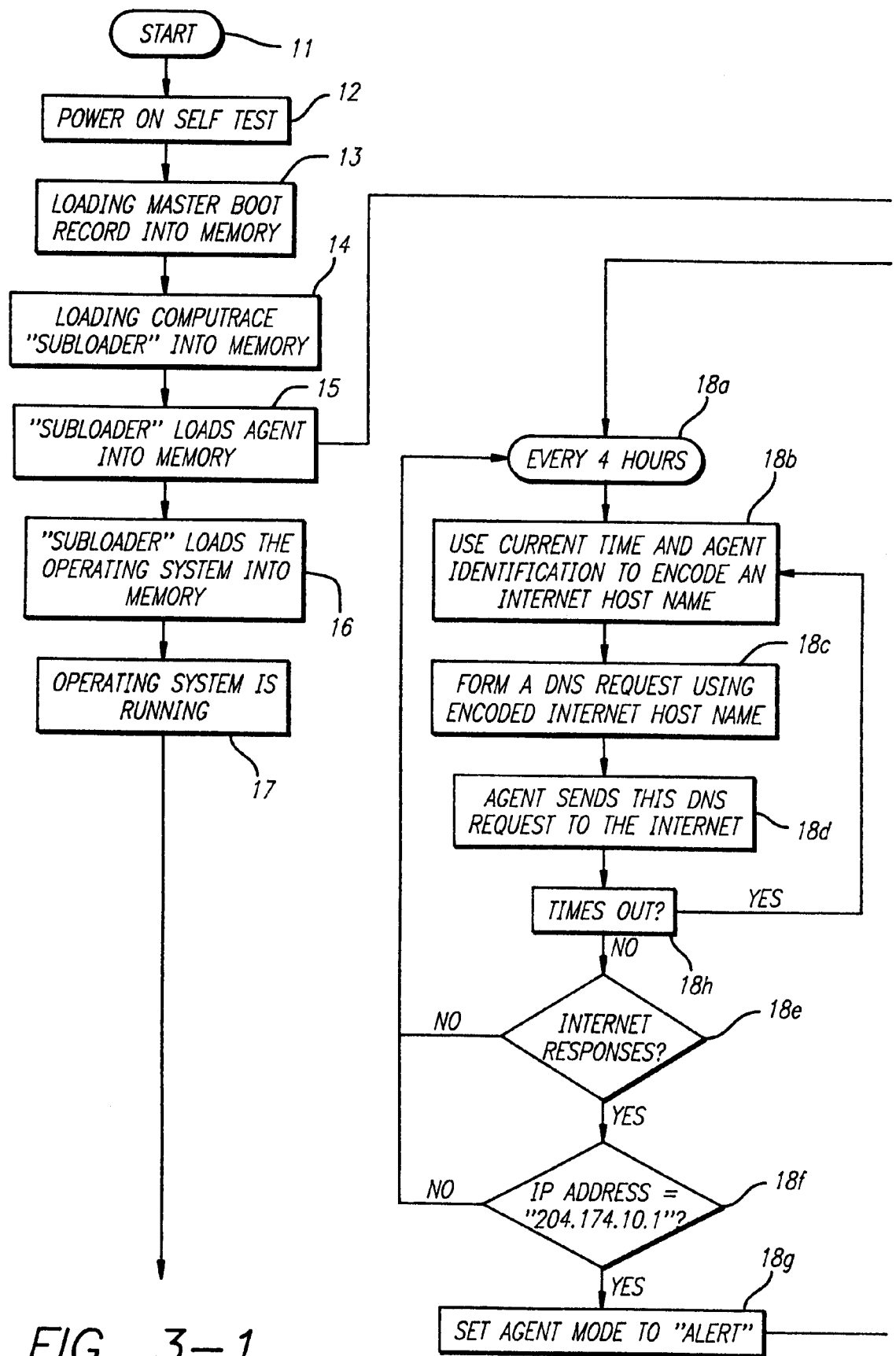
Figures 2, 3:
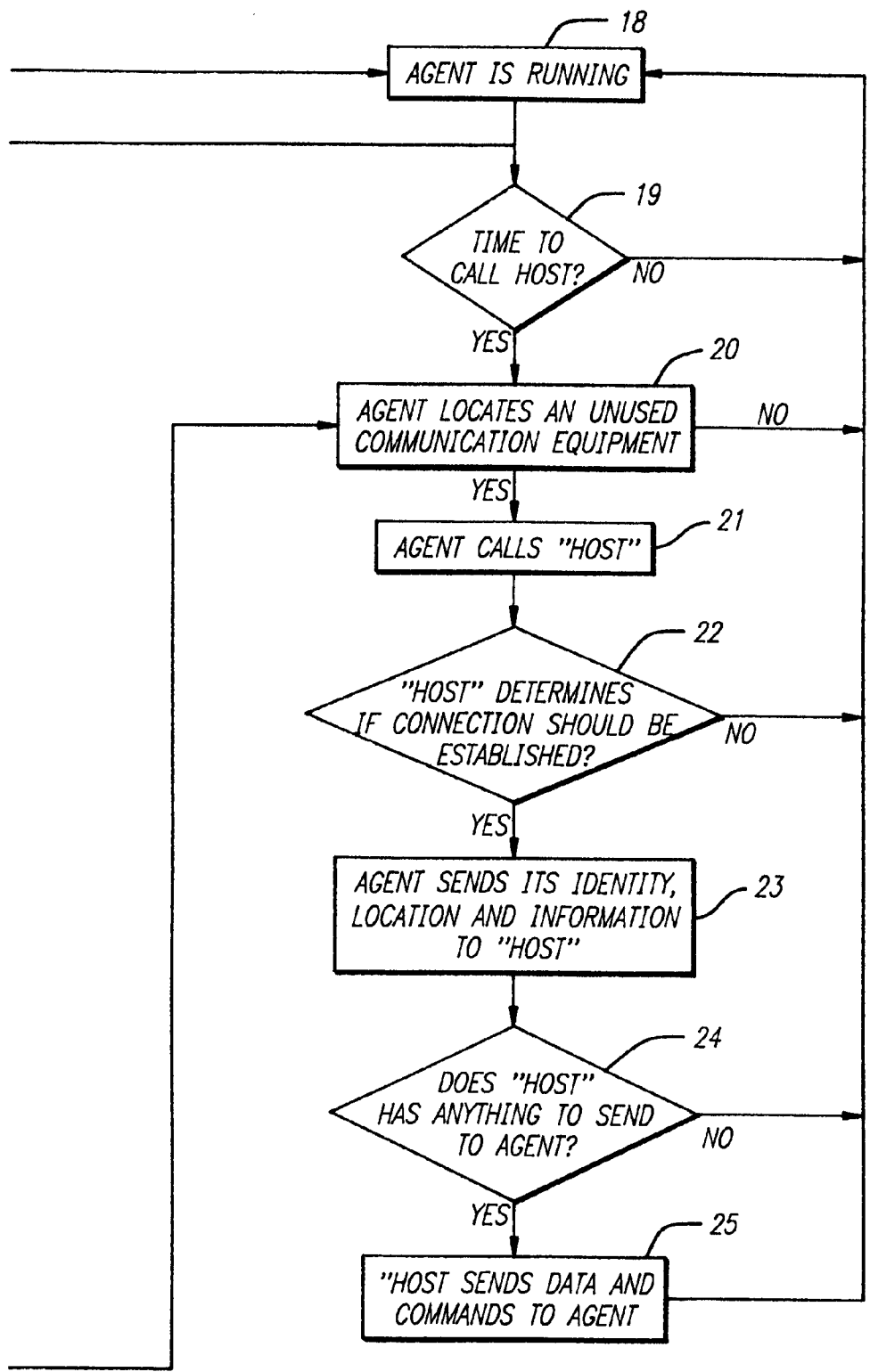

FIGS. 3-1 and 3-2 is a flow chart of the agent work cycle. This work cycle describes the method by which the Agent is loaded when the client computer 10 is initially turned on or reset, and the manner in which the operating system and the agent run concurrently. In this illustrative embodiment, the Agent is embedded in software. Once the client computer 10 is powered on 11, it performs a power on self-test (POST) 12. The POST tests the system hardware, initializes some of the devices for operation, and loads the master boot record (MBR) 13. Since the MBR was installed with an Agent subloader, the subloader is loaded into memory 14 and executed. The subloader's first task is to load the Agent into memory 15 (which is discussed in detail below in reference to FIG. 5.) Then the subloader loads the operating system (OS) into memory 16 and returns control to the operating system. Now both the operating system 17 and the Agent 18 are running simultaneously.

a. PSTN

In the PSTN application, once the Agent is running 18, it will determine the appropriate time to call the host 19. The time period in which the Agent is waiting for the appropriate time to call the host is the "active" period. The Agent will only call the host when a pre-defined time period has elapsed, or when a pre-determined event has occurred which triggers the client to contact the host. Every one-eighteenth of second the Agent compares the current date and time with the date and time that the Agent is due to call the host. If the Agent determines that it is time to call the host it will transfer to "alert" mode.

In alert mode the Agent will attempt to call the host eighteen times per second until it is successful. Once in alert mode, the Agent does a thorough search within the computer to find free (not currently being used by any running application) communication equipment 20. In an illustrative embodiment, the communication equipment comprises a modem 9. It is contemplated herein that different communication mechanisms (i.e., modem, satellite link, RF link, etc.) can be provided at several of the communication ports. In such a scenario, the Agent would poll the communication ports (corresponding to the different communication mechanisms) to find free communication equipment. If the Agent fails to find any free equipment, then the Agent will abort its attempt to call the host and repeat the cycle 18 within one-eighteenth of a second. However if the Agent locates free communication equipment, it will call the host 21. Upon receiving a call from the client computer 10, the host examines the Agent identity, which according to the preferred embodiment is the serial number of the client computer, and determines if a connection should be established 22. The host establishes a connection when the serial number of the computer contacting the host matches an entry on a list of reported lost or stolen computers. In an alternative embodiment, this call-filtering feature is eliminated and the host system establishes a connection whenever there is an incoming call. The list of reported lost or stolen computers is maintained within the host monitoring system C. If the host does not accept the call then the Agent will not call back until the next appropriate time (after predetermined time period has elapsed) 18. If the host accepts the call, then the Agent will send the host its encoded identity (such as its ESN), location (caller ID), any relevant serial numbers of computer components, such as CPU, hard drive, BIOS and any other desktop management interface (DMI) and any other pertinent information such as local date and time 23. The Agent then checks if the host has any data or commands for the client 24. If the host has no data or commands to be sent, then the Agent will terminate the call and repeat the cycle 18. Otherwise, the host will send the data or commands 25 before it terminates the call, and returns to "active" mode 18. This work cycle is described in much greater detail below with reference to FIGS. 14E, 14F and 14G.

In the Internet application, which can run alone or concurrently with the PSTN application, the Agent initiates a call to the host at relatively short predetermined intervals. According to the preferred embodiment, in its "active" mode the Agent calls the host every four hours 18a. The Agent uses the current time and the unique Agent identification to encode an Internet host name 18b. The Agent then forms a DNS request using the encoded Internet host name 18c. The Agent sends this DNS request to the host through the Internet 18d. If the agent's attempt to send the DNS request to the Internet times out 18h after a predetermined time period has elapsed, the Agent will sleep for one minute and then repeat the cycle from step 18b. If the call fails due to another error (such as the absence of Winsock facilities which enable communication with the Internet, and/or the failure of the computer to be configured for TCP/IP communication) 18e then the Agent will repeat the cycle four hours later 18a. In this way, the Agent inherently checks for the existence of an Internet connection.

After sending its DNS request, the Agent waits for a response. Upon receiving a valid response from the host 18e, the IP address is extracted from the response and compared against a reference IP address 18f. In this illustrative embodiment of the invention the reference IP address is "204.174.10.1". If the IP address equals "204.174.10.1" then the agent's mode is changed from "active" to "alert" on the Internet side 18g. The host will send this reference IP address only when it has determined that the Agent identification matches one of the entries on a list of reported lost or stolen computers stored at the host. If the IP address extracted from the host response does not equal "204.174.10.1" then the Agent remains in active mode and does not call the host for another four hours.

As will be explained in more detail below, when the Agent goes into "alert" mode in the Internet application, the Agent initiates a traceroute routine which provides the host with the Internet communication links that were used to connect the client computer to the host. These Internet communication links will assist the host system in tracking the client computer. The IP address of the source of the DNS query is sent to the host within the DNS query. However, if the source of the query is transmitted through a "proxy" server, then the IP address of the client computer (which may not be unique since it may not have been assigned by the InterNIC) will likely be insufficient to track the location of the client computer. In such a scenario, it is necessary to determine the addresses of other IP routers that were accessed to enable communication between the client and the host. These addresses and the times that they were accessed are compared with internal logs of the proxy server that record its clients' Internet access history. In this way, the client can be uniquely identified and located. Additionally, the transfer of the Internet application into "alert" mode is a condition that triggers the transfer of the PSTN application to "alert" mode.

The system remains transparent to an unauthorized user via implementation of well-known deflection methods. Attempts to read or write to the location where the Agent has been installed are deflected in order to prevent discovery of the agent. When read attempts are made to the Agent location the system generate meaningless bytes of data to be returned to the user. When writ attempts are made to the location where the Agent is installed, the client computer accepts the input data and informs the user that the write has been successful. However, the data is not really stored, and thus the Agent is preserved. The Agent, in order to remain hidden to the user, will not interfere with any running applications unless designed to interfere.

Detailed Operation of Agent Work Cycle

Figure 5:
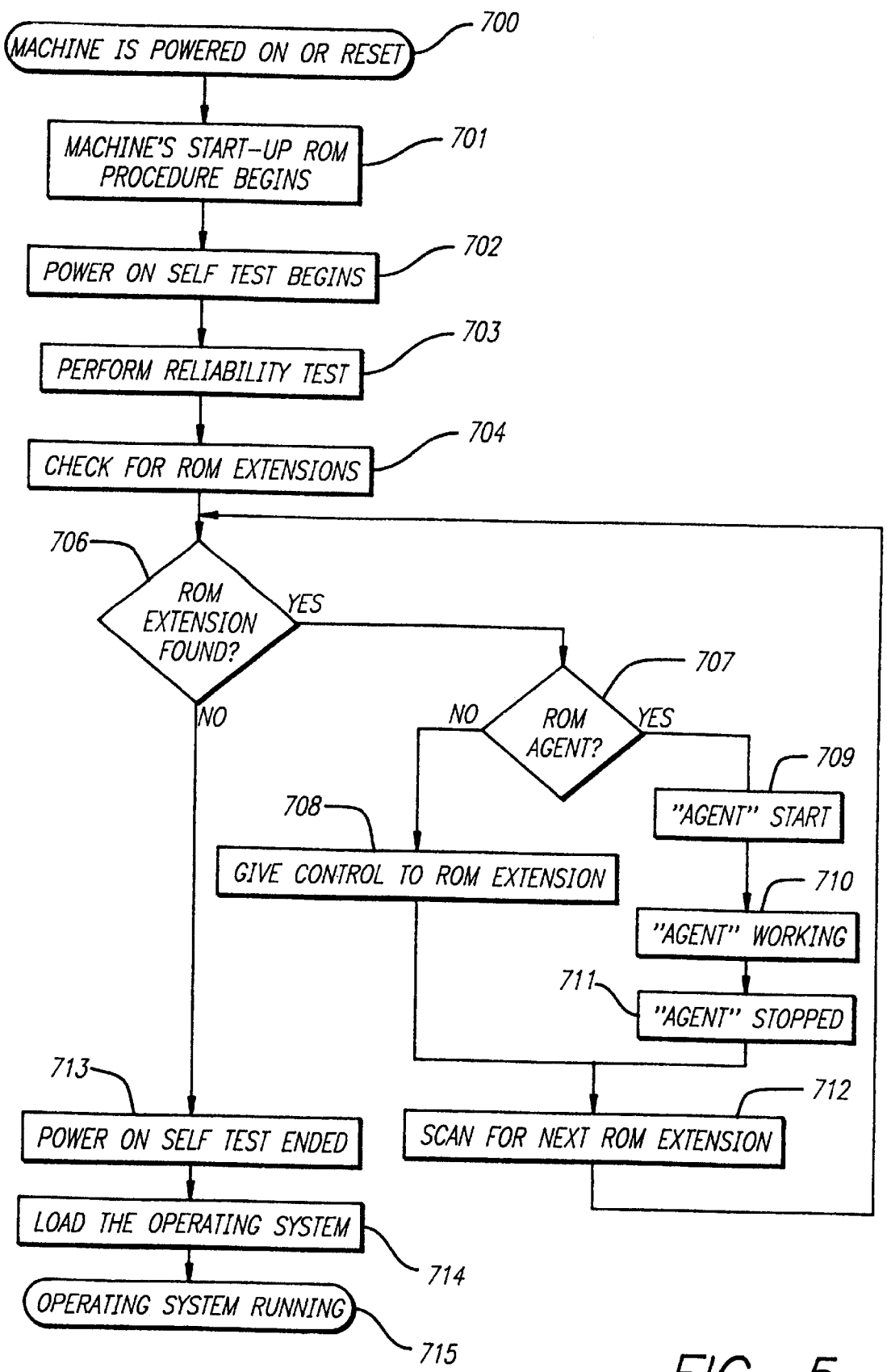
FIG. 5 is an illustrative embodiment in the form of a flowchart showing the Agent startup loading sequence.

Referring to FIG. 5, the Agent startup and loading sequence is described. The computer 10 is powered on and the loading sequence begins 700. As is well known in the art, the machine's start-up ROM procedure 701 in the computer 10 begins when the power is turned on. This process supervises the booting up and loading of the operating system of the computer. It performs the power-on self-test (POST) 702, in fact POST is carried out on every reset of the system, including the time when the power is first turned on. This test has two purposes: it performs a quick test 703 of the basic elements of the system; and it initializes the major hardware components for use. POST tests all of the ROMs on the system board by performing a checksum. This test adds together all of the bytes in the ROM module. As is does the addition, it discards any carry from the 8-bit result. If the final result is zero, the ROM passes the test. The initialization is done immediately after POST, it checks for new equipment and extensions to ROM 704. If it finds any 706, it momentarily turns control over to the ROM extensions so that they can initialize themselves. By design, the ROM Agent is a ROM extension, therefore its initialization routine will receive control 707 from the computer during the machine's start-up ROM procedure.

Once activated the Agent takes control of the whole computer 708. If it determines that it should call the Host computer, it follows the processes described in reference to FIGS. 4A-1, 4A-2, 4B and 4C. Basically, it finds a free communication port, establishes a communication link to the Host, sends its identity then relinquishes control back to the machine's start-up ROM procedure. After POST ended 713, the machine's start-up ROM procedure loads the operating system from disk 714, and passes control to it 715.

Figures 1, 4A:
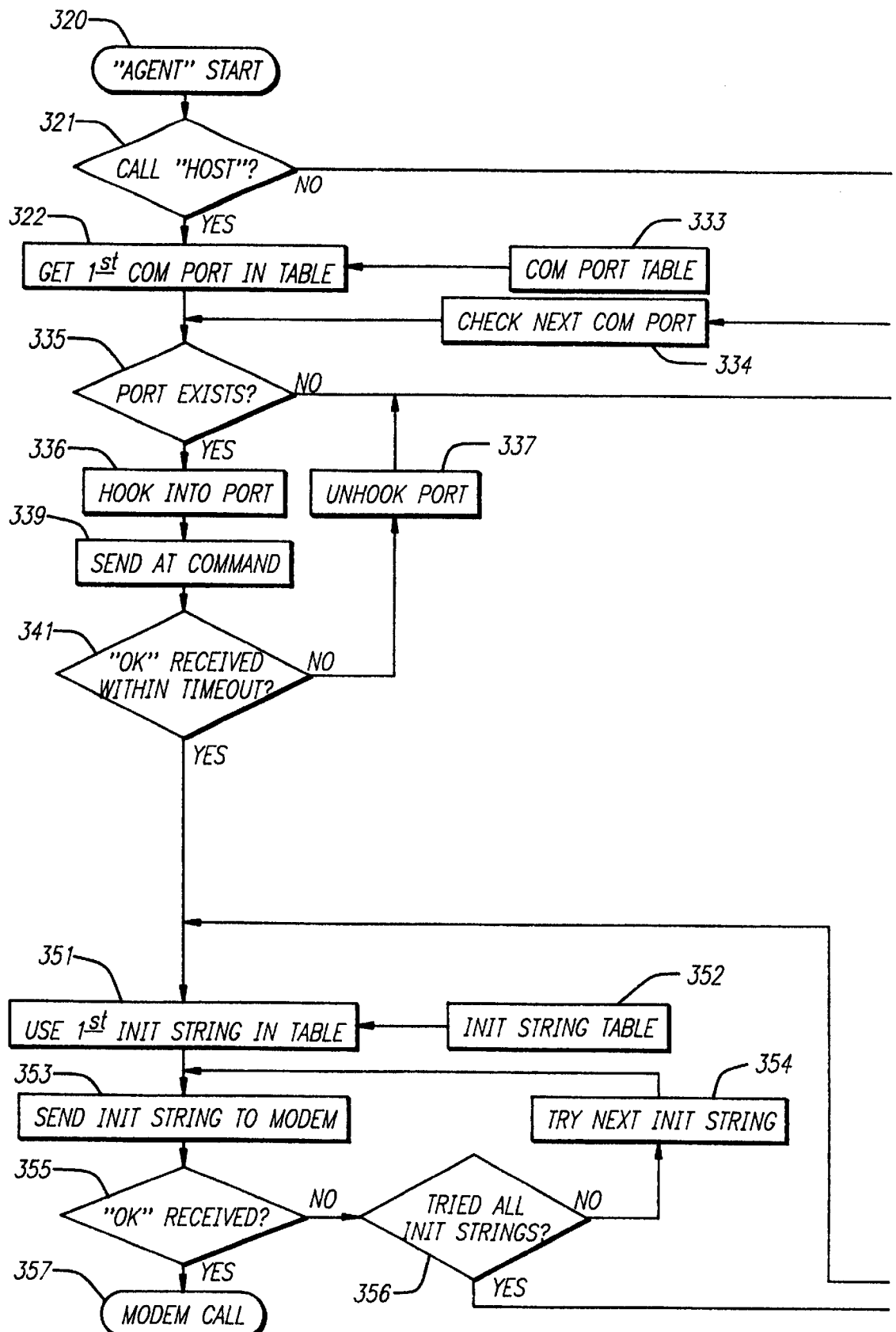
Figures 2, 4A:
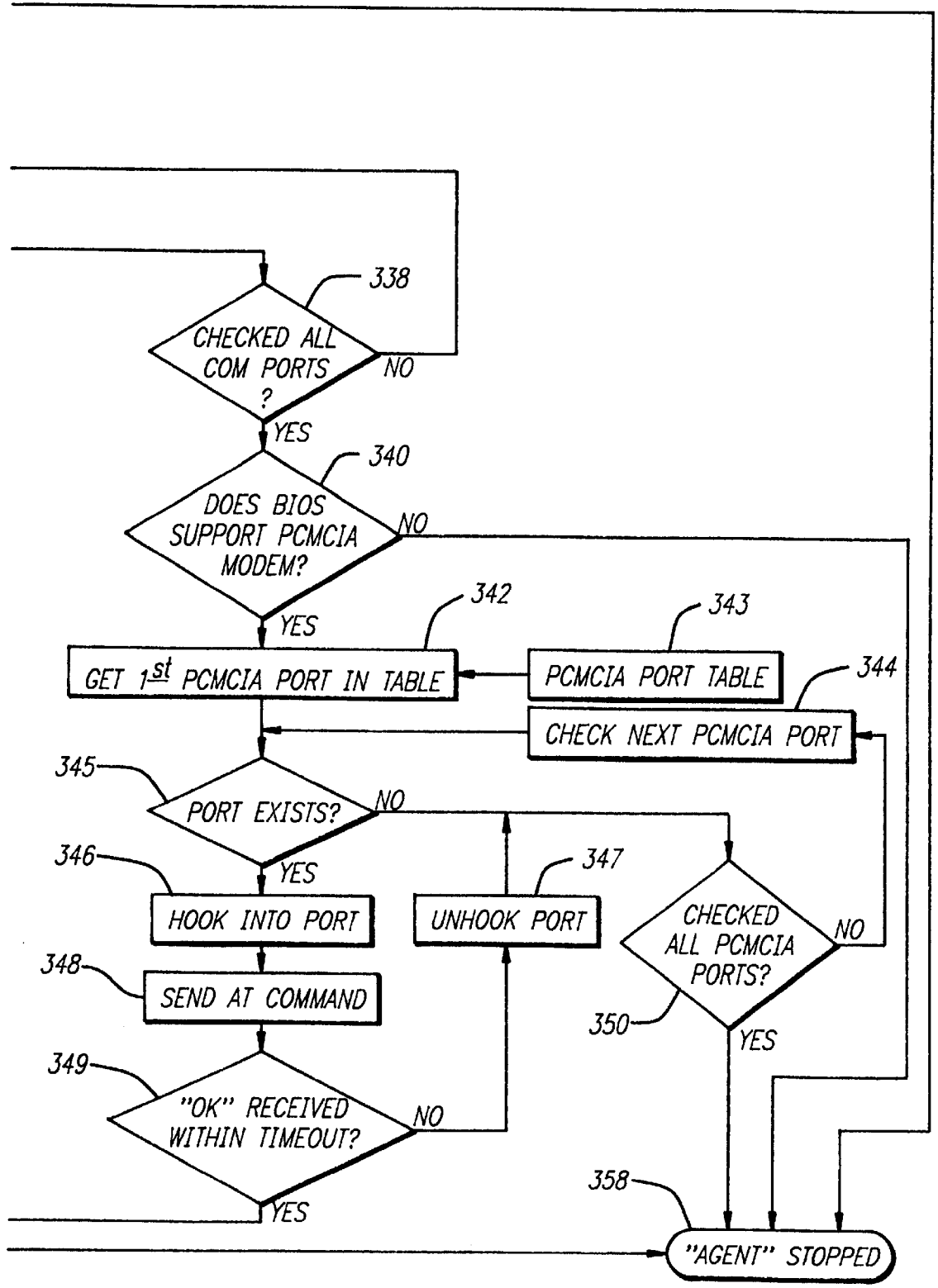

Referring to FIGS. 4A-1 and 4A-2, a flow chart is provided which describes one embodiment of the Agent work cycle in accordance with this invention. The Agent looks for communications ports be used. There are two types of communications ports: the old by popular communications ports are called COM; and the new PCMCIA ports called PCMCIA. Since COM is the more popular than PCMCIA, the Agent first looks for COM communications ports 322–338, if no COM communications ports are found then it will look for PCMCIA ports 338–350. To look for COM communications ports, the Agent checks all COM port addresses using COM port address table 333 to see if they exist 335. The first one encountered will be dynamically hooked 336 into by swapping the appropriate interrupt handler and unmasking the appropriate interrupt request line. If an error occurs, the next port will be checked 338, 334 until either a valid COM port is found or the COM port address table has been exhausted 338. If the COM communication port responds properly, then attempt to check if a modem is currently connected to this COM communications port via issue of the Hayes compatible AT command 339. if the modem does not exist, then the next port will be checked 338. If the modem exists it will respond with an "OK" to the AT command 341.

If no COM ports are found or if no modems are connected to COM communications ports and if BIOS supports PCMCIA modem 340, the Agent attempts to locate PCMCIA communications ports 340–350. The Agent searches for PCMCIA communications ports and PCMCIA modems in steps 342–350 in a fashion similar to the way it searches for COM communications ports 322–338. If no PCMCIA support is enabled 340 or no PCMCIA ports are found, the Agent will stop 358.

After a functional communications port and a modem are fount regardless of their type the Agent will attempt to initialize the modem by sending it modem initialization strings 351–353 using strings from a table of initialization strings. If the modem does not respond with an "OK" 355, this indicates that the initialization attempt failed 356. If the initialization attempt failed, then the next set of strings in the table will be tried 354, and so on until a valid set of initialization strings is found, or the modem initialization string table is exhausted 356 at which point, the Agent will stop 358.

During the system boot process, when the Agent stops at 358, it relinquishes control back to the machine's start-up ROM procedure (see step 715 in FIG. 5).

Figure 4B:
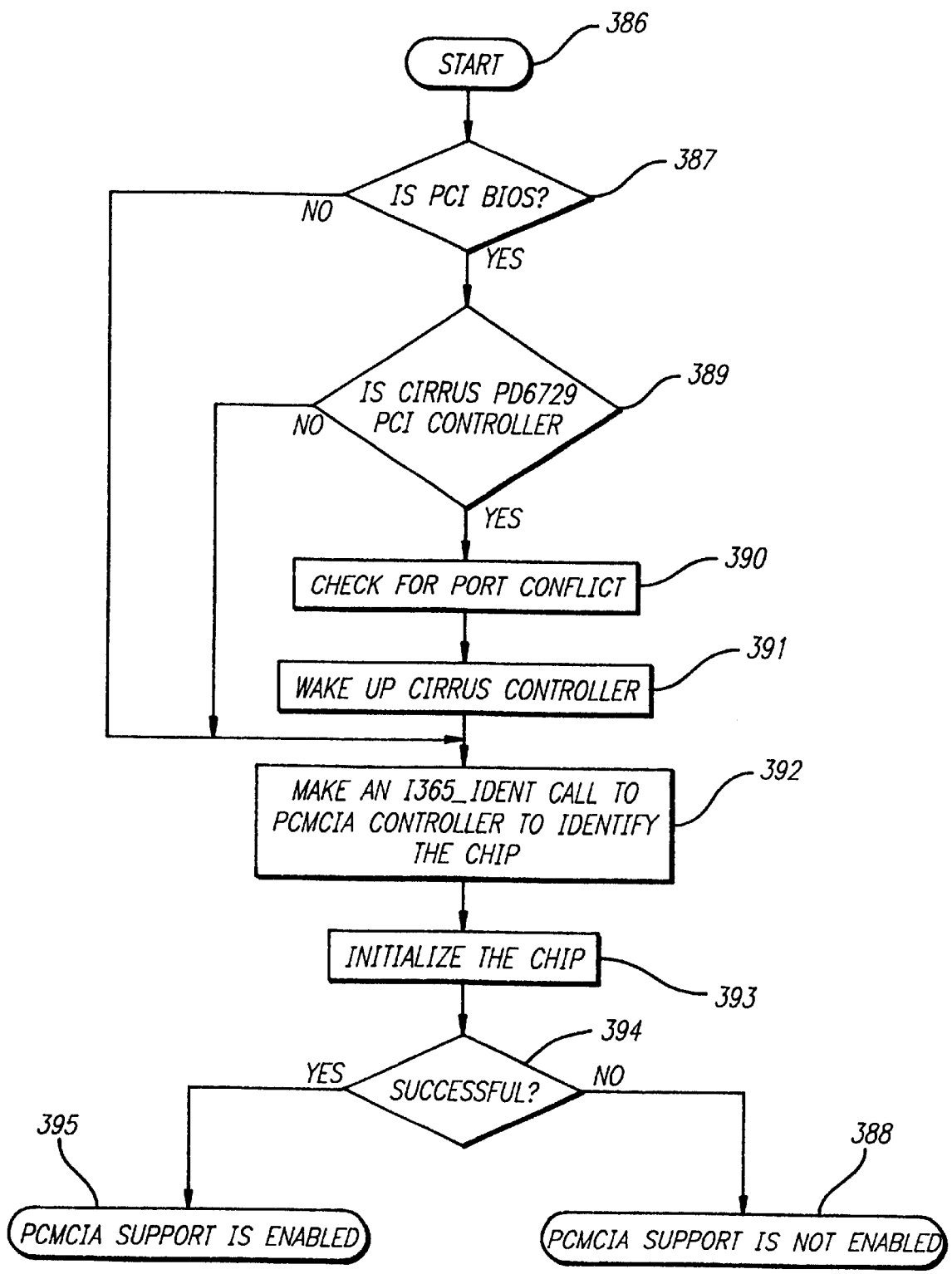
FIG. 4B is an illustrative embodiment in the form of a flowchart showing the routine for determining PCMCIA support in the electronic device.

FIG. 4B describes in detail how the Agent detects whether PCMCIA support is enabled. It does this by checking to see if the computer is using a PCI BIOS 387, and the Cirrus PD6729 PCI Controller chip 389. If these features and chip set are detected, the Agent checks for port conflict 390 and wake up the Cirrus PCI Controller 391. The Agent makes an I365_IDENT call to PCMCIA Controller to identify the chip further 392. Such I365_IDENT call is also made to the PCMCIA Controller even if the PCI BIOS and Cirrus PCI Controller are not present. The PCMCIA Controller chip is then initialized 393, if the chip is initialized successfully then PCMCIA support is enabled 395, otherwise PCMCIA support is not enabled 388. Once a valid and available communications port has been found, and it has been verified that a functional modem is associated with that port, the system will attempt to dial out to the remote host 357 (see also 370 in FIG. 4C).

Figure 4C:
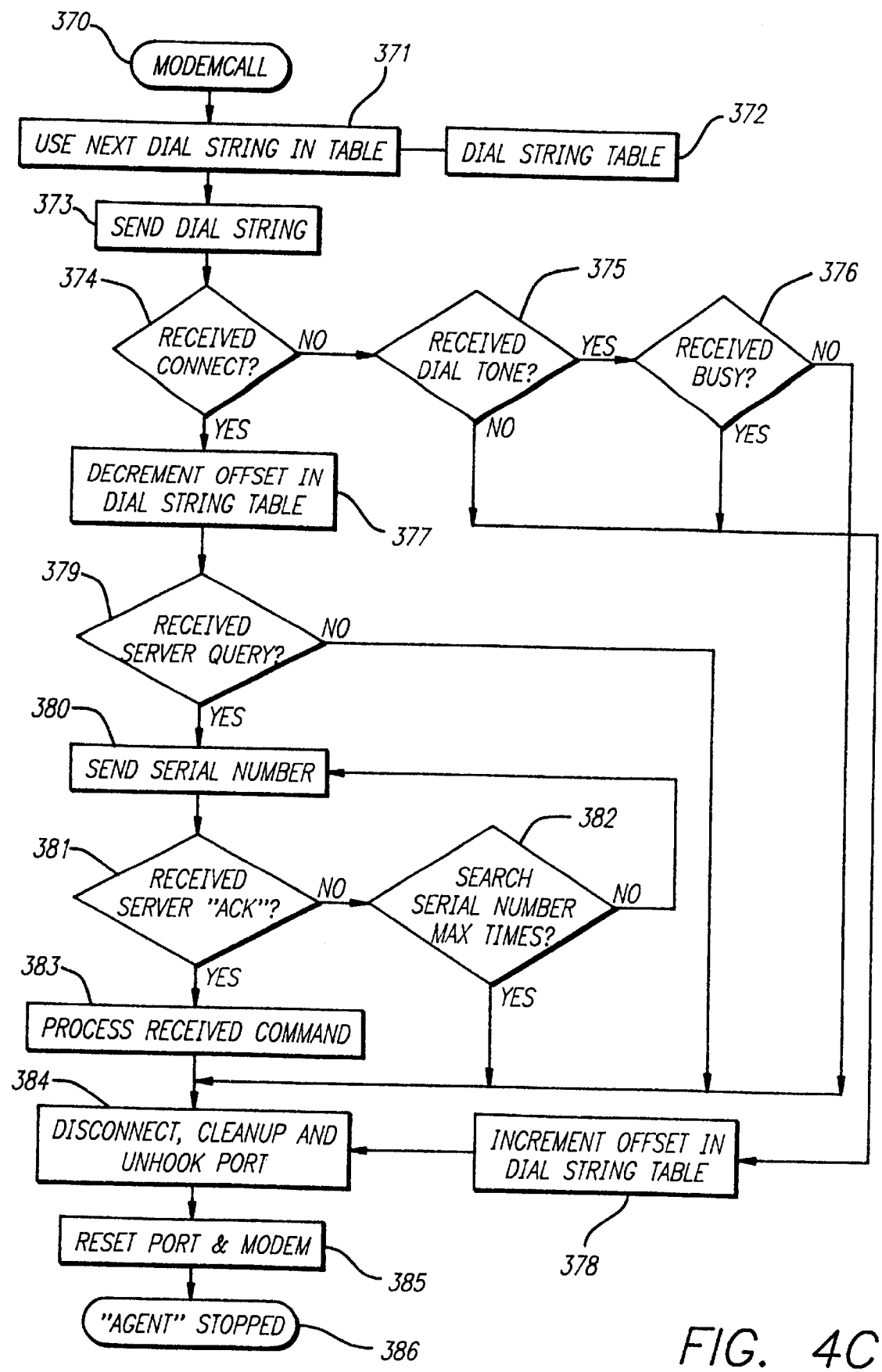
FIG. 4C is an illustrative embodiment in the form of a flowchart showing the modem call routine initiated by the Agent.

Referring to FIG. 4C, the Modem Call routine 370 is illustrated. A dial string table 372 is used 371 to attempt the call since a PBX or switchboard etc. may need to be exited via a dialing prefix. If successful 373–374, the CONNECT result code (numeric or letters) from the modem will be received by the client 374. The Agent also decrements the offset in the dial string table so that the next time the machine is powered on or reset, the current dial string will be used. The host will send a signal ("Query") to the client requesting its serial number. If the client does not receive the "Query" signal 379 it will abort 384, reset the communication port and modem 385, and repeat the cycle 334, 343. If the client receives the "Query" signal, then the serial number is sent 380. At this point, telecommunications have been established and the agent-host transaction begins. If the transaction succeeds, the resultant state will be "active", otherwise it will be "alert". If a "NO DIALTONE" or "BUSY" event occurs 375–376, the offset in the Dial String Table will be incremented 378 so that the next dial string will be attempted the next time the machine is powered on or reset.

The Agent to remote host transaction involves the sending of the computer serial number 380 via the telephone company or carrier service. The "Caller ID" is implicitly received by the remote host (typically during the initial telecommunications event "RING"). Upon the occurrence of the event "CONNECT", the host sends the client a vendor specified message called "QUERY" 379 which in effect tells the client to send its serial number 380. This involves the host acknowledging that it has received 381 and processed 383 the serial number thereby validating it. The client will attempt this call a pre-defined number of times 382 before it gives up (disconnects, cleanups, unhooks port 384, resets communication port and modem 385, repeats the cycle 300). At this point, the modem disconnects 384, and any other cleanup necessary occurs (such as changing the date of the last call to the present). Finally, the resultant state will be reset to "active" and the Agent will remove all traces of it in memory to avoid being detected by unauthorized users. The Agent then stops 386. During system start-up, when the Agent stops, the machine's start-up ROM procedure continues to scan for the next RON extension (see step 712 in FIG. 5.)

If the computer that called in was not reported stolen, no further action with regard to the computer system that called in will be taken. If, however, the serial number transmitted to the remote Host matches one of the serial numbers on a currently valid list of stolen computers, further processing will occur to facilitate the recovery of the missing equipment. Such processing includes, but is not limited to, placing either an automatic or manual call to the local authorities in the vicinity of the missing equipment or the owner of such equipment.

Instead of making a modem call via the PSTN, the BIOS Agent may be configured to communicate with the host monitoring server via the internet in a similar fashion as explained in reference to FIGS. 3-1 and 3-2.

Referring to FIG. 3G, a dial string table 140 is used 139 to attempt the call since a PBX or switchboard may need to be exited using a dialing prefix. The dial string is sent 141, and if successful, the CONNECT result code (numeric or letters) from the remote host server will be received by the client 143. The host will send a signal ("Query") to the client requesting its serial number. If the client does not receive the query signal 148 it will abort 149 and repeat the cycle 117. If the client receives the "Query" signal, then the serial number is sent to the host 151. At this point, telecommunications have been established and the client-server transaction begins. If the transaction succeeds, the resultant state will be "active", otherwise the state of the PSTN application will still be in "alert" mode. If, for some reason, a "NO DIALTONE" event happens 144, a delay will occur 147 and the next dial string 141 will be attempted again. If the line is "BUSY" 145, then a redial attempt 146 will occur using the same dial string for a predefined number of attempts or until a telecommunications connection is made, whichever occurs first. If there is no connection made pursuant to the sending of the dial string and if no dial tone or busy signal is received, then the call attempt is aborted 142.

The client to remote host server transaction involves the sending of the computer serial number 151 via the telephone company or carrier service. The "Caller lD" is implicitly received by the remote server (typically during the initial telecommunications event known as "RING"). Upon the telecommunications event called "CONNECT", the remote host server sends the agent security system client a vendor specific message called "QUERY" 148 which in effect tells the client to send the serial number. This step is particularly significant in an alternative embodiment of the invention wherein the serial number is not sent via the dialed numbers. The step of sending this serial number 151 requires the server to acknowledge that it has received 152 and processed 154 the serial number (validating it). If the appropriate acknowledgment is not received, the client computer will attempt to send its serial number a predefined number of times 153 before it gives up (whereby it disconnects, cleans up, unhooks port 127, 155 and returns to "alert" mode 156). Once the server has acknowledged that it has received and processed the serial number and any other information sent by the client, the modem disconnects 160. Any other cleanup necessary (such as changing the date of the last call to the present) will also be done here 160. Finally, the resultant state will be reset to active 161.

If the serial number of the computer that called in does not match with any of the reported lost or stolen computers, no further action will be taken. If, however, the serial number transmitted to the remote host server matches one of the serial numbers on a current list of lost or stolen computers, further processing will occur to facilitate the recovery of the missing equipment. Such processing includes, but is not limited to, automatically or manually placing a call to the local authorities in the vicinity of the missing equipment, or the owner of such equipment.

Instead of making a modem call via the PSTN, the BIOS Agent may be configured to communicate with the host-monitoring server via the Internet in a similar fashion as explained in reference to FIG. 2.

Operation of Agent Work Cycle Using a Global Network

Figure 14:
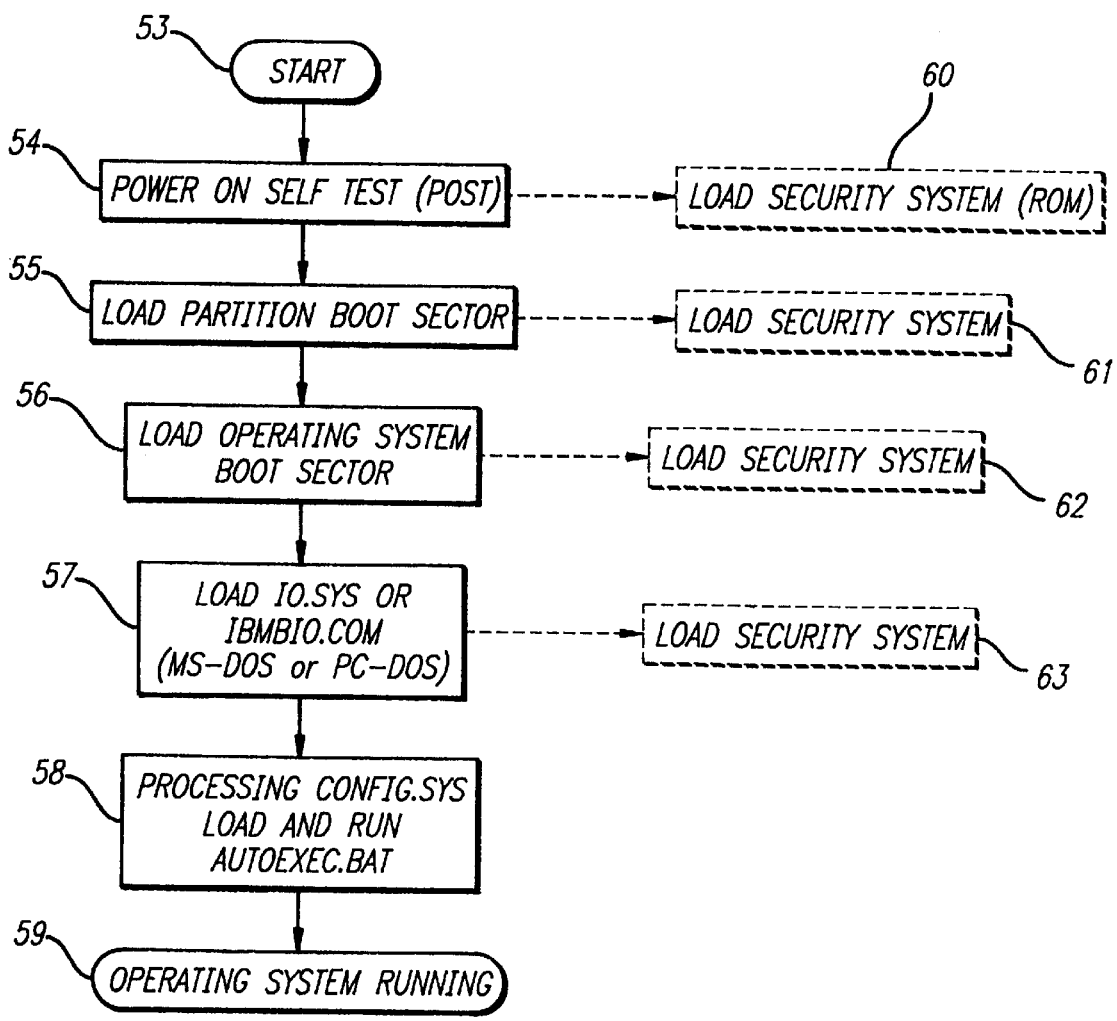
FIG. 14 is an illustrative embodiment in the form of a flowchart showing the conventional method of booting up a personal computer with alternative loading points for the agent security system shown in broken lines.
Figure 14A:
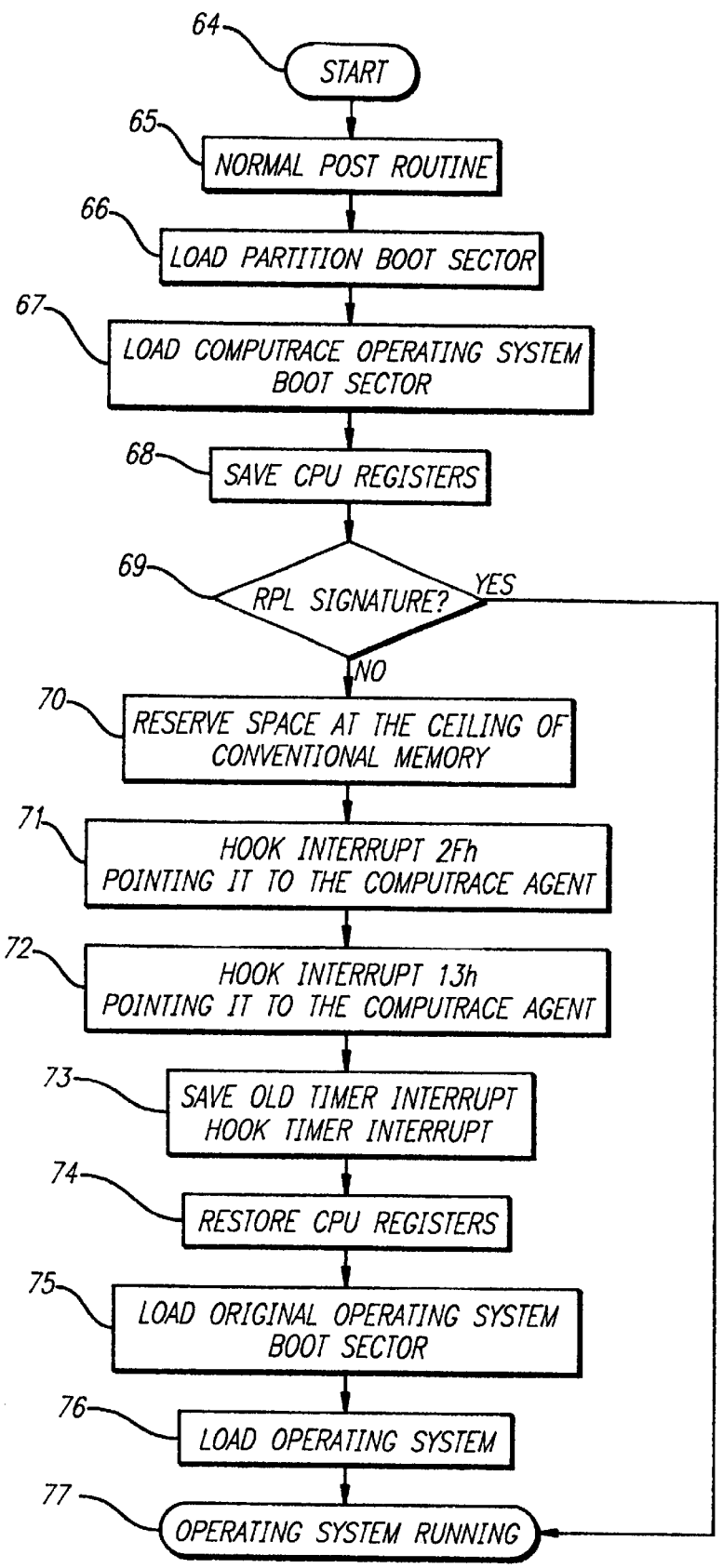
FIG. 14A is an illustrative embodiment in the form of a flowchart showing a method for startup loading of an agent security system according to an embodiment of the invention wherein the operating system boot sector is loaded with the agent.
Figure 14B:
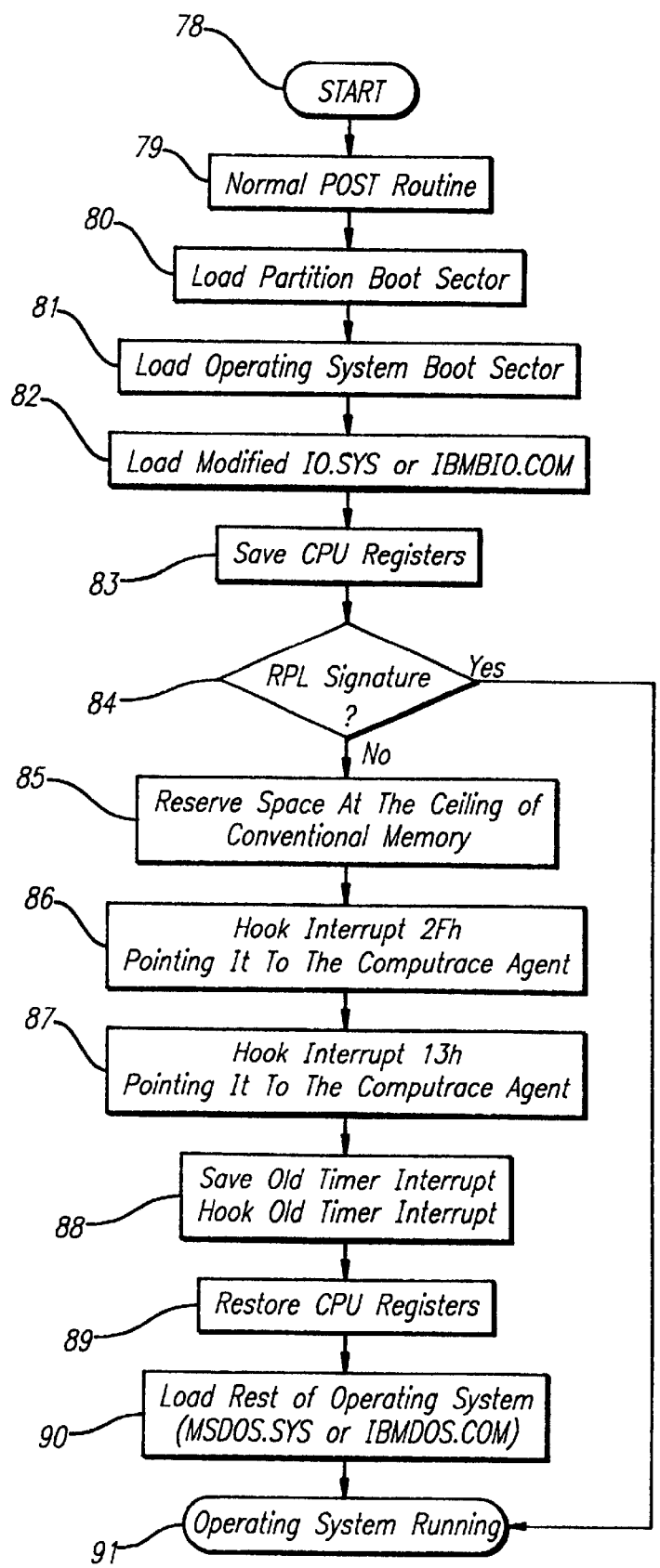
FIG. 14B is an illustrative embodiment in the form of a flowchart wherein the hidden system file IO.SYS or IBM-BIO.COM is modified to be loaded with the agent.
Figure 14C:
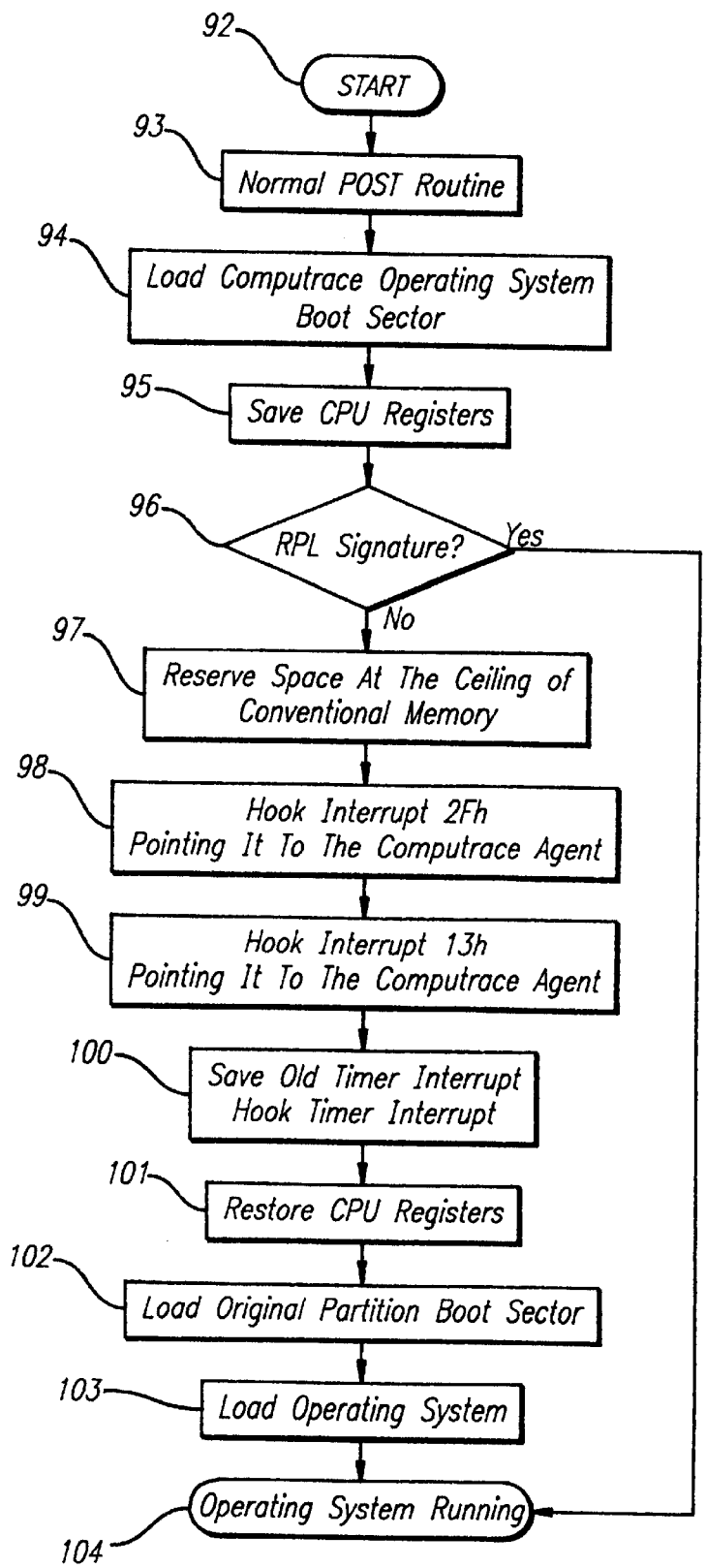
FIG. 14C is an illustrative embodiment in the form of a flowchart wherein the partition boot sector is modified to be loaded with the agent.
Figure 14D:
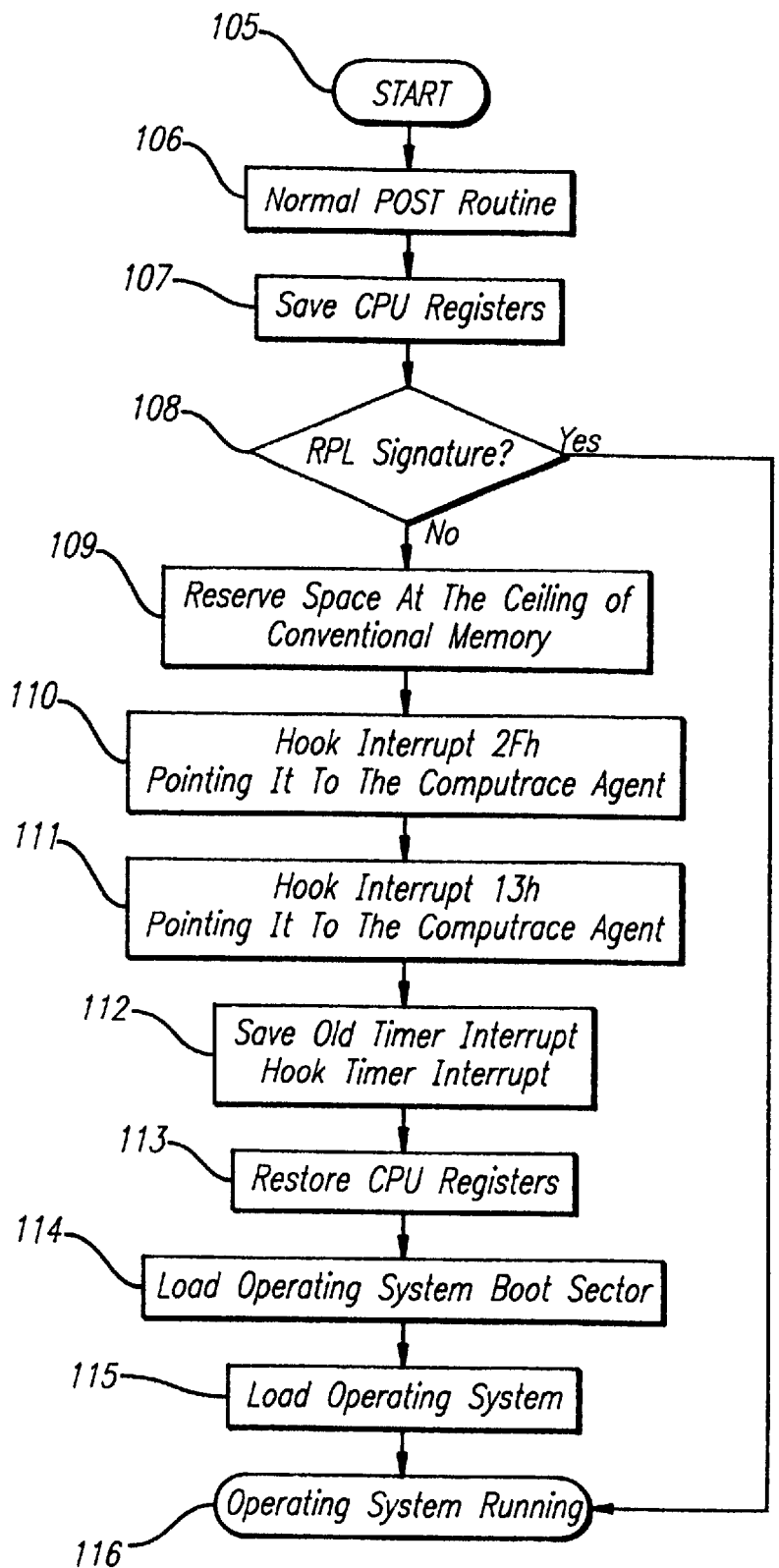
FIG. 14D is an illustrative embodiment in the form of a flowchart wherein the agent security system is ROM BIOS based.
Figure 14E:
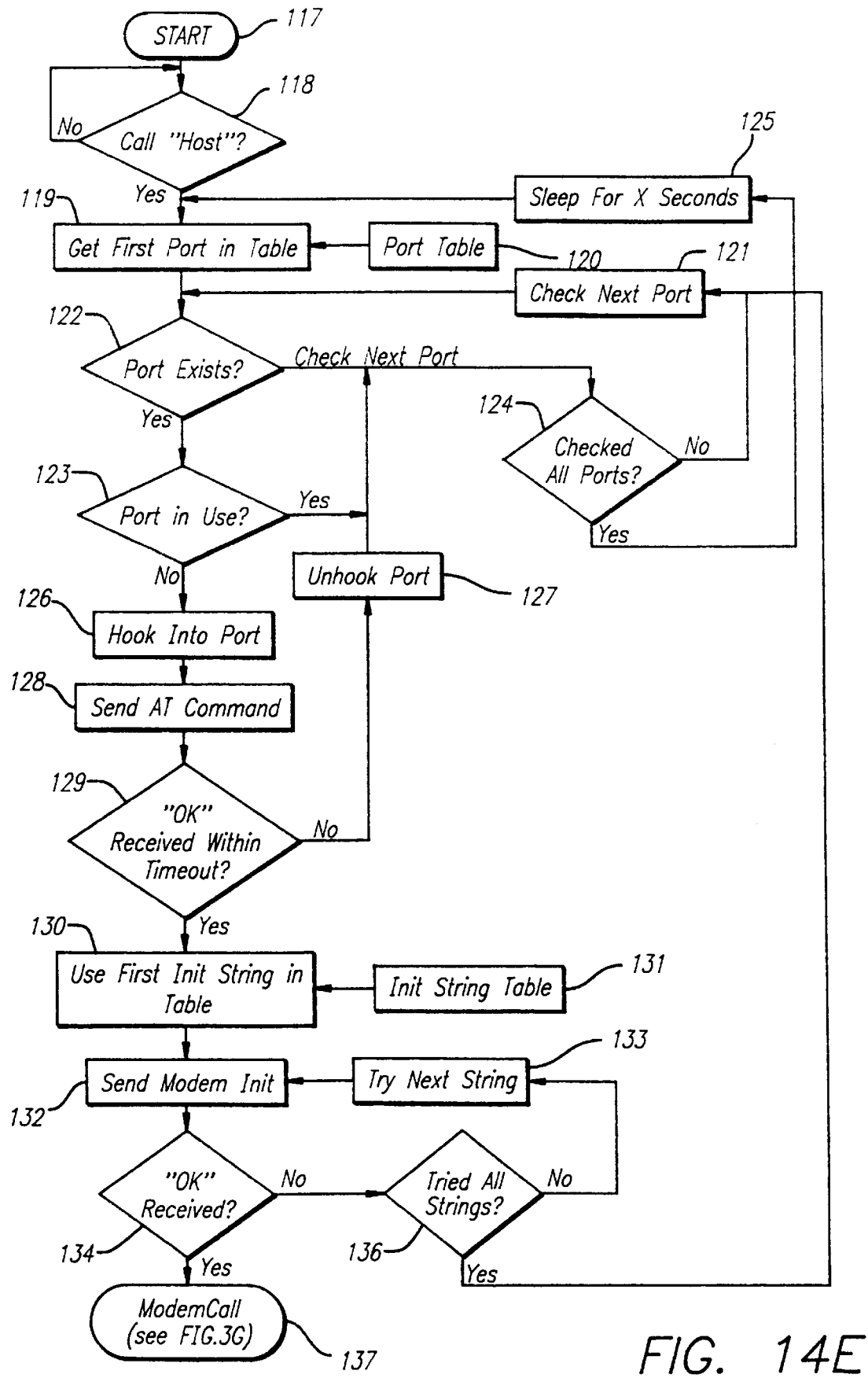
FIGS. 14E, 14G are portions of an illustrative embodiment in the form of a flowchart showing the agents' work cycle according to an embodiment of the invention.
Figure 14F:
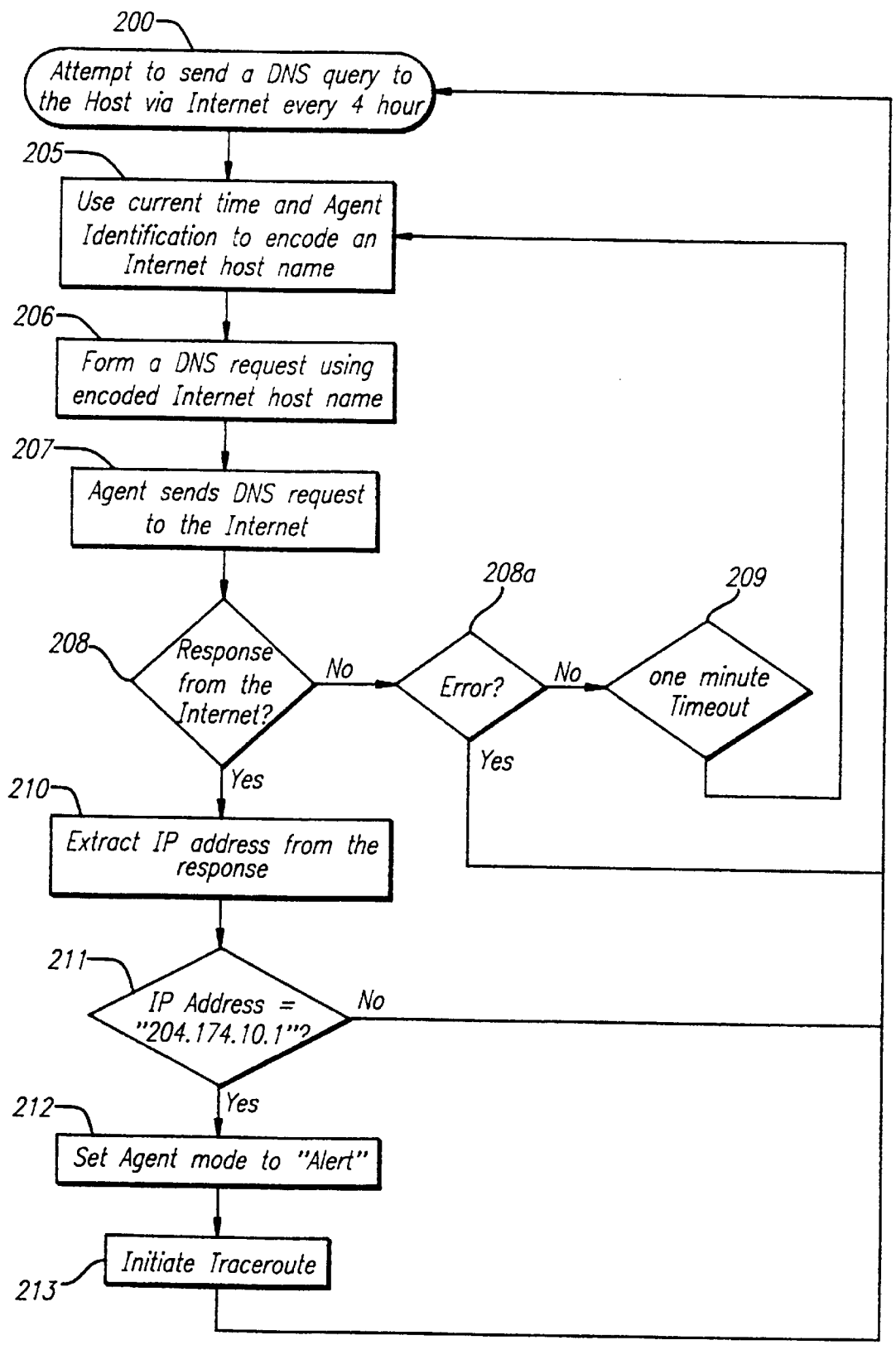
FIG. 14F is a portion of an illustrative embodiment in the form of a flowchart showing the agents' work cycle for the Internet application.

Referring now to FIG. 14F, a flow chart is provided which describes in detail the background process operations relating to the Internet application. The background process wakes up every four hours 200. It uses the current date and time together with the agent identification (serial number) to encode an Internet host name 205. This encoded host name is used in forming a DNS query 206 to be sent to the host Internet monitoring subsystem 9y. After sending this DNS query to the host Internet monitoring subsystem 9y through the Internet 207, the agent waits for a response 208. If an error is found 208a due to a missing DLL or poor TCP/IP configuration, or an error other than a timeout, then the agent will wait four hours and repeat the cycle 200. If no response is received after a predetermined time period has elapsed, the agent will sleep for one minute 209 and then send another DNS query 205. Upon receiving a valid response from the host Internet monitoring subsystem 9y, the Internet Protocol (IP) address is extracted 210. If this IP address equals "204.174.10.1" 211 then the background process sets the agent's mode to alert 212. If the IP address does not equal "204.174.10.1" 211, then the agent remains in active mode and does not attempt to send another DNS query to the host for four hours 200.

Once the agent is in alert mode it initiates a traceroute 213 to provide the host with the Internet communication links which connect the client computer to the host. The transfer of the Internet application to alert mode also triggers the transfer of the PSTN application to alert mode. Once the PSTN is in alert mode, the agent attempts to call the host telephone monitoring subsystem 9x to report its status (identification, location, and other information) through the PSTN eighteen times per second until it is successful.

The following is a discussion of how the traceroute routine operates within the Internet to provide the Internet links which connect the client computer to the host. The Internet is a collection of local area networks joined by IP routers. These IP routers read the numerical destination address of the IP packet sent by each computer linked to the Internet and decrease the Time to Live (TTL) field (used to age a packet) of the packet before sending it to the next appropriate router. However, if the TTL field is zero, the router will return the packet to the source computer with a fail error code.

A traceroute is performed by doing multiple pings from the computer 10 to the host Internet monitoring subsystem 9y. The TTL field is incremented from one for each ping. The first ping is sent with a TTL value of one. It will fail at the first router and the first router address will be determined since the IP packet which will indicate the address of the first router will be returned to the source (client) computer. The second ping will then be sent with a TTL value of two. If this call fails then the second router address will be determined. This process is continued until the ping succeeds. By saving each router address, a trail of routers linking the client computer with host Internet monitoring subsystem 9y is created. This route, representing the sequence of Internet communication links between the computer and the host, is then transmitted to the host Internet monitoring subsystem 9y which saves this information on disk.

The client computer then performs an arp to resolve the mac address which is transmitted to the server. This information can be used to help track the computer as a mac address is a unique number stored in Ethernet LAN cards. It is possible for an ip address to change, but the mac address is constant for the life of the Ethernet LAN card.

First, the "owner" of the source IP address (corresponding to a certain router (LAN) used) will be determined. This is accomplished by presenting the linking information (complete linking information between the client computer and the host is provided pursuant to the traceroute) to the appropriate Internet governing body, such as InterNIC, which is responsible for delegating IP addresses. According to the preferred embodiment, this query can be performed by sending a telnet command to the InterNIC including the address that needs to be queried.

Once the owner of an IP address is determined by querying the InterNIC, the retrieval process can continue. The owner, which may be an independent service provider (such as AOL, Netcom, etc.), is contacted and the date/stamps saved by the Internet monitoring subsystem 9y are compared with the ISP's server logs which are used for billing. These logs generally contain extensive details relating to the owner, time, and date that a particular IP address was used. These logs may be stored in TACACS or RADIUS databases that are created from Cisco or Livingston terminals respectively. Thus, the location from which the client computer called the host through the Internet may be determined.

If the DNS query fails, or the returned address is 204.174.10.1, or the traceroute fails the client attempts to establish a web session with the absolute web server. It first tries to establish the session directly, then it tries any available web proxy server.

If it cannot establish a web session, it tries to establish an ftp session. The client first tries to establish the ftp session directly, then it tries any available ftp proxy server.

Once a web session or ftp session has been successfully established, the sessions are used as secure, encrypted transport sessions. These sessions allow the secure transmission of dos commands and data files.

The dos commands are executed on the client with the results returned and displayed on the server. This facility would allow an authorized user to search for files on the client, upload those files from the client to the server, and irreversibly erase the files from the client computer.

Figure 14G:
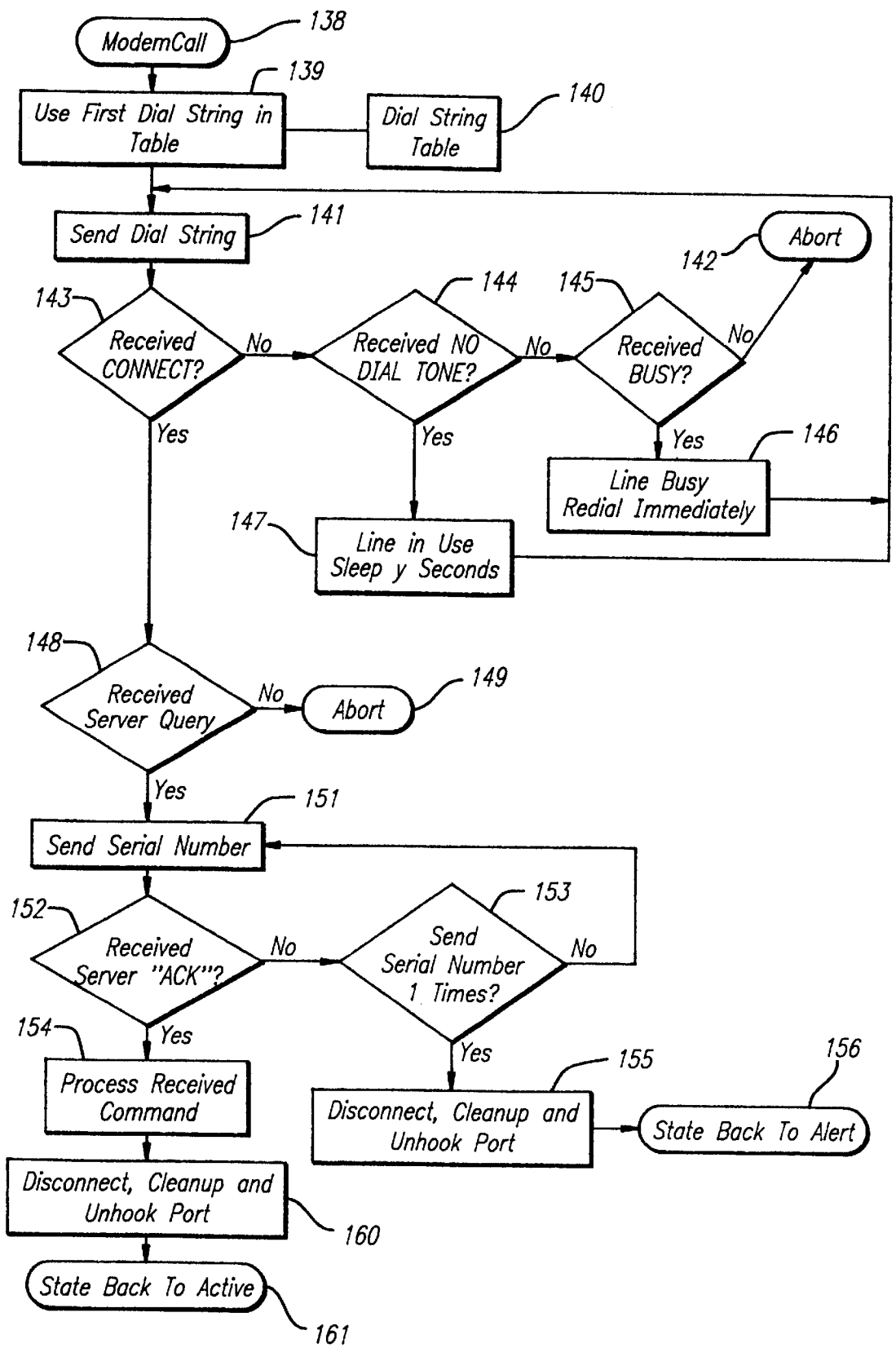
Figure 14H:
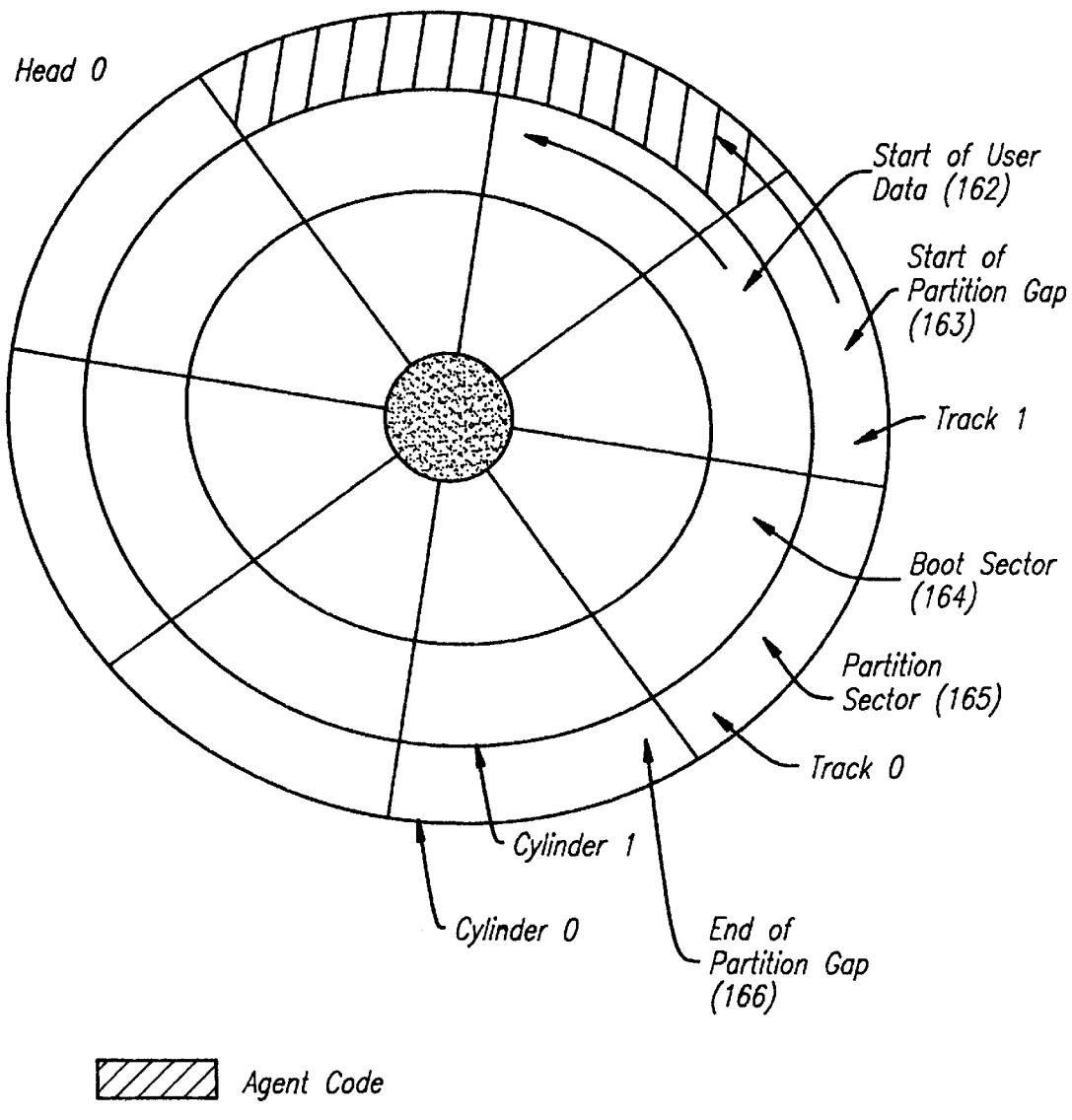
FIG. 14H is an isometric view, partly diagrammatic, of the physical structure of a computer disc.
Figure 15:
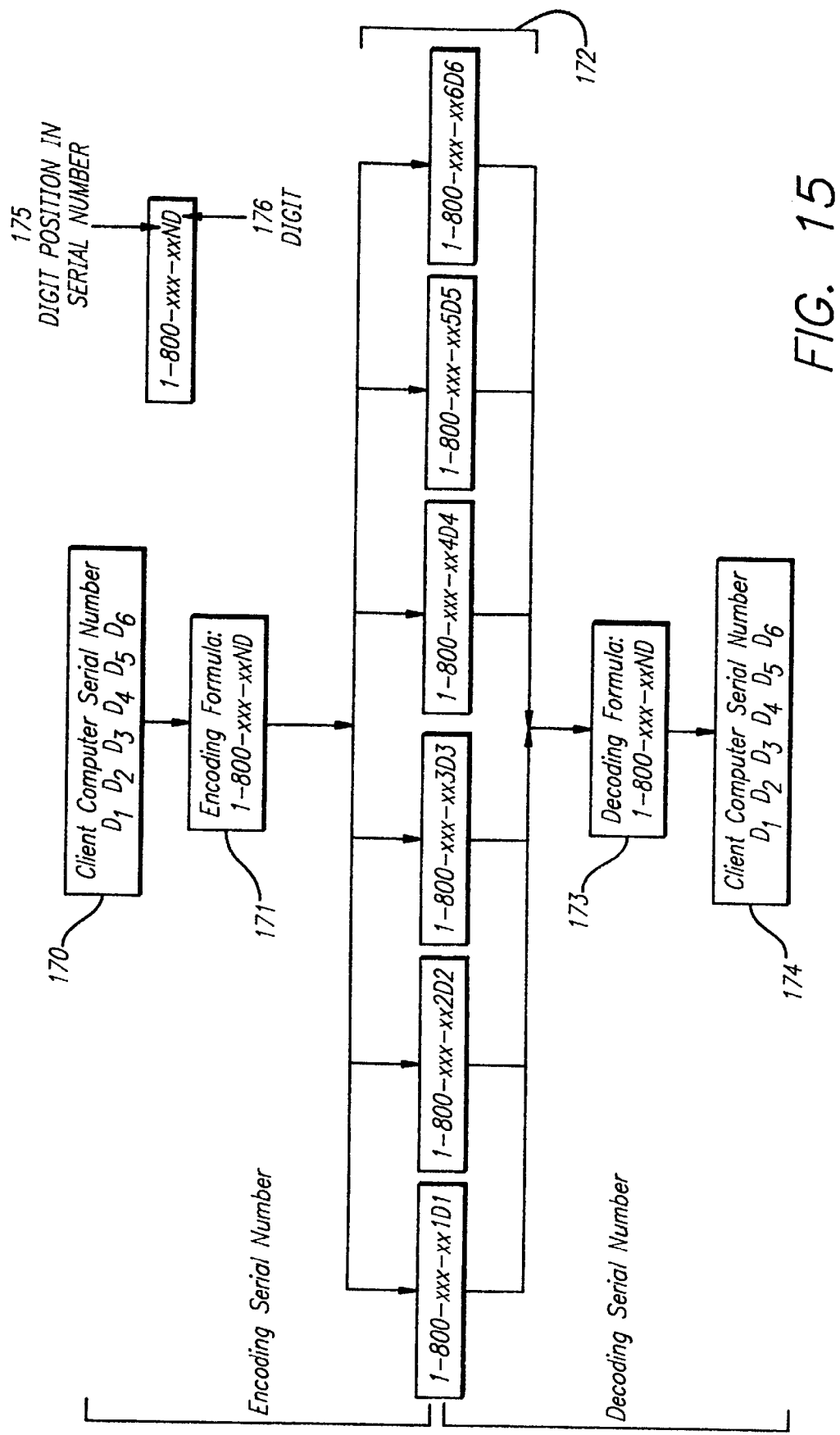
FIG. 15 is a schematic showing an illustrative embodiment of the encoding/decoding method whereby the monitoring service would have to subscribe to 60 telephone numbers.
Figure 15A:
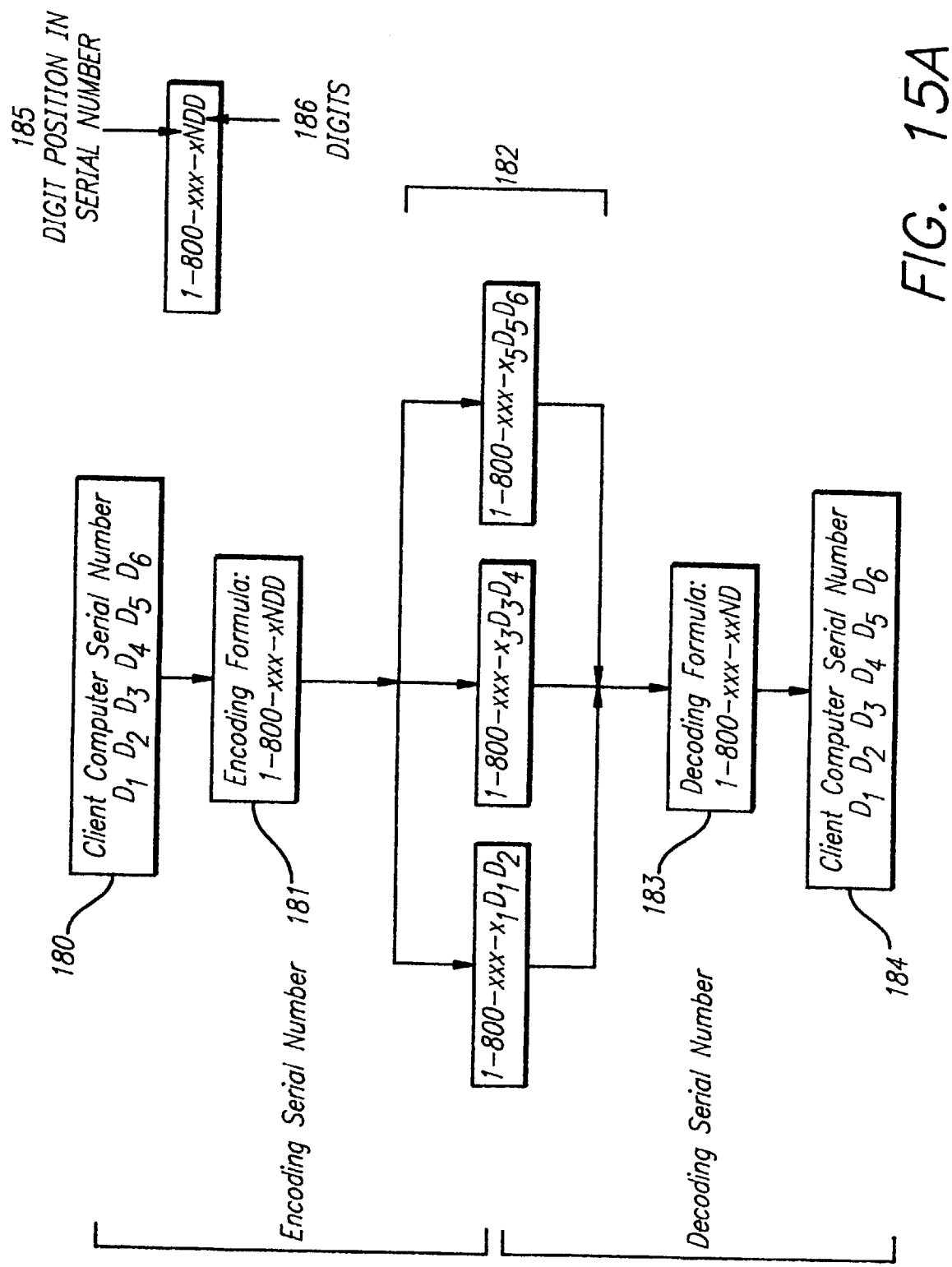
FIG. 15A is a schematic showing an illustrative embodiment of the encoding/decoding method whereby the monitoring service would have to subscribe to 300 telephone numbers.

Referring to FIGS. 14E and 14G, the following is a detailed description of the agent work cycle with respect to the PSTN application. Once the system is powered on 117 a timer interrupt will occur 18.2 times per second. Every eighteen timer interrupts, the complementary metal-oxide semiconductor (CMOS) real-time clock will be accessed, and the time and date will be stored for comparison with the previous real-time clock access. If the date and/or time changes towards the future, no action will be taken to track the time displacement. In this way the agent determines whether it is time to call the host 118. Thus if the current date has advanced far enough into the future (past the date and time to call the host), the agent security system will change its mode of operation from active to alert whereby calls will be regularly attempted (eighteen times per second) until a call is made and a transaction with the host server has been completed. If the system time has been backdated, a modal change from active to alert will occur. This feature safeguards against a thief disabling the agent by backdating the client so that the agent does not call the host for a long period of time.

The communications ports are checked 119–125 (via a port address table 120) to see if they exist. If the first one encountered is not in use 123, it will be dynamically hooked 126 into by swapping the appropriate interrupt handler and unmasking the appropriate interrupt request line. If an error occurs, or if a port is in use, the next port will be checked 124 until either a valid port is found or the port address table has been exhausted 125. If the port address table is exhausted then the agent waits X seconds before trying to find an unused port again. Appropriate cleanup routines restore "swapped" ports to their initial settings.

If the communications port responds properly and a port is actually hooked into 126, the system will attempt to connect to a modem via issue of the Hayes compatible AT command 128. If the modem does not exist, that port is unhooked 127, and the next port is checked 124. If the modem does exist and if it responds with an "OK" 129 to the AT command, the system will attempt to initialize the modem by sending it a modem initialization string 130, 132 (from a table of initialization strings 131). If the modem does not respond with an "OK" 134, this indicates that the initialization attempt failed and the next string in the table is tried 136. This process continues until a valid initialization string is found 134, or the modem initialization string table is exhausted 136 (at which point, the routine will delay for some seconds then try again from the start by checking for the next available port 121).

Once a valid and available communications port has been found, and it has been verified that a functional modem is associated with that port, the system will attempt to dial out to the remote host server 137, 138.

Installing and Loading the Agent

The agent is installed during a typical boot up sequence to the operating system of a computer. FIG. 14 shows a boot-up process for a typical personal computer. It should be understood that this invention is applicable to other types of computers and electronic devices presently available or as marketed in the future with suitable modifications. The aspect of the invention described below is the process of installing the security software onto a portable computer. The method of installation is crucial because the software must remain undetectable once installed. Furthermore, the software should be as difficult as possible to erase. In summary, the invention achieves these objects by installing the software in such a manner that it remains hidden to the operating system, such as MS-DOS.

Four alternative ways of installing the agent security system during the disk boot are illustrated in FIGS. 14A–14D respectively. A conventional boot up method is described in detail in Appendix I. The system can also be installed with MS.SYS or IBMDOS.COM, but these are more difficult and less preferred than the three alternatives set out below. The loading program TENDER (further described in the Appendix) can be used to install the agent by one or more of these alternative installation methods. Thus, the agent may be installed in a variety of locations whereby second and third agents can provide back up support for the primary agent. The four locations where the agent can be installed on the client device are as follows:

1. The operating system boot sector—See FIG. 14A.
2. A hidden system file such as IO.SYS for MS-DOS or IBMBIO.COM for PC-DOS—See FIG. 14B.
3. The partition boot sector—See FIG. 14C.
4. The ROM BIOS—See FIG. 14D Referring to FIG. 14A, the agent loading sequence is described for loading the agent on the operating system boot sector. The computer 10 is powered on and the loading sequence begins 64. As is well known in the art, the computer 10 performs an initial testing routine to assure that all components are working properly 65. Illustratively, the program incorporated is the IBM-PC compatible Power-On Self Test (POST) routine. The partition boot sector is loaded 66. Next the operating system boot sector with the installed agent is loaded 67. In an effort to maintain the transparency of the agent, the CPU registers (corresponding to the current state of the computer) are saved 68. Before the agent is installed there is a check for a Remote Procedure Load (RPL) signature 69. If the signature is present this indicates that the agent is already in memory and will not be loaded again. However, if there is no RPL signature then preparation is made to load the agent. First, space is reserved for the agent at the ceiling of conventional memory 70. Next, Interprocess Communication Interrupt (2Fh) is hooked 71, which enables communication with other programs. Interrupt Eah, which is the disc input/output handler, is hooked 72. The old timer interrupt is saved, and new hook timer interrupt is put into place 73. Now the CPU registers are restored 74 in order to maintain the transparency of the system. The original operating system boot sector is loaded 75. The original operating system had been moved to accommodate the agent installation. Finally, the operating system is loaded 76 and running 77 again.

Referring now to FIG. 14B, the agent loading sequence is described 78–91 for loading the agent on a hidden system file such as IO.SYS for MS-DOS or IBMBIO.COM for PC-DOS. The sequence is analogous to that disclosed above for the operating system boot sector. However, instead of loading the agent with the operating system boot sector, the agent is loaded with the operating system file 82 (load modified IO.SYS or IBMBIO.COM).

Referring to FIG. 14C, the agent loading sequence is described 92–104 for loading the agent on the partition boot sector. The sequence is analogous to that disclosed above for the operating system boot sector. However, instead of loading the agent with the operating system boot sector, the agent is loaded with the operating system partition boot sector 94.

Figure 6A:
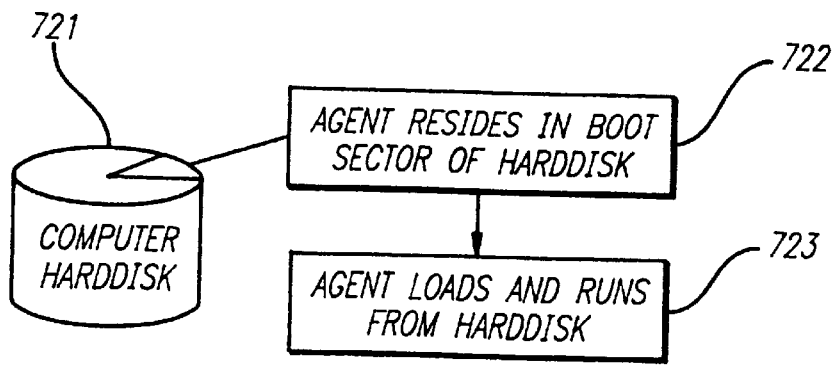
FIGS. 6A, 6B and 6C are illustrations of alternatives to loading of the Agent.

Referring to FIG. 6A, the Agent is implanted in the boot sector of the computer's hard-disk 721. The Agent is loaded into memory when the computer is turned on or reset 722. Once active, the Agent executes in memory 723 until the computer is powered down or reset.

Referring to FIG. 14D, the agent loading sequence 105–116 is described for loading the agent via ROM BIOS. The sequence is analogous to that disclosed above for the operating boot sector. However, the Agent is loaded from the ROM after the CPU registers are saved 107. At that time the ROM can take control of the system and load the agent. Once the CPU registers are restored 113, the ROM can no longer load the agent.

As is well known in the art, the computer 10 is performs an initial testing routine to assure that all components are working properly 65. Illustratively, the program incorporated is the IBM-PC compatible Power-On Self Test ("POST") routine. Next, in an effort to maintain the transparency of the Agent, the CPU registers (corresponding to the current state of the computer) are saved 107. Before the Agent is installed there is a check for a Remote Procedure Load ("RPL") signature 108. If the signature is present, this indicates that the Agent is already in memory and will not be loaded again. However, if there is no RPL signature, then preparation is made to load the Agent. First, space is reserved for the Agent at the ceiling of conventional memory 109. Next, Interprocess Communication Interrupt (2Fh) is hooked 110 which enables communication with other programs. Interrupt 13h, which is the disc input/output handler, is hooked 111. The old timer interrupt is saved, and new hook timer interrupt is put into place 112. Now the CPU registers are restored 113 in order to maintain the transparency of the system. The original operating system boot sector is loaded 114. The original operating system had been moved to accommodate the agent installation. Finally, the operating system is loaded 115 and running again 116.

Figure 6B:
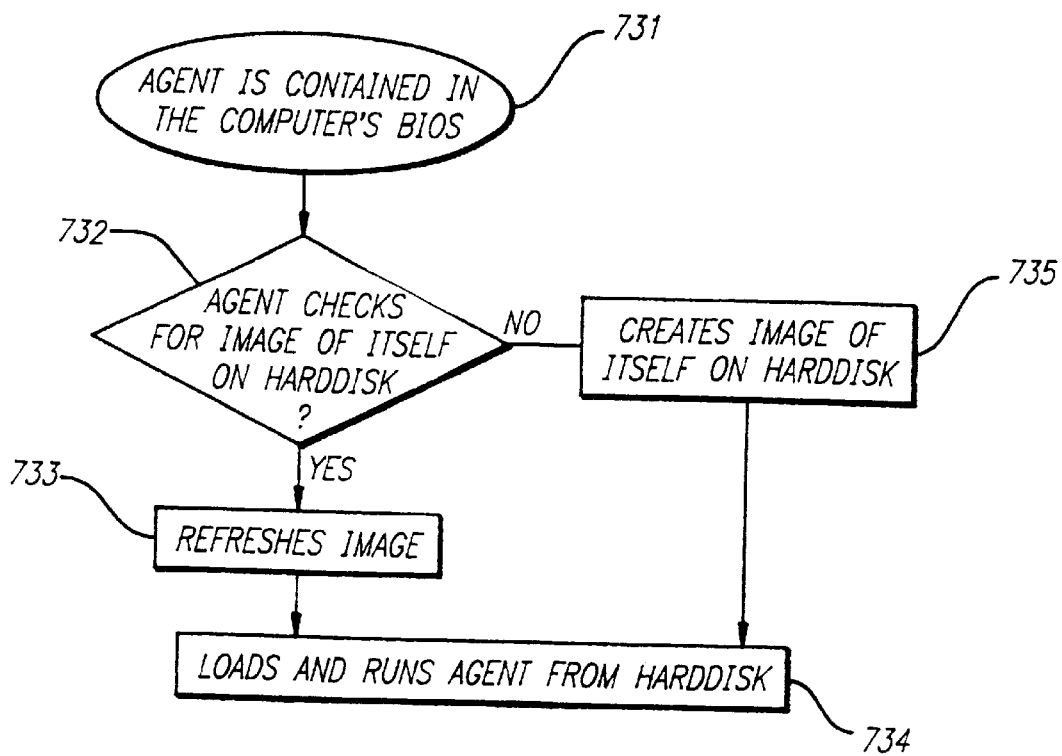

Another configuration the BIOS Agent is shown in FIG. 6B. The agent is implanted into the computer's BIOS 731 and/or bootstrap BIOS. When the computer is turned on or reset, the Agent loads itself into memory and checks for an image of itself on the computer's hard-disk 732. If an image of the Agent is found, that image is refreshed 733 and run from the disk 734. If an image is not found, one is created on the disk 735. The newly created image is then loaded into memory and run from the disk 734.

Figure 6C:
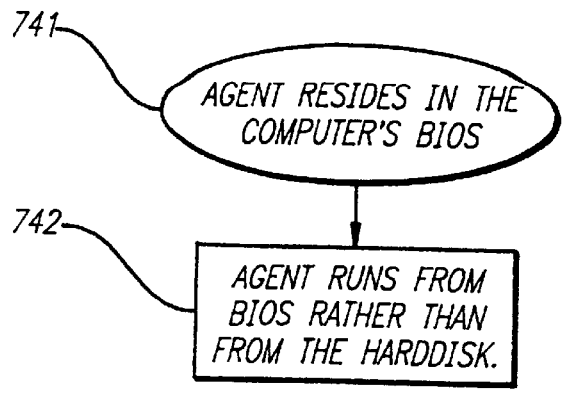

Turning to the operating system independent methods, referring to FIG. 6C, the Agent is implanted into the computer's BIOS 741 and runs directly from the BIOS 742. As more fully discussed below, variations of the BIOS Agent may include implanting the Agent in a DSP of a modem, a CPU of the electronic device, a hard wired circuitry or an integrated circuit in the electronic device.

All of the above BIOS Agents may be configured to communicate with the host monitoring server via modem call and/or internet.

Variations on Loading the BIOS Agent

Four alternative ways of installing the Agent security system during the disk boot were disclosed in co-pending U.S. application Ser. No. 08/558,432 which is hereby incorporated by reference. In one of the alternative methods of installation the Agent was disposed on the ROM BIOS using hook interrupts and saving and restoring CPU registers. That method required these brute force techniques to enable the Agent to be compatible with certain operating systems. Operating system independent Agents are further disclosed herein.

Segmented Agent

Figure 7A:
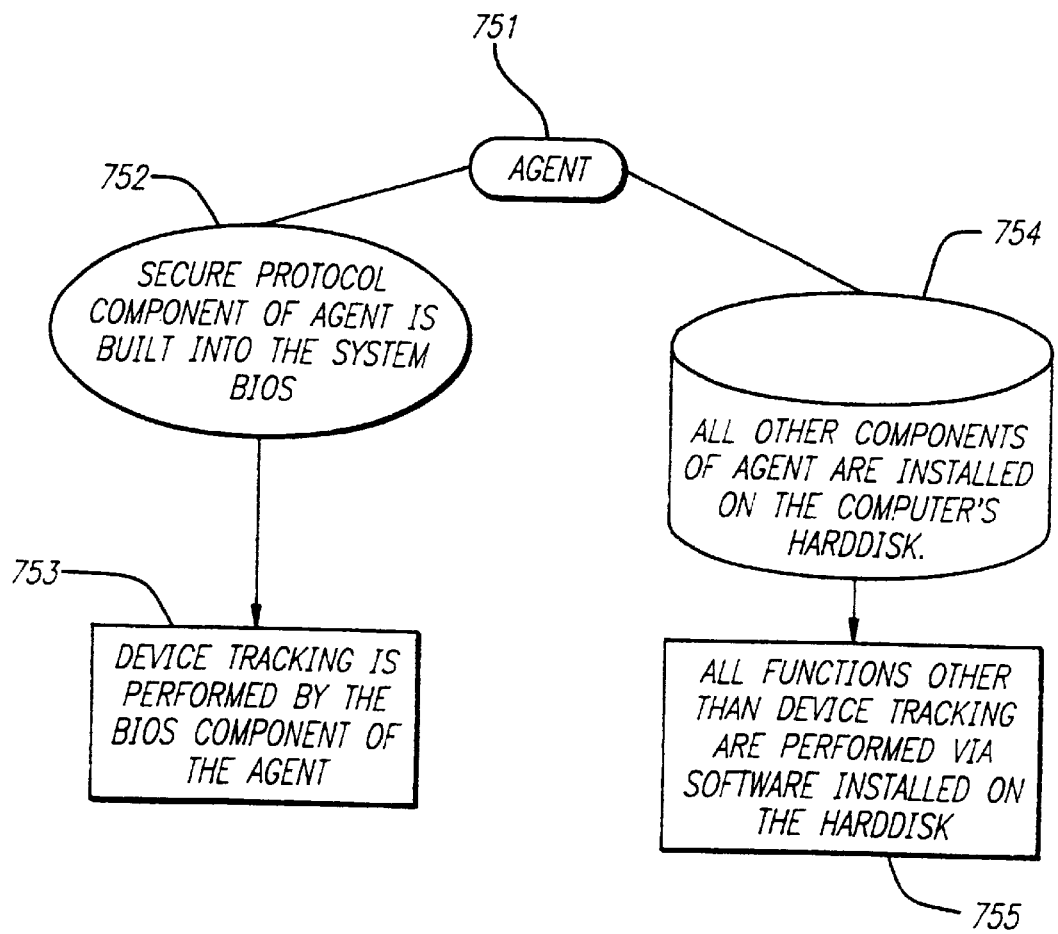
FIG. 7A is a schematic block diagram illustrating the alternate embodiment of Segmented Agent.

Referring to FIG. 7A, an alternate embodiment of the operating system independent BIOS Agent is described in which the Agent 751 is segmented into two components. The Secure Protocol Component (SPC) is implanted into the computer's BIOS 752. The SPC handles device tracking function only 753. Additional functions, such as asset and configuration management, are handled by a High Level Component (HLC) that resides on the computer's hard-disk 754 and run from the disk 755.

Figure 7B:
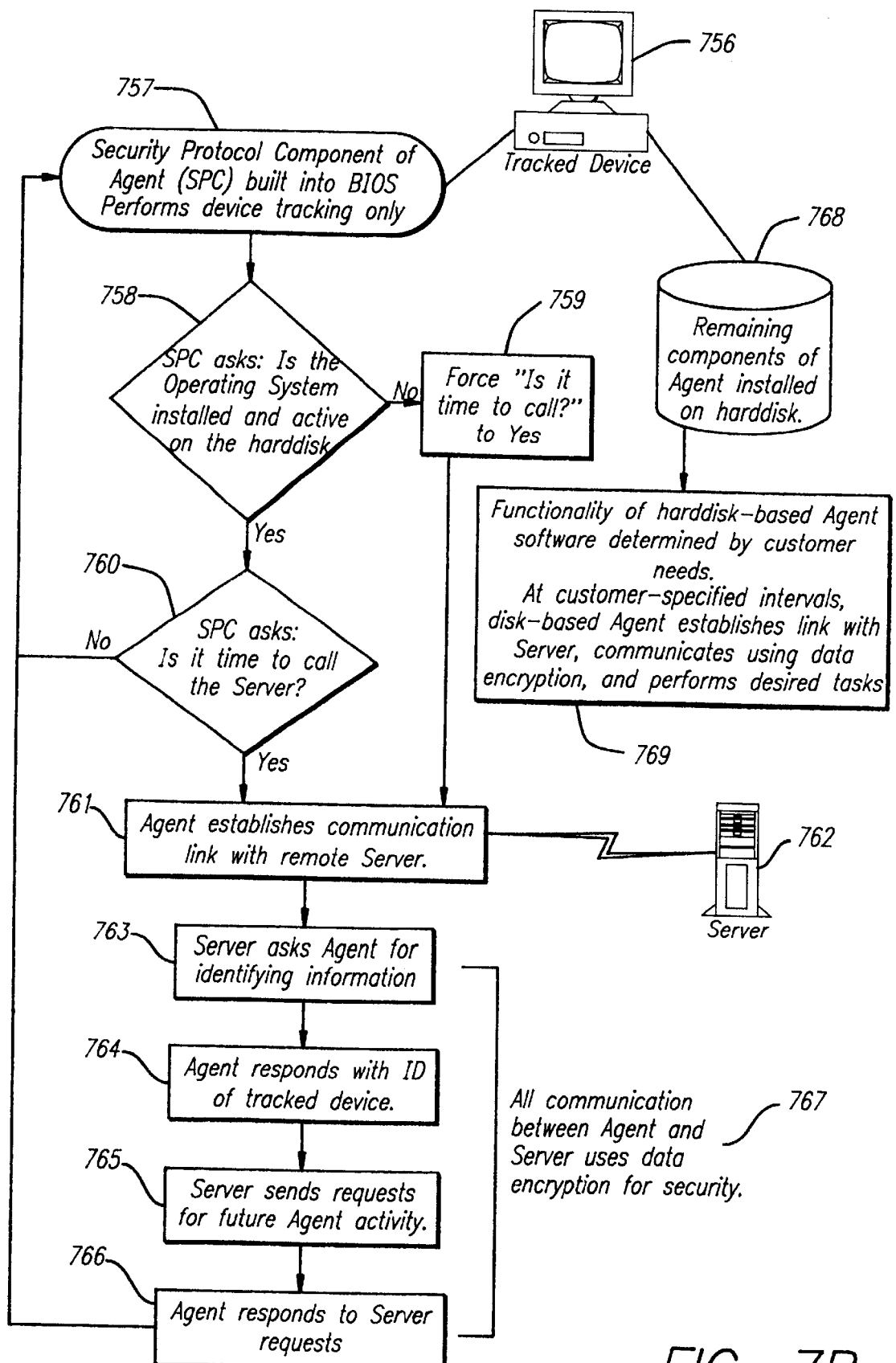
FIG. 7B is a flow chart of the Segmented Agent process.

Referring to FIG. 7B, the embodiment of FIG. 7B is described in greater detail. The SPC 757, upon recognizing machine events and at specified intervals, checks to see whether the Operating System is installed and active on the hard-disk 758. Events that can be recognized include Power Management events and Plug-and-Play queries such as the ACPI (Advanced Configuration & Power Interface) adopted by Microsoft and other developers or SMI (System Management Interface) adopted by Intel and others. Power Management events are generated from the hard-disk powering down, the CPU switching speeds, or the display switching on or off. Plug-and-Play queries are received from the Operating System when it is identifying devices installed in the machine and loading drivers to control those devices. If the SPC is able to communicate with the Operating System, it determines if it is time to contact the Server 760. It does this by checking a "counter" which is reset to a certain value during bootup and then decremented with each check that is performed. Any time the counter reaches 0 (zero), the SPC contacts the Server 761. If the SPC is unable to establish a communication link with the Operating System, it assumes that a problem exists with the system and forces the counter to 0 (zero) 759. The SPC then immediately establishes a link to the Server 761 by any of the means discussed before regardless of the amount of time that has elapsed since the last connection.

Once a communication link has been established between the SPC and the Server 762, the Server asks the SPC to identify itself 763. The SPC responds with the ID of the device that is being tracked 764. The Server then sends a request to the SPC 765 asking that it perform one or more tasks at a specified future time (such as contacting the Server again). At the appropriate time, the SPC responds to any such request 766. All communications between the Agent and the Server will incorporate data encryption 767 to provide an additional layer of security and prevent the sophisticated and user from intercepting or transmitting messages in an attempt to interfere with device tracking. The Server will determine the location of the tracked device with whatever means are available through the particular communication service being utilized. For instance, if a link were established over standard phone lines, Caller ID/ANI could be used to fix the location, or if a link were establish over Internet, the ID address can be used to fix the location.

The capabilities of the software installed on the hard disk would be based upon the needs of the customer and might include advanced asset management or system administration functions. The hard disk-based components of the Agent would perform in a method similar to that of the SPC, contacting the Server at specified intervals and transmitting data back and forth as necessary to complete its scheduled tasks 769.

Alternatively, the SPC may be implemented in the CPU of the computer 10, the DSP of the modem, or in the form integrated circuits or hard wired circuits, as more fully addressed below.

The segmented Agent may be configured to communicate with the host monitoring server via modem call and/or internet.

Modem Agent

Figure 8A:
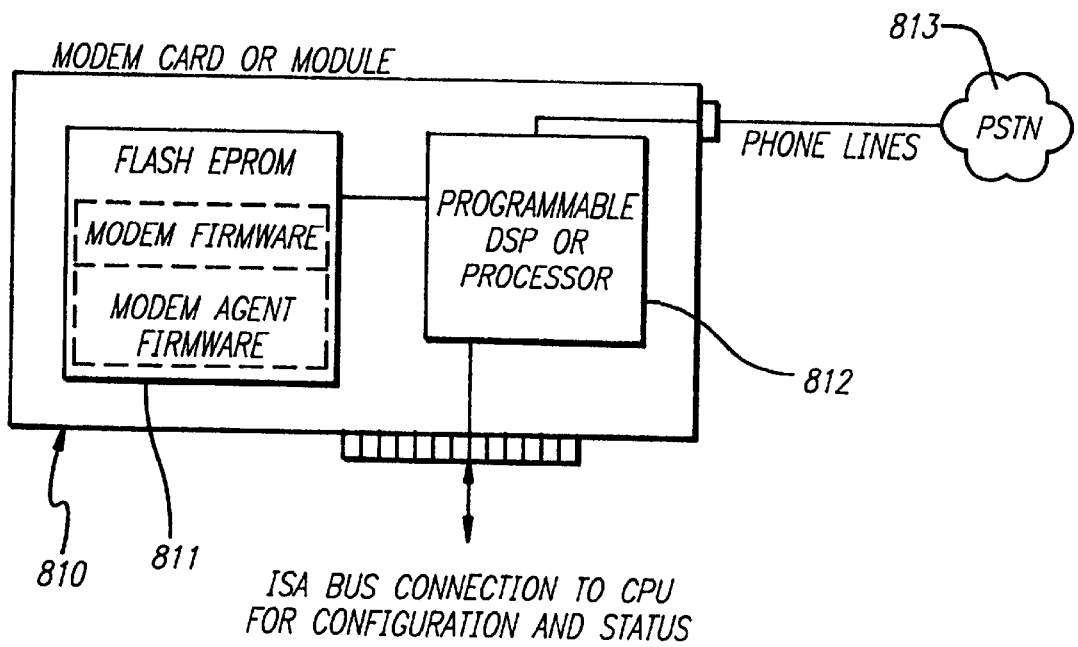
FIGS. 8A–F are block diagrams illustrating the alternate embodiment of Modem Agent.

Referring to FIG. 8A, according to another embodiment of the invention, instead of installing the ROM BIOS of the computer, the Agent is installed into the Flash ROM (or EPROM) 811 or DSP 812 of the computer modem, either on a plug-in card or built-in on the motherboard (810) of the computer. The Agent can be imbedded into the modem Flash ROM (or EPROM 811) or DSP 812 by an installation utility that runs on the computer, or it can be embedded into the modem Flash ROM or DSP by the manufacturer. The Modem Agent can communicate with the Host Monitoring System through the PSTN 813 at scheduled times without the involvement of the PC processor. Thus, the Modem Agent is independent of the software running on the computer including the operating system.

The Modem Agent enables a monitored computer to communicate to the monitoring server even if a new disk drive is installed. This provides a much more secure method of tracing the location of stolen computers where modifications are made to the computer. before they are used. In the case where computers are stripped for parts, the Modem Agent will still be able to be located. Integration of the Modem Agent onto the motherboard of the computer will not allow the Modem Agent to become separated from the motherboard, protecting the most important component of the computer.

A. Modem Hardware Architecture

Figure 8B:
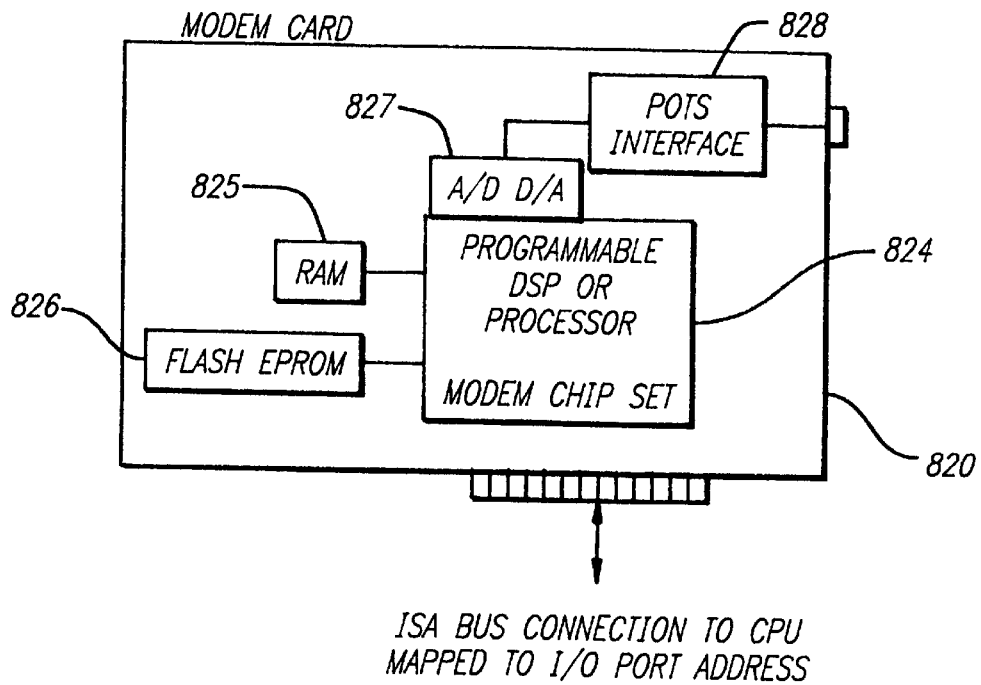
Figure 8C:
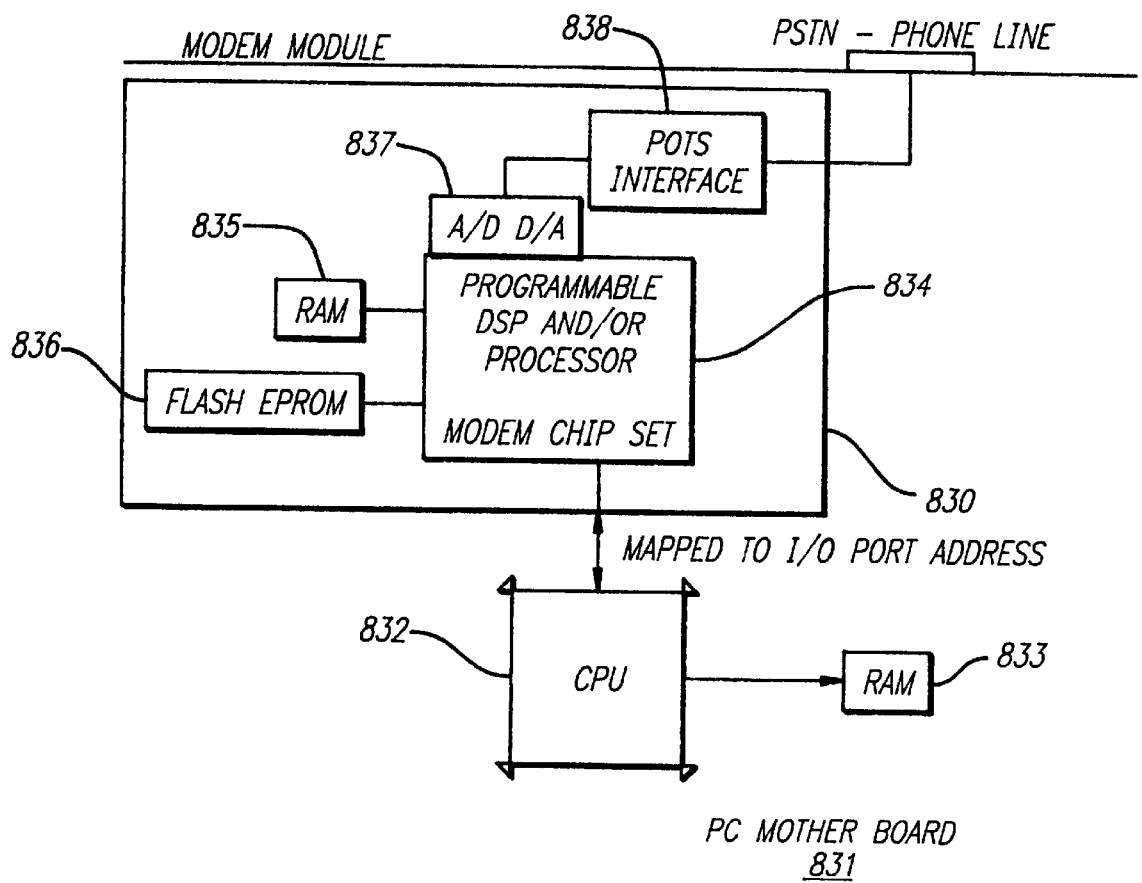

The hardware architecture consists of a programmable modem either in a plug-in card 820 or a module 830 integrated onto the motherboard 831 of the monitored computer as shown in FIG. 8B and FIG. 8C respectively. Plug-in card based modems 820 are usually programmable but can be removed from the monitored computer. This prevents the modems from tracking the main portion of the computer. Modem modules 830 integrated directly onto the motherboard can not be removed from the main portion of the computer. The modem module 830 is coupled to the CPU 832 and RAM 833.

The modem module 830 or plug-in card 820 will contain a modem chip set 824, 834 that provides the modem communication (encoding and modulation) and modem controller functions. Depending on the manufacture the chip set, it may contain a single or multiple DSPs and possibly a microcontroller. The DSP will usually provide the communication software for encoding and modulation. The microcontroller will usually provide the modem controller software but some chips set provide two DSPs for both functions. Along with the chip set the modem will contain RAM 825, 835, a flash programmable EPROM 826, 836, A/D and D/A converters 827, 837 as well as a POTS interface 828, 838.

The RAM is used by the modem chip set as its main memory. The flash programmable EPROM is used to store the modem software. A/D and D/A converters with the POTS interface allow the chip set to send/receive signals over the analog PSTN phone lines.

While the Modem Agent is described below in connection with communications with the host monitoring server via modem call, the Modem Agent may be configured with the additional and/or alternate function of communicating with the host monitoring server via internet.

B. Modem Agent Software Architecture

Figure 8D:
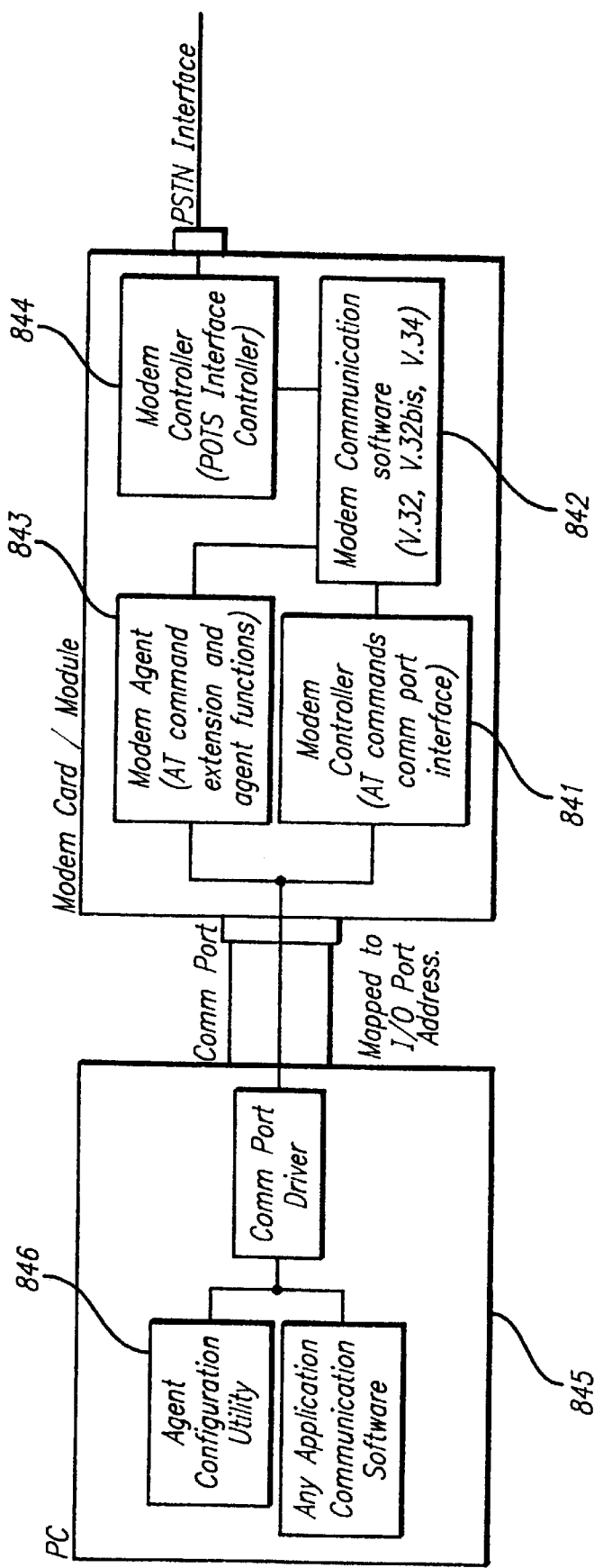

The Modem Agent resides on either a software upgradable ISA of PCI modem card or a memory mapped/ISA mapped modem module integrated on the mother board. These modems usually consist of two software entities, the controller software 841 and the communications software 842 as shown in FIG. 8D. The controller software 841 contains the software that controls the interface between the PC 845 and the communications software 842 as well as the POTS interface 844. It allows application software to communicate with and control the actions and parameters of the communication software 842.

The communication software 842 contains the modem communication functionality that provides the encoding and modulation schemes employed during communications. The communication software usually runs on a DSP while the controller software usually runs on a separate microcontroller. However, some modems use a single processor to provide both functions. The communications software is usually not modifiable and is proprietary to the manufacture of the modem chip set.

A third software entity, the Modem Agent 843, must be added to the modem software. The Modem Agent will reside on the processor that contains the Modem controller or the Flash EPROM or ROM. The Modem Agent will receive extended AT commands from the Agent Configuration Utility 846. These extended AT commands will be proprietary to the host monitoring service and will each require a password. The Modem Agent will also be able to communicate with the host monitoring server directly. This capability will be provided by the call management function within the Modem Agent. (See FIG. 8E and discussions below.)

The Modem Agent 843 will run in parallel to the modem controller 841 such that no modifications to the manufacturer's software in the modem controller will be required. The modem controller will respond to the extended AT commands with "ERROR". However, the Modem Agent will qualify the error response with an extension response to indicate that the command was recognized and executed correctly if the syntax of the command and the password are correct. This will allow the standard modem controller code to function as is and still allow the Modem Agent to respond to commands.

Figure 8E:
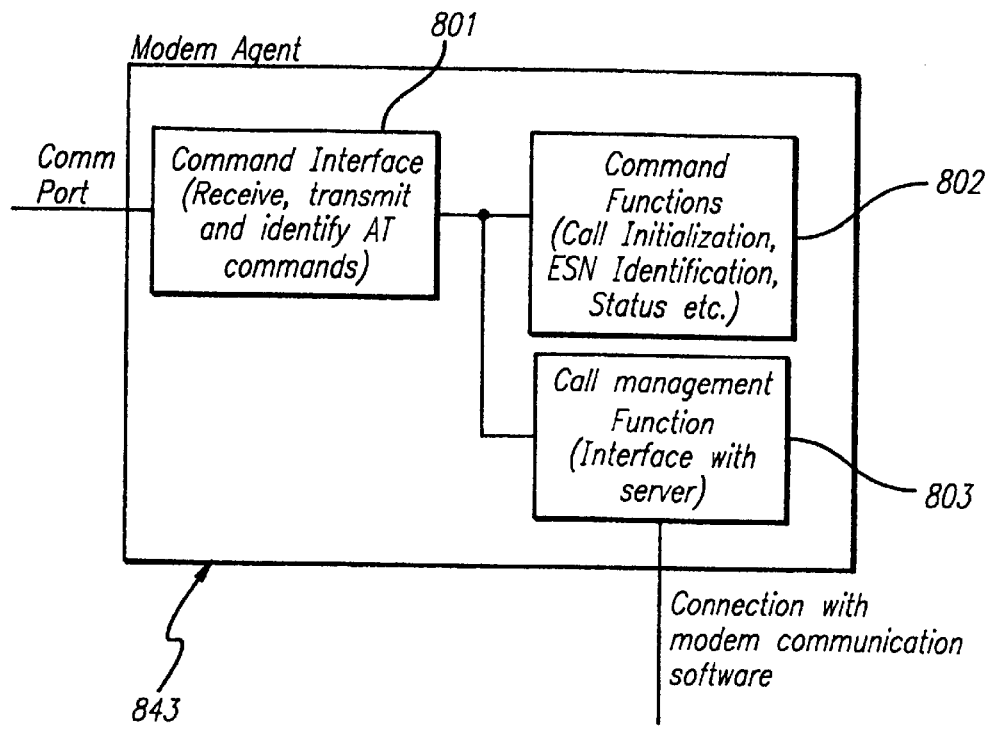

Referring to FIG. 8E, the Modem Agent 843 consists of three main program components: the command interface module 801, the command function module 802, and the call management function module 803. The command interface module 801 will handle all communications with the PC interface, in parallel with the modem controller. This will allow the command module to communicate with PC applications. Its functions will include receiving/transmitting of controller characters from/to the PC as well as AT command identification. The command interface module 801 supports extended AT modem commands that enable control and configuration of the Modem Agent. The extended AT modem commands include but are not limited to: set ESN, set dial strings, enable monitoring, disable monitoring, report status, initiate monitoring call, and set local time. All of the extended commands are password protected to prevent unauthorized access and detection of the Modem Agent.

The commands function module 802 implements the functionality of the extended AT commands as well as functions required to communicate to the monitoring server. This could include call initialization, call scheduling, ESN identification, status monitoring, mode management, etc.

The call management function module 803 will provide the interface to the monitoring server. It will allow the command module to communicate with the monitoring server. Its functions will include receiving/transmitting of data from/to the monitoring server and controlling the modem communication inferface. The call management function module 803 contains the Secure Protocol Component (SPC) of the Segment Agent as described before.

C. Modem Agent Functions

The Modem Agent provides two sets of functions. Firstly, to communicate with the PC's CPU, a set of extended AT commands are required. Secondly, to communicate with the host monitoring server, a set of functions are required.

1. Extended AT Commands

The Modem Agent supports extended AT commands to:

a. Set ESN

This command allows a configuration application to modify the ESN number that the Modem Agent uses when connecting to the host monitoring server. This command is used to configure new Modem Agents as well as change the ESN when a new number has been assigned to it.

b. Set Dial Strings

This command allows a configuration application to modify the number dialed when contacting the host monitoring server. This command is used to configure new Modem Agents with the correct dial-up phone number for the host monitoring server as well as modify it if a change is required.

c. Enable Monitoring

This command allows a configuration application to enable the monitoring service of the Modem Agent. This command is used to re-enable monitoring if the service has previously been disabled.

d. Disable Monitoring

This command allows a configuration application to disable the monitoring service of the Modem Agent. This command is used when the owner of the monitored PC wishes to terminate the electronic device trace service. The command will turn off the Modem Agent functions and AT commands with the exception of the enable monitoring command.

e. Report Status

This command allows a configuration application to report the status of the Modem Agent.

f. Force Contact with Monitoring Server

This command allows an application to force the Modem Agent to contact the host monitoring server. This command can be used, for example, to test the Modem Agent configuration.

g. Set Local Time

This command allows a configuration application to set the current time on the Modem Agent. This is to allow the Modem Agent to synchronize scheduled calling times to local time.

h. Set Alert Mode Interval

This command allows the interval of the alert mode (as described before) to be set.

All commands are password protected. The Modem Agent is shipped with a default configuration. The password accompanying each command will be calculated from the argument of the command. This will make the AT commands more difficult to defeat and will not allow the application communicating with the Modem Agent to become out of sync with its password. The calling application must take care to not send AT commands while the modem is being used by another application.

2. Modem to Server Functions

For the Modem Agent to communicate with the host monitoring server, a set of functions are required to:

a. Contact and Communicate with Monitoring Server

Figure 8F:
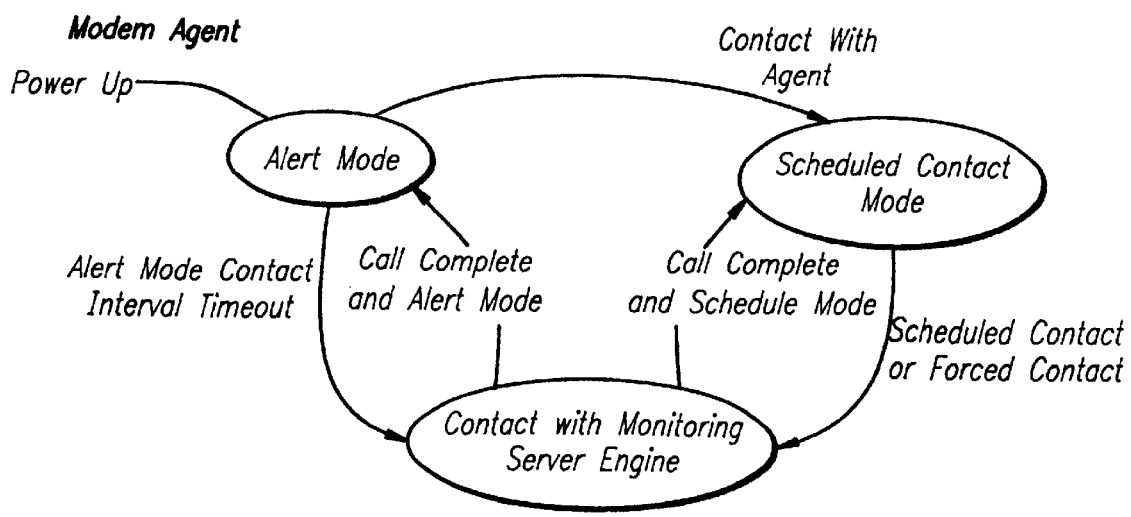

When monitoring is enabled, the Modem Agent calls the host monitoring server's phone. The Modem Agent sends its ESN to the host monitoring server. The host monitoring server tells the Modem Agent when to call again. The Modem Agent calls back at the scheduled time. A state diagram of the contact and communication mechanism is shown in FIG. 8F.

b. Schedule Communications with Monitoring Server

The Modem Agent is not able to schedule contact times on its own because it does not have access to a real-time clock. However, the Modem Agent is capable of measuring the passage of time. Thus, there is a need to initialize the current date and time in the Modem Agent upon power-up of the modem. This function can be provided by the HLC in a segmented Agent configuration described before, for example. If the modem Agent does not receive from the HLC the current date and time within a predetermined interval after power-up, then the Modem Agent will enter alert mode and initiate contact with the host monitoring Server. When the Modem Agent contacts the host monitoring server, it will verify the time last set by the Agent Configuration Utility.

c. Prevent Modem Contention

The Modem Agent does not interfere with the use of the modem by PC applications. Before calling the host monitoring server, the Modem Agent ensures that the modem is not currently in use. If a PC application starts to use the modem, as indicated by the receipt of AT commands by the modem, then the Modem Agent immediately drops any active call and immediately relinquishes control of the modem to the PC.

d. Active Alert Mode

The Modem Agent will enter alert mode when it has not received communications with the Agent Configuration Utility of configuration application within X minutes. The Modem Agent will then immediately attempt to contact the monitoring server and will continue to contact it every Y minutes until communications from the Agent Configuration Utility are received (set absolute time AT command). This mode is to prevent thieves from removing the hard disk or reformatting the hard disk to defeat the Agent tracing service.

CPU Agent

Figure 13A:
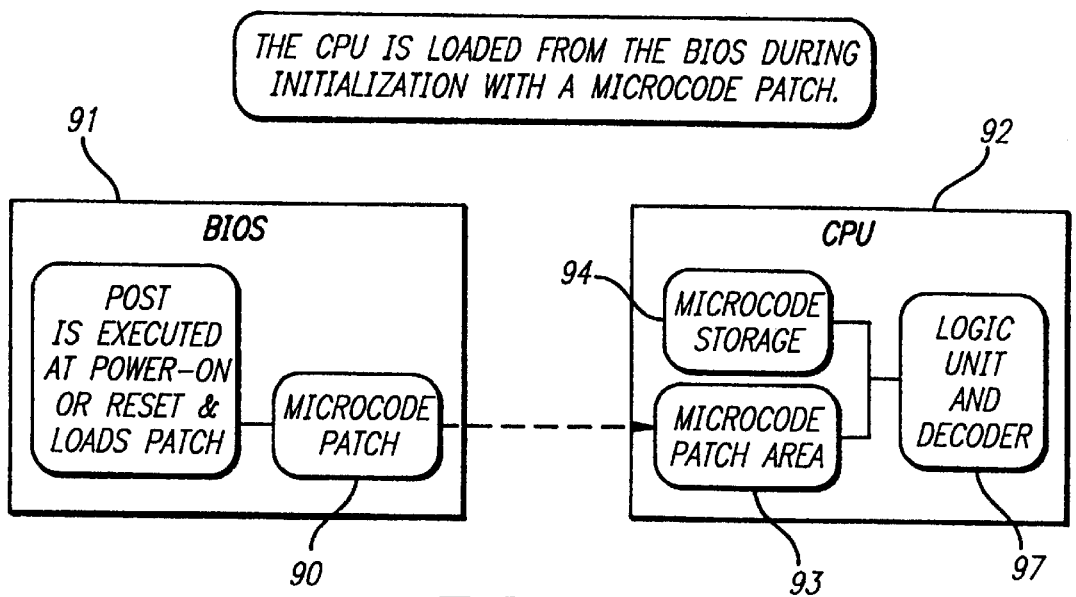
FIGS. 13A and B are schematic diagrams illustrating the embodiment in which the Agent resides in the CPU.
Figure 13B:
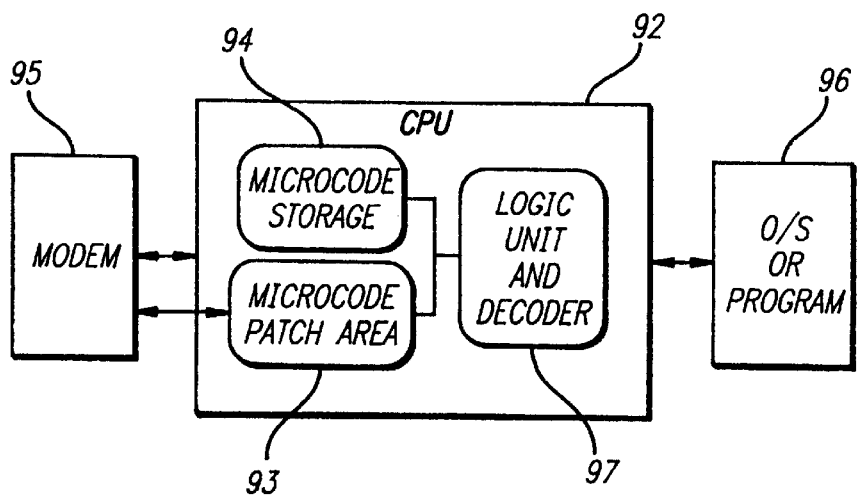

The Agent may be implemented in a CPU using an existing technology in many current microprocessors which allows patching of the microcode. The microcode is the architectural layer of the CPU which translates an external macrocode algorithm stored in volatile or non-volatile memory into a microprocessor's internal execution codes. Referring to FIG. 13A. the microcode patch 90 is formatted and encrypted according to each specific chip manufacturer's specifications. It is uploaded from the BIOS 91 to a microcode patch area 93 and/or microcode storage 94 in the CPU 92, after reset, during the POST initialization of the computer. The microcode patch 90 can implement all the functions of the conventional algorithmic Agent. Referring also to FIG. 13B, the Agent may take a similar form as the BIOS Agent or the SPC of Segmented Agent described before. The SPC in the microcode patch initiates communication with the modem 95 asynchronously of the normal code stream (i.e., of the operating system or application program 96) via the logic unit and decoder 97 of the CPU 92.

Examples of microprocessors which allows for microcode patching are the Pentium Pro and Pentium II processors developed by Intel Corporation. Of course it is also possible to implement the Agent in microcode or in logic circuitry inside the CPU during the manufacturing process in addition to the patching facility or exclusive of the patching facility of the CPU.

The CPU Agent may be configured to communicate with the host monitoring server via modem call and/or internet.

Hardware Agent

The Agent may be implemented in hard wired circuitry or a single integrated circuit using existing technology which takes an engineer's logic specification and translates into the data which is used to program, build, or design the hardware device or circuit. The hardware device or circuit would then execute according to the engineer's logic specification and perform the functions of the Agent by establishing a communications link and sending and receiving data packets in order to establish both the identification and location of the electronic device within which the hardware device or circuit is included, thereby simulating the algorithmic function of the Agent.

Host Identification and Filtering System

Figure 9:
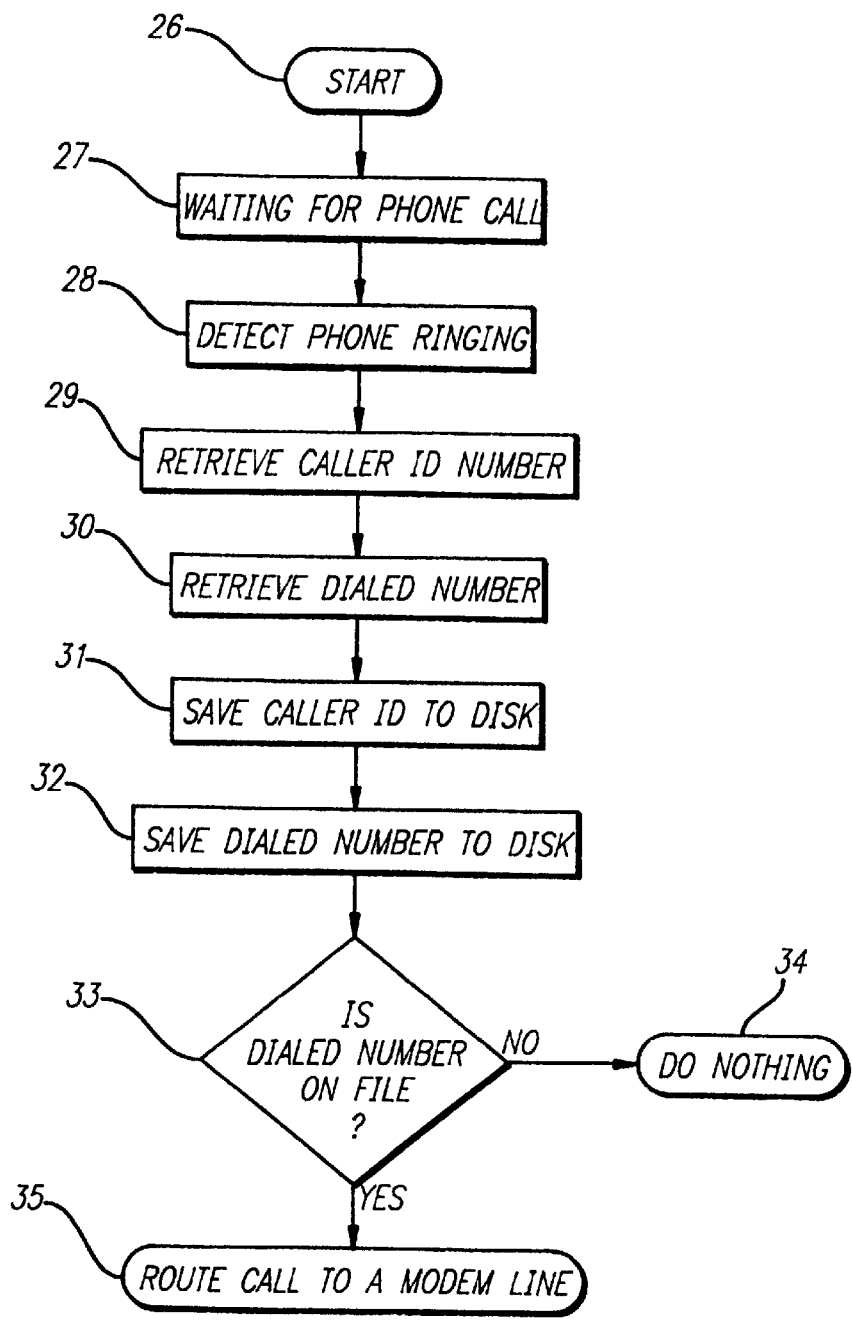
FIG. 9 is an illustrative embodiment in the form of a flowchart of a process by which the host identification and filtering subsystem identifies and filters out unwanted calls from agents.

The Host Identification and Filtering System identifies and filters out unwanted calls from agents. FIG. 9 is a flow diagram of the host identification and filtering program executed by host computer 3. Once the security program is executed 26, the voice board waits 27 for the ring signal on the telephone line 1. When a ring signal is detected 28, the voice board 2 acknowledges the incoming call by sending a signal to the telephone company 9B via telephone line 1 requesting that the caller ID and the dialed numbers be sent to it. The voice board then waits until these numbers are received 29, 30.

Once the caller ID and the dialed numbers have been received, they are saved to the hard disk 31, 32. The security program then compares the dialed numbers 33, which provide an encoded version of the serial number of the client computer 10 (coding scheme explained in detail below), against a list of serial numbers stored on the hard disk 4. If no match is found, the program lets the phone ring until the client computer 10 hangs up the telephone line 34. In the preferred embodiment, the client computer is programmed to hang up after 30 seconds of unanswered ringing. However, if a match is found, the security program routes the call to an appropriate receiving line connected to a modem 35, which answers the call. In an alternative embodiment, the host 3 answer all calls and the serial number of the client computer 10 is provided in a separate subsequent call from the client computer 10.

Encoding of the Client Computer Serial Number

Figure 10A:
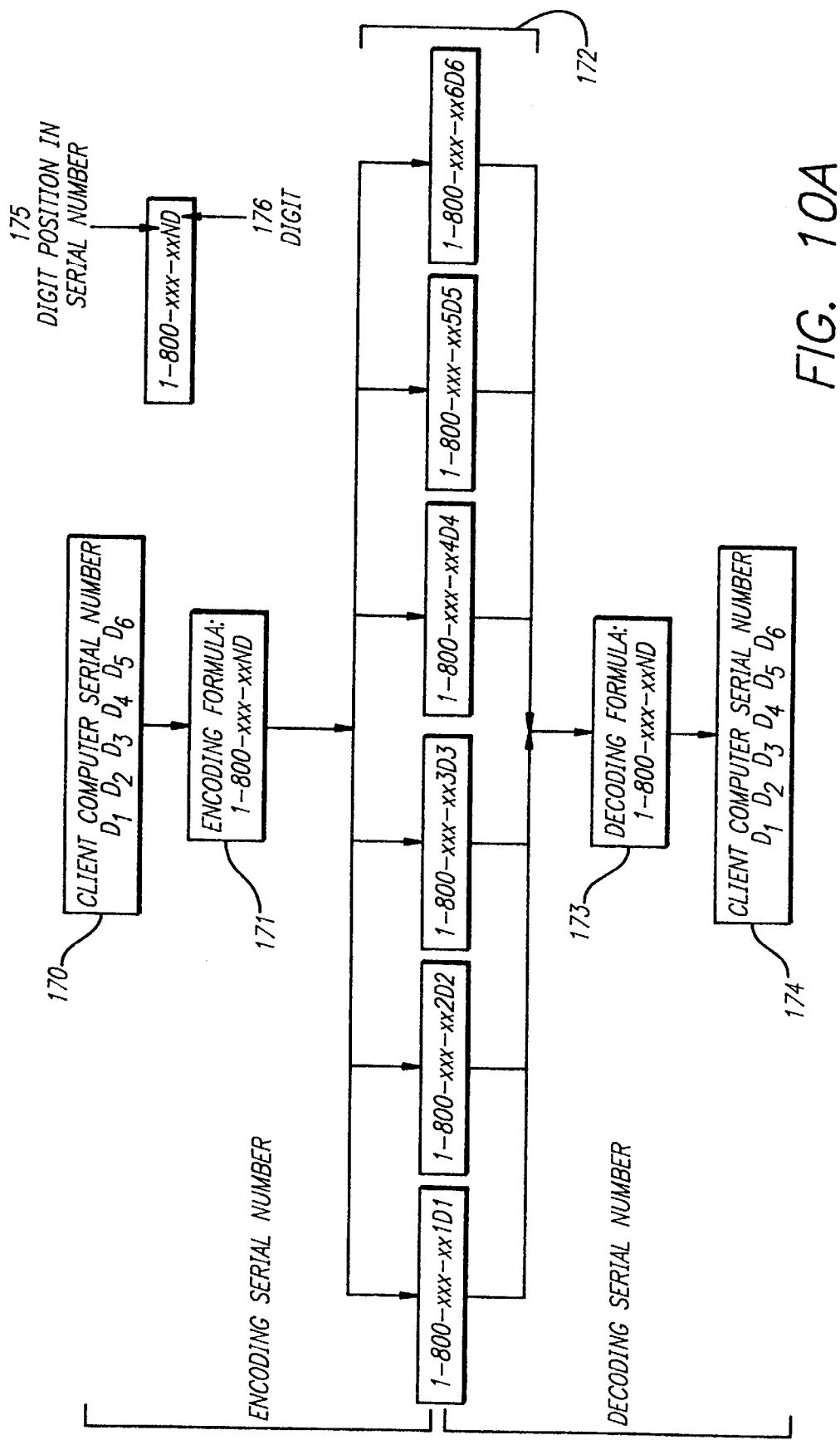
FIG. 10A is a schematic showing an illustrative embodiment of the encoding/decoding method whereby the monitoring service would have to subscribe to 60 telephone numbers.

Referring to FIG. 10A in one embodiment of the invention, the serial number of client computer 10 is encoded within the dialed numbers it sends to the host 3. In the preferred encoding methodology, the client computer transmits its six digit serial number 170 to the host via a series of six complete dialed phone numbers 172. The first eight dialed digits after the first "1" are meaningless. The ninth dialed digit "N" 175, indicates which digit position within the serial number that the tenth dialed number corresponds to. The tenth dialed digit "D" provides the Nth digit of the serial number. The host computer 3 receives the six complete dialed phone numbers 172 and decodes them 173 by looking at only the ninth and tenth dialed digits. The client computer serial number 174 is thus reproduced.

For example, in the sequence "800-996-5511", the only relevant digits are the "11" portion. The first "1" indicates that the digit immediate to its right (1) is the first digit in the serial number. Similarly, in the sequence "800-996-5526", the "2" indicates that the number immediate to its right (6) is the second number in the serial number. The client computer, in total, dials six numbers 172 in order to convey its six-digit serial number to the host.

In order to accommodate this method of serial number coding, the host monitoring system needs to subscribe to sixty different phone numbers. All sixty numbers should have the same first eight digits, and only vary from one another with respect to the last two digits. The ninth digit need only vary from "1" through "6" corresponding to the six digits within a serial code. However, the last digit must vary from "0" to "9".

Figure 10B:
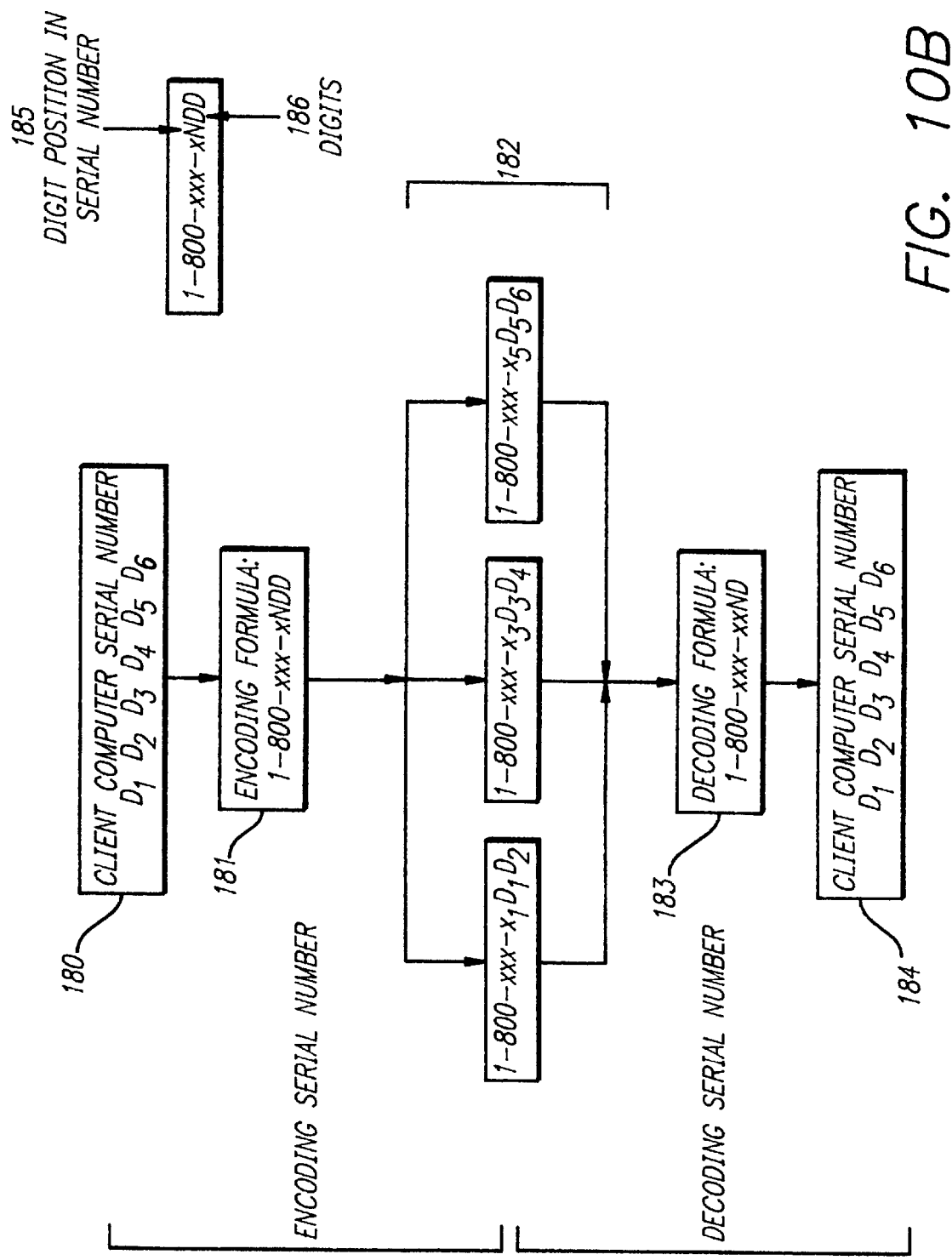
FIG. 10B is a schematic showing an illustrative embodiment of the encoding/decoding method whereby the monitoring service would have to subscribe to 300 telephone numbers.

Referring to FIG. 10B, the encoding methodology can alternatively be modified such that the client computer need only call the host three times to convey its serial number 180. According to this coding method, two digits of the serial number 186 would be transmitted in each call. Thus, the eighth dialed digit 185 would vary from "1" to "3", corresponding to the three packets of two digits 186 that make up the serial number 180. The ninth and tenth dialed digits 186 would vary from "0" through "9". However, this would require the operator of the monitoring system to subscribe to three hundred different phone numbers.

Host Processing, Auditing and Communication Subsystem

Figure 11A:
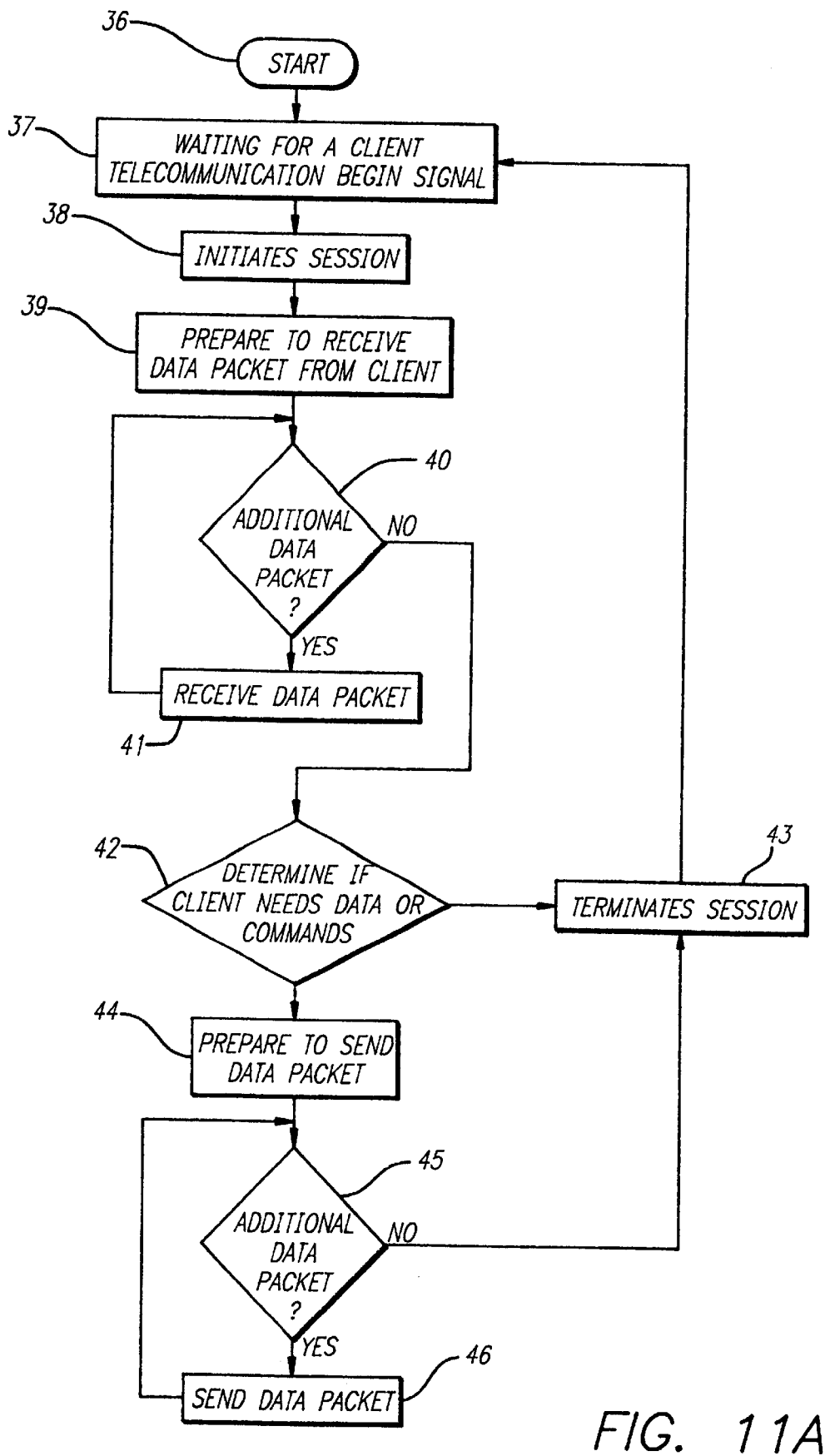
FIG. 11A is an illustrative embodiment in the form of a flowchart of a process by which the host telephone monitoring subsystem exchanges data with an agent.

The host processing, auditing and communication subsystem receives and transmits information to and from clients. FIG. 11A is a flow diagram of the host communication program executed by host computer 3. After the host computer 3 is powered on 36, communication equipment is instructed to wait 37 for the telecommunication begin signal from the client computer 10. The telecommunication equipment acknowledges the begin signal by initiating a session to communicate with the client computer 38 and preparing the host to receive data packets from the client 39. The program first establishes that the client computer is sending data packets and that it has received all of the packets 40, 41. Next, the program determines if the client has any data or commands to be sent to the host 42. If not, the session is terminated 43, and the cycle is repeated 37. When all data packets have been received, the program permits the host to send data packets to the client computer. The program prepares to send data packets 44, and then establishes that there are more data packets to be sent 45 before sending each packet 46. Once all data packets have been sent, the program terminates the session 43, hangs up the phone, and prepares to repeat the entire cycle 37. Host-side source codes are disclosed in the copending patent application Ser. Nos. 08/826,098 and 08/558,432 which had been incorporated by reference here.

Referring to FIG. 11B, the host processing, auditing and communication subsystem for the Internet application receives and transmits information to and from clients over the Internet. FIG. 11B is a flow diagram of the host communication program executed by host computer 3 in connection with the Internet application. After the host computer is powered on 36a, TCP/IP support is loaded and the computer waits for a DNS query from the client computer 36b. The host name is then extracted from the DNS query 36c. Next, the DNS request is decoded to determine the client computer identification 36d. A check is made to determine whether the computer has been stolen 36e. This is accomplished by comparing the identification number of the client computer with a list of reported lost or stolen computers which is stored by the host computer. If it has been stolen a suitable message 36f is returned to the client computer 10. In the preferred embodiment, the message is provided by setting the IP address of the next transmission to the client computer to "204.174.10.1" 36f. If the client computer is not stolen, an alternate message is returned 36g.

In the preferred embodiment this is achieved by setting the IP address to "207.174.10.16" 36g. The host uses either of these two IP addresses to form a response to the DNS query received from the client computer 36h. The host then sends its response to the client computer 36i. The host also records the transaction on the hard disk. The host then prepares to repeat the entire cycle 36b.

Referring to FIG. 11C, the manner in which client identification is encoded is illustrated. FIG. 11C shows the various components of a host name which is used to form a DNS request. The host name, according to one embodiment of the invention, is a string of characters including the date and time 37, encoded client identification 38, and domain name 39. The encoded client identification 38 is extracted from the host name for decoding at the host Internet subsystem 9y.

Host Notification Subsystem

Figure 12:
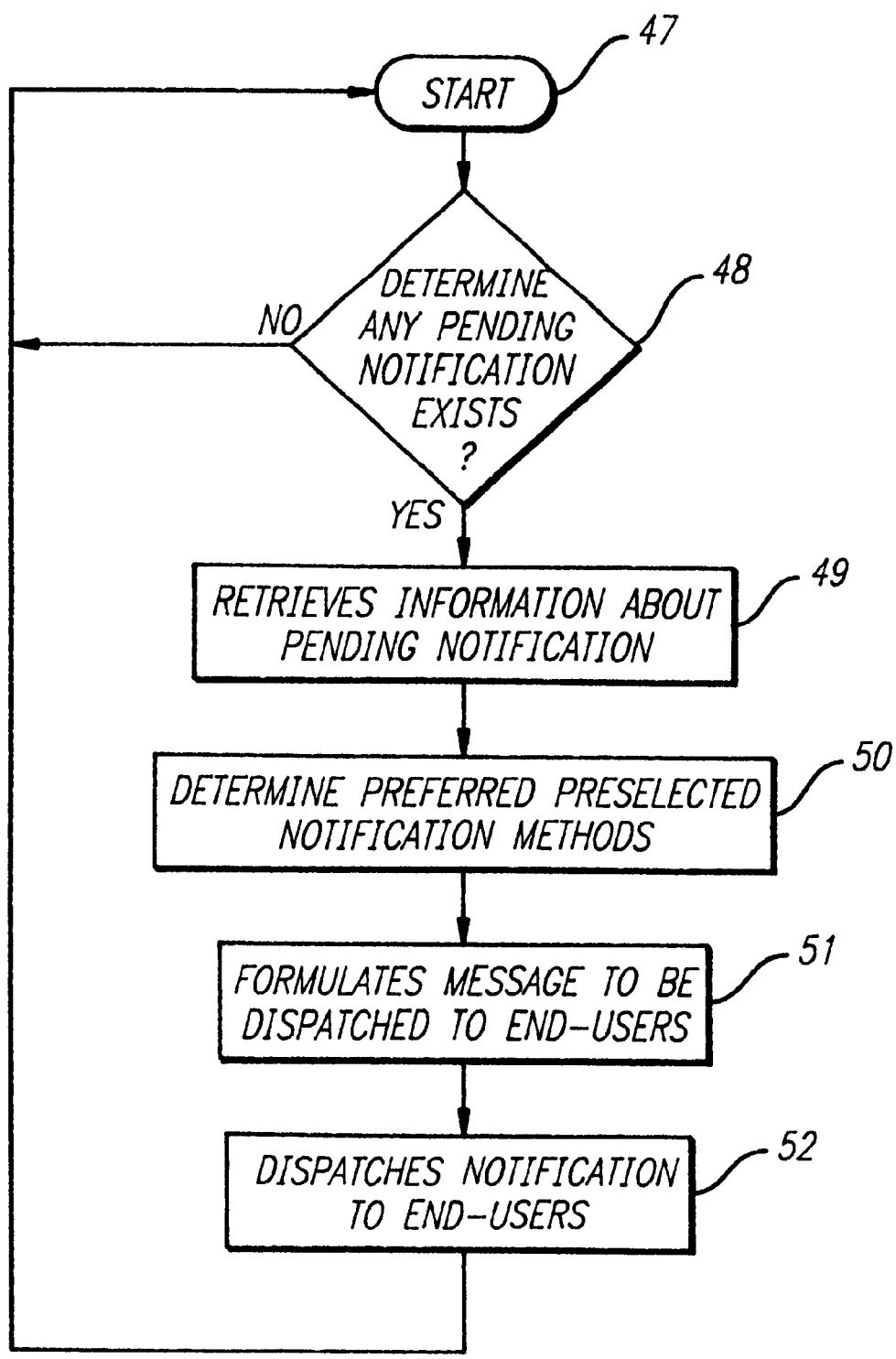
FIG. 12 is an illustrative embodiment in the form of a flowchart of the process by which the host notification subsystem, contained within the host computer, notifies end-users of the status of monitored devices.

The host notification subsystem notifies the end-users regarding the status of their electronic devices. In FIG. 1, various methods of notification such as; electronic mail N1, fax N2, paging N4, and telephone call N3, are depicted. FIG. 12 is a flow diagram of the host notification program executed by host computer 3. The host notification program determines whether there are any pending notification instructions or commands 48. If there are pending notifications, the information is retrieved 49. The program then determines the preferred preselected notification method 50, and formulates the message to be dispatched 51 according to the preselected notification method. This message is dispatched to the end-user 52. After dispatching the message, the program repeats the entire cycle 47. Host-side source codes are disclosed in the copending patent application Ser. Nos. 08/826,098 and 08/558,432 which had been incorporated by reference herein.

Variations and Alternatives

The above description relates to the agent security system installed and operating in a conventional PC with an Intel 80X86 microprocessor or equivalent and with a conventional MS-DOS or PC-DOS operating system. It will be recognized that the system can be modified to fit other types of computers including, for example, those sold under the trademark Macintosh. The system can easily be modified to suit other types of operating systems or computers as they develop.

The above system is also intended to be added to existing computers without physical alteration. Another approach is to modify the ROM of such computers to contain the agent security system as shown in FIG. 14D. The agent security system also may be incorporated into the ROM of portable computers, cellular telephones or other such items when they are manufactured. FIG. 14D above describes the loading of the system from such a modified ROM.

One embodiment of the invention uses a modem connected or built-in to a computer. In the future it is likely that telephone systems will be digitized, thus obviating the need for a modem. The scope of this invention contemplates such digitized systems.

The system could also be included in the ROM of a cellular telephone. In this case, the program would hide the outgoing calls from the user by silencing audio signals and maintaining a normal screen display. It is also conceivable that portable computers can be supplied with integral cellular telephones modified in this manner or with some other telecommunication device.

The main telecommunication criteria for this agent security system is that the outgoing transmission (wire, radio signal or otherwise) be received by a switching mechanism, and contain information that causes the switching mechanism to forward the information received to a remote station. Presently, this information is a telephone number and/or a DNS query. But other indicia of the remote station may be substituted in alternative switchable communications systems without departing from the scope of this invention.

Covering Peripherals and Software

Figure 16:
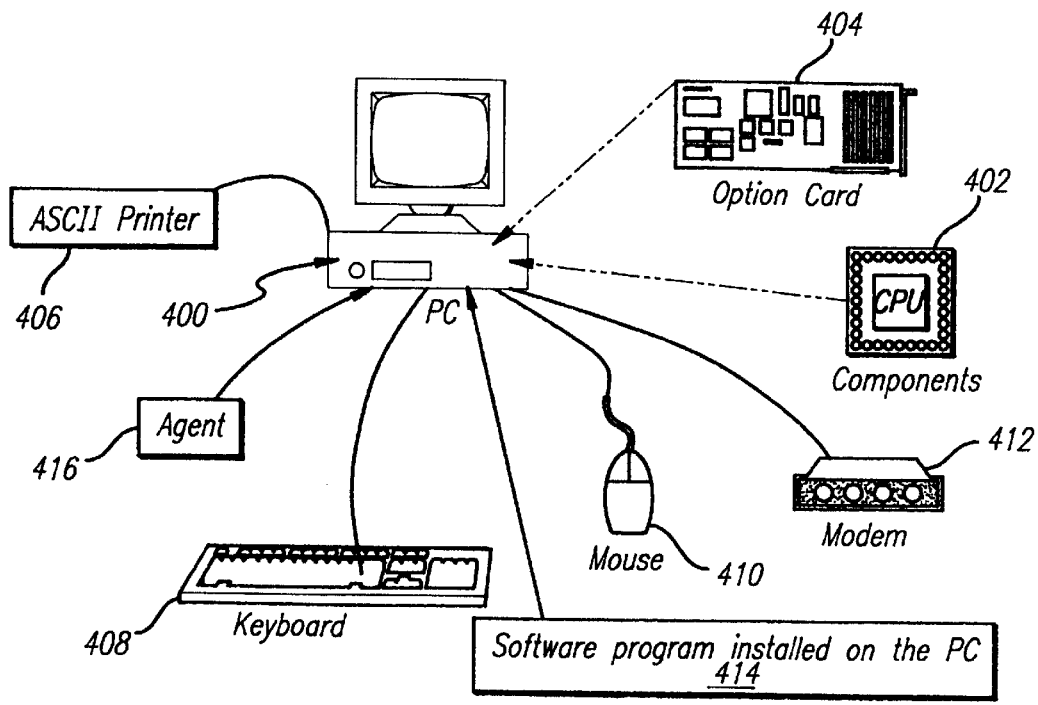
FIG. 16 is a drawing showing some elements which may be installed in conjunction with a PC.

Referring now to FIG. 16, modern electronic devices, such as personal computer 400, are associated with a large number of valuable assets in the form of internal components such as processor 402 and option card 404, attached peripherals such as printer 406, keyboard 408, mouse 410 and modem 412, and installed software programs such as installed program 414.

The security function of the agent discussed above may be extended to encompass identifying, listing, reporting, locating and recovering these associated assets. This method and apparatus could also be used to reliably track and manage the type of assets being deployed in an organization's work force. This method can immediately report the variance should any unauthorized component change take place.

This security apparatus and method utilizes a hidden, tamper-proof agent 416 installed on an electronic device such as computer 400 for initiating communications and locating electronic devices as previously disclosed herein. The agent is also capable of determining the identifying indicia, such as a unique serial number, of a component or peripheral.

Figures 17A, 17B:
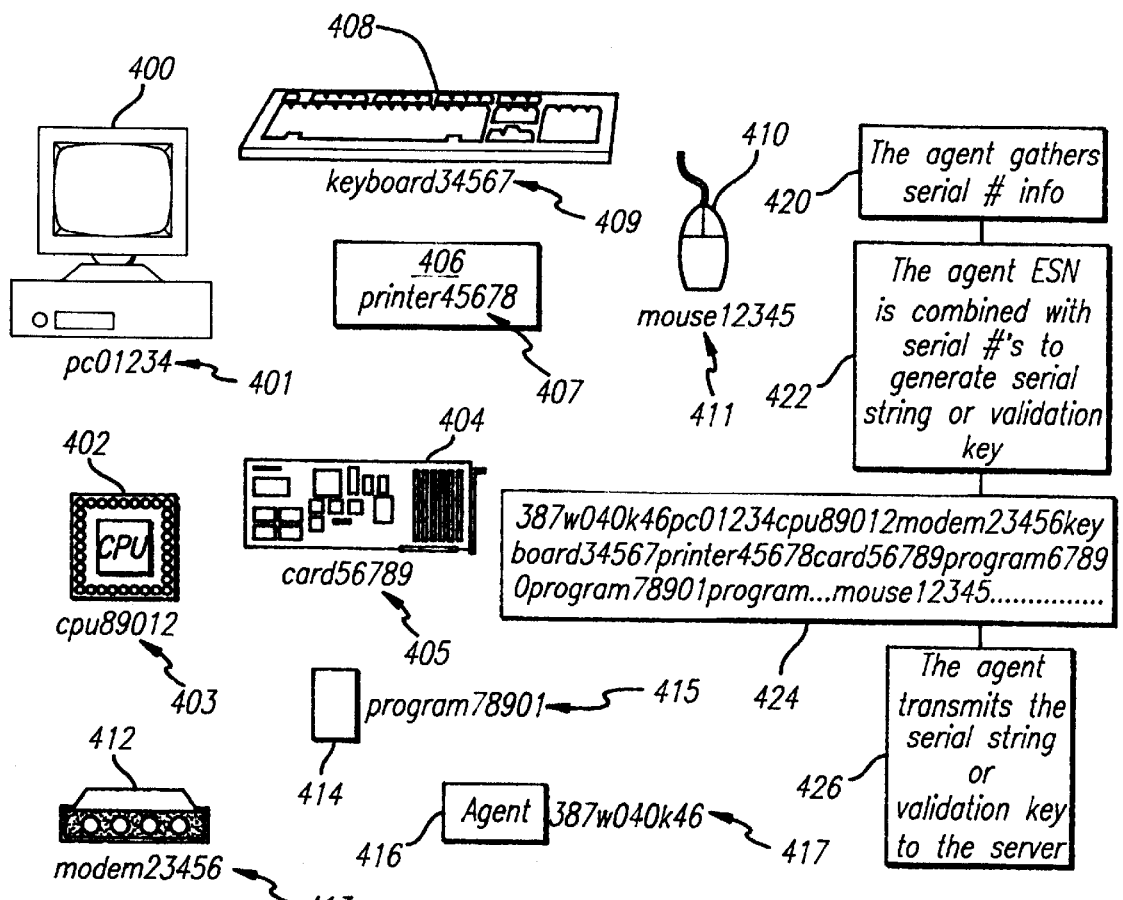
FIG. 17A is a drawing showing ID number that are associated with elements which may be installed in conjunction with a PC.
FIG. 17B is a high level flow diagram showing steps used by an agent tracking associated element ID numbers.
Figure 20:
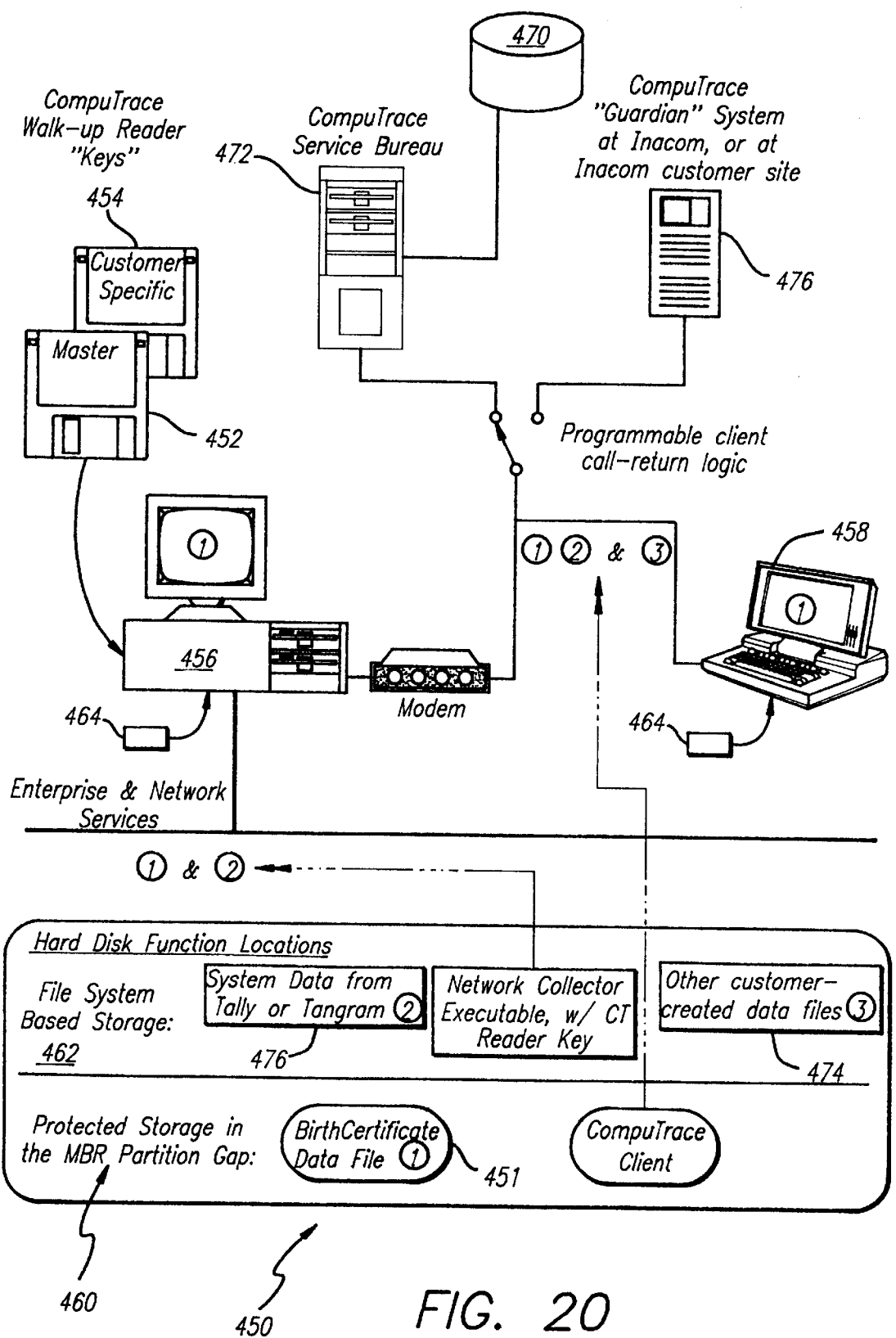
FIG. 20 is a high level diagram showing computrace agent elements associated with a birth certificate file.

Referring now to FIG. 17A, each computer, peripheral and component such as computer 400, CPU 402, option card 404, printer 406, keyboard 408, mouse 410 modem 412, and software program 414, and agent 416 or other associated peripheral or component are assigned an identifying indicia, such as unique serial numbers 401, 403, 405, 407, 409, 411, 413, 415 and 417 respectively. The serial number of each component comes from the manufacturer or is embedded at the time of assembly or installation of the component, peripheral or software.

Referring now to FIG. 17B, at step 420, agent 416 within an electronic device such as computer 400 periodically gathers the serial numbers 401, 403, 405, 407, 409, 411, 413, 415 and 417 of computer 400 and each of the components and software 402, 404, 406, 408, 410, 412, 414 and 416 respectively. On a regular basis, or in the event of a variance between a stored string of previously recorded serial numbers, at step 422 agent 416 transmits its electronic serial number 417 plus the string of discovered serial numbers as serial string 424 to the server The server stores serial string 424 or a validation key 428 derived from serial string 424 in a database.

The component validation key is comprised of the agent's ESN and all the serial numbers of the associated components. One method is to string the ESN and serial numbers end-to-end. This method is illustrated in FIG. 2.

After formulating validation key 428, agent 416 sends validation key 428 to server 430. The identity and the location of agent 416 is recorded, as previously disclosed, and validation key 428 is archived on storage device 432. All further communications with agent 416 cause server 430 to check subsequently transmitted validation key 429 for variances against the original archived validation key 428. Server 430 may also check validation key 428 against records of stolen components or software. Any discrepancies may be queued for appropriate action.

When new components and software are added to an existing configuration, validation key 428 will change to reflect the configuration modifications. Each modification so detected, will cause a variance in validation key 428. These variances will be checked against stored information 434 at server 430 and validated. The validation process will include checks against records 435–439 of stolen components and software, such as record 439 of duplicated identification numbers (as commonly occurs in component and software piracy), and records 440 authenticating proper final assembly by manufacturers. This validation process in illustrated in FIG. 19.

Manufacturers experience losses of components and software before final assembly of the electronic unit. Since this method and apparatus identifies and locates individual components and software, the information collected may be used to initiate recovery of specific components and software as well as the complete unit. If the electronic device, such as a PC, is misappropriated before final assembly, some of the components may not yet have been imprinted with a unique number. The absence of this number may also be an indicator of an invalid or illegal configuration.

The Agent can also be used to regularly upload the system, software & hardware configuration information of the Personal Computer. The agent is capable of reading a hidden file termed the "PC's Birth Certificate".

Birth Certificate" Repository & Reader

PC "Birth Certificate" 450 refers to a small data file 451 which contains certain static and dynamic information pertaining to a specific PC such as PC 456 or portable 458 (serial number, asset tag number, invoice information, etc.). The creation, content, and format of the Birth Certificate 450 is configurable.

The agent may provide a method for encrypting and storing Birth Certificate 450 in a protected area 460 of PC hard-disk 462.

The agent retrieves the Birth Certificate using a Reader program which serves as a secure key. Only personnel in possession of a "master" Reader 452, or customers who have licensed a "private" Reader 454 will be able to access Birth Certificate information. The Reader may reside on a floppy disk such as disk 452 or 454.

Remote Computer Monitoring Software

Agent 464 silently calls into monitoring center 472 on a periodic (programmable) basis. Call and other PC asset management activity is logged, and reported to customers on-demand via the web-based Online Monitoring Service 468. The online monitoring service database 470 may include the following:

Call-in phone number (retrieval option includes: name and address),

Birth Certificate information such as file 451,

Dynamic System information files such as file 476 (NetCensus, Asset Insight, etc.)

Customer-created information files such as file 474

The above data will be collected, aggregated per customer, and sent to a $3^{rd}$ party data center on a regular basis. Stand-alone systems such as system 476 may be installed within the data center, or on-site at customer locations.

CompuTrace is designed as a system to track the physical location of computers. The CompuTrace Agent such as agent A of FIG. 1 is installed on a remote computer A1 to be monitored and through the use of (i) the public switched telephone network B1, (ii) the Internet B5, and (iii) local area networks B7, the CompuTrace server 3 maintains a database of records on computer A1's location and movements.

Tracking information is collected during periodic telephone calls to the CompuTrace server 3; wherein server 3 identifies the unique agent A and obtains the phone number from which that call has been made.

Once installed, the operation of the remote CompuTrace software is invisible to the user, and calls are made without the user's explicit awareness.

Overview of the CompuTrace BIOS Agent.

The core function of the CompuTrace Agent such as agent A, is to initiate independent transactions with a monitoring server 3 at regular intervals. This function has been adapted to work under an SMM environment. This subset of agent functionality is described as the Secure Protocol Component 752 (SPC) shown in FIG. 7A.

SMM is triggered by a System Management Interrupt (SMI) event. These SMI events are triggered by hardware and are serviced in Operating System (OS) independent memory space. This feature of SMM enhances the security of the SPC by effectively hiding the SPC from applications executing under the control of the OS.

The technical challenge is to successfully establish a link with the monitoring server and reliably send and receive packets of data from the SMM environment, which (because it executes outside of OS control) is restricted in both the frequency and latency of SMI events.

The Server Interface

In order to understand the role of the SPC, it is necessary to describe its interface with the monitoring server. The subset of transactions described below are the minimum required to perform the security function of a CompuTrace Agent.

A CompuTrace SPC transaction consists of the following steps:

Step 652, The SPC initiates communication link 654 to the CompuTrace Server, The SPC and Server connect, The SPC reports the remote computer's time/date and the CompuTrace ID number, The Server logs this data and determines the status of the remote computer, The Server sends a series of commands to the SPC, The Telephone call is terminated.

Server to SPC commands supported by the SPC are as follows:

Set next call date

Notifies the SPC of the date and time at which to perform the next call-out. This function is executed as a standard part of every call-out transaction.

Set callout phone number

Notifies the SPC of a new phone number to which it should direct its call-outs. The SPC will direct all subsequent call-outs to this phone number until otherwise instructed.

Disable CompuTrace

The SPC is disabled and will not call out within the natural lifetime of the unit. May be implemented as a sub-function of "Set next call date."

Figure 21:
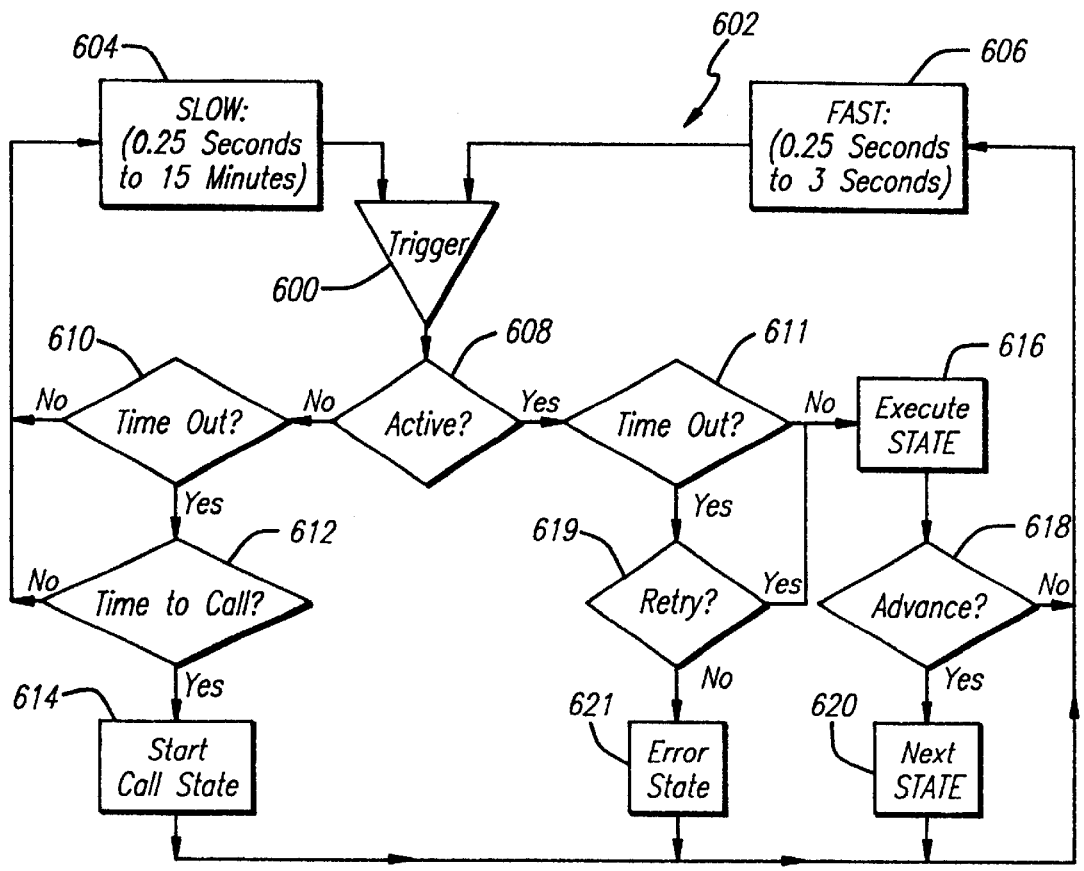
FIG. 21 is a high level diagram showing an event loop of a secure protocol component.

The Event Loop of the SPC:

The SPC is constructed as a timed event-driven state machine. A simplified diagram of event loop 602 is illustrated in FIG. 21.

At the top center of the diagram, Trigger 600 is shown to drive the timing of events to the state machine of the SPC. Trigger 600 is activated at regular frequencies, but the exact frequency of the Triggers is relatively unimportant to the successful operation of the SPC.

As illustrated, the sources of the Trigger are Slow 604 (in the range of 0.25 seconds to 15 minutes) and Fast 606 (in the range of 0.25 seconds to 3 seconds). Sources Slow 604 and Fast 606 are determined by the current execution state 608 of the SPC.

In the initial execution state the Trigger source is Slow 604, the execution state 608 is false, and Time Out state 610 is calculated to determine if Time to Call 612 should be evaluated (exceeding Next Call Out Date). If it is Time to Call, execution state 608 of the SPC is changed to Start Call 614. Start Call state 614 sets the execution state 608 true and all Active execution states use Fast 606 source. Fast 606 source drives the evaluation of all communication states as well as some additional housekeeping states.

While execution state 608 is true, the Time Out state 611 is evaluated at the rate of Fast 606. If there is no Time Out, execution state 616 will Execute and be evaluated at 618 to determine if the SPC should Advance to Next state 620. The execution state of the SPC will remain unchanged until each state is evaluated successfully or a Time Out occurs. In the event that a Time Out occurs, the state will Retry 619 as appropriate or assume an Error state 621. [Note that there are some special communications driven error states not shown on this simplified diagram.]

Upon the successful completion of all execution states 608, execution state 608 is reset to false and Slow 604 Trigger again drives the state machine to evaluate the Time to Call condition.

Communications in the SPC:

The communications in the SPC are not interrupt driven in the conventional sense. Driving communications with UART interrupts would conflict with the requirements of SMM. The communications and the communication protocol are driven by the Fast Trigger source explained above. Remember that the Fast Trigger source can be varied in the range of 0.25 seconds to 3 seconds as required to improve the latency of SMM.

Figure 22:
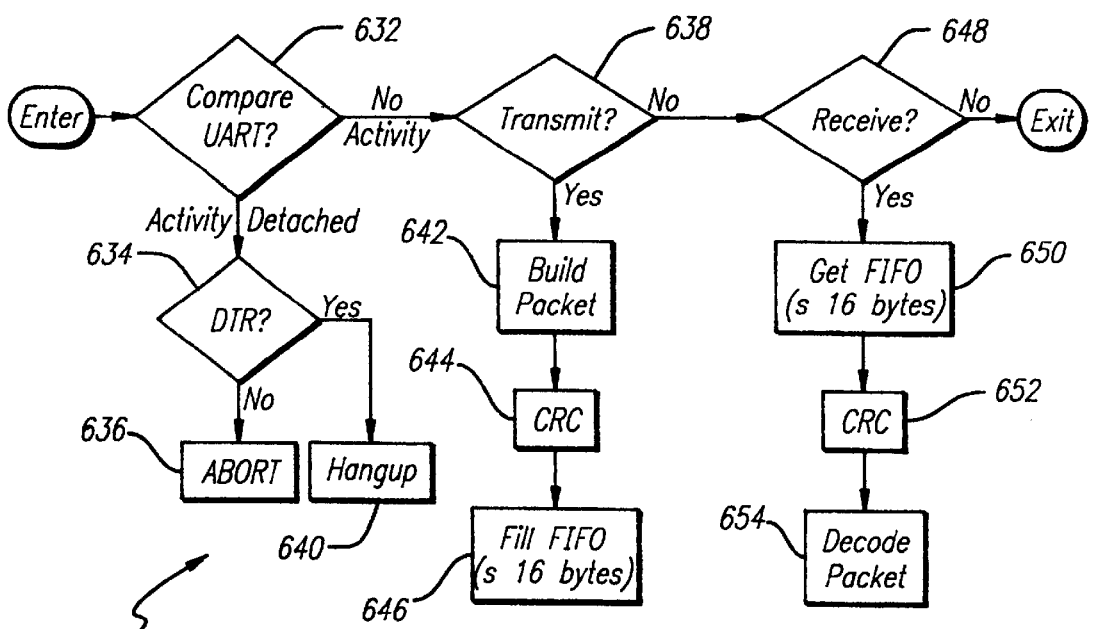
FIG. 22 is a high level diagram showing basic protocol of the secure protocol component.

The Basic Protocol of the SPC is illustrated in FIG. 22. This figure applies to the execution of the communication state subset of all Active states of the SPC.

Transaction 630 begins at Compare UART state 632. The status of the UART is compared and evaluated to determine if activity has occurred outside of the execution environment of the SPC. In this simplified drawing of contention handling, if No Activity is detected, communications continue at step 638, otherwise, if DTR 634 has been reset, the communications will Abort at step 636. If DTR 634 is still active, the call will Hang-up at step 640.

Transaction packets 631 with the monitoring server 633 are designed to fit within FIFO 635 of a UART 637. This enables a polling method of communications in which the XMIT FIFO of the UART is filled with 16 bytes, or RECEIVER 639 is read for 16 bytes at each Fast 606 Trigger as appropriate.

If in a XMIT state 638, the SPC will Build the Packet 642, calculate the CRC 644, and then fill the FIFO of the UART with up to 16 bytes 646. The SPC returns to the OS and waits for the next Fast 606 Trigger. Packet data 631 sits in FIFO 635 of UART 637 awaiting transmission across the link.

If in a RECEIVE state 648, the SPC will Get the FIFO data for up to 16 bytes 650, check the CRC 652, and Decode the Packet 654. The receive FIFO of the UART may be empty, contain some of the packet bytes, or all of the packet bytes. The SPC did not need to respond to a UART interrupt and returns to the OS to wait until the next Fast Trigger to complete the transaction.

Resources for the SPC:

The actual size of the SPC can only be estimated until implemented in a specific BIOS, but the protocol and housekeeping code fit in about 2K. Extra code will be required to provide the Slow and Fast Triggers and to manipulate configuration data.

In the initial implementation, the triggers are generated by the legacy USB timer, which is shared by the legacy USB code. If the legacy USB support is not enabled, the timer can be controlled directly or shared with another function. This code requirement is fairly small since it is implemented by sharing existing functions for manipulating the chipset.

The housekeeping code does not need to reside entirely in post boot space. Some 20 bytes of persistent configuration needs to be stored and can reside in CMOS, the ESCD device, or both. This data can be stored in semi-persistent data space from within the SPC, such as CMOS, and then transferred to more persistent storage, such as the flash device, during the next boot cycle.

The interface code for a software driver needs to be implemented and will use the standard software SMI mechanisms.

This additional code should take no more than 2K compressed, for a total of no more than 4K of flash real estate. The dynamic requirements are around 2K of SMM space in the current implementation, but the SMM handler can vary the location of the SPC code. Some key parts of the SPC, especially the writeable data segment, must remain in SMM space. Currently this data segment is only about 48 bytes but may need to grow to around 100 bytes if required. If the state machine can also be contained in SMM space, the security of the SPC is enhanced.

The SPC Drivers

The SPC can be supplemented by software drivers:

Since the SPC is a subset of the existing product, the full functionality of CompuTrace will be provided by operating system dependent drivers. The CompuTrace Agent drivers have been developed for DOS, Win 31, Win 95, and Win NT.

These drivers will be enhanced to detect and communicate with the SPC. The API for communicating with the SPC will closely parallel the communications interface with the Server. The drivers will deposit transactions for the SPC to process when activated at a later time. By designing the API in this fashion, the resource requirements of the SPC will be minimized.

Figure 23:
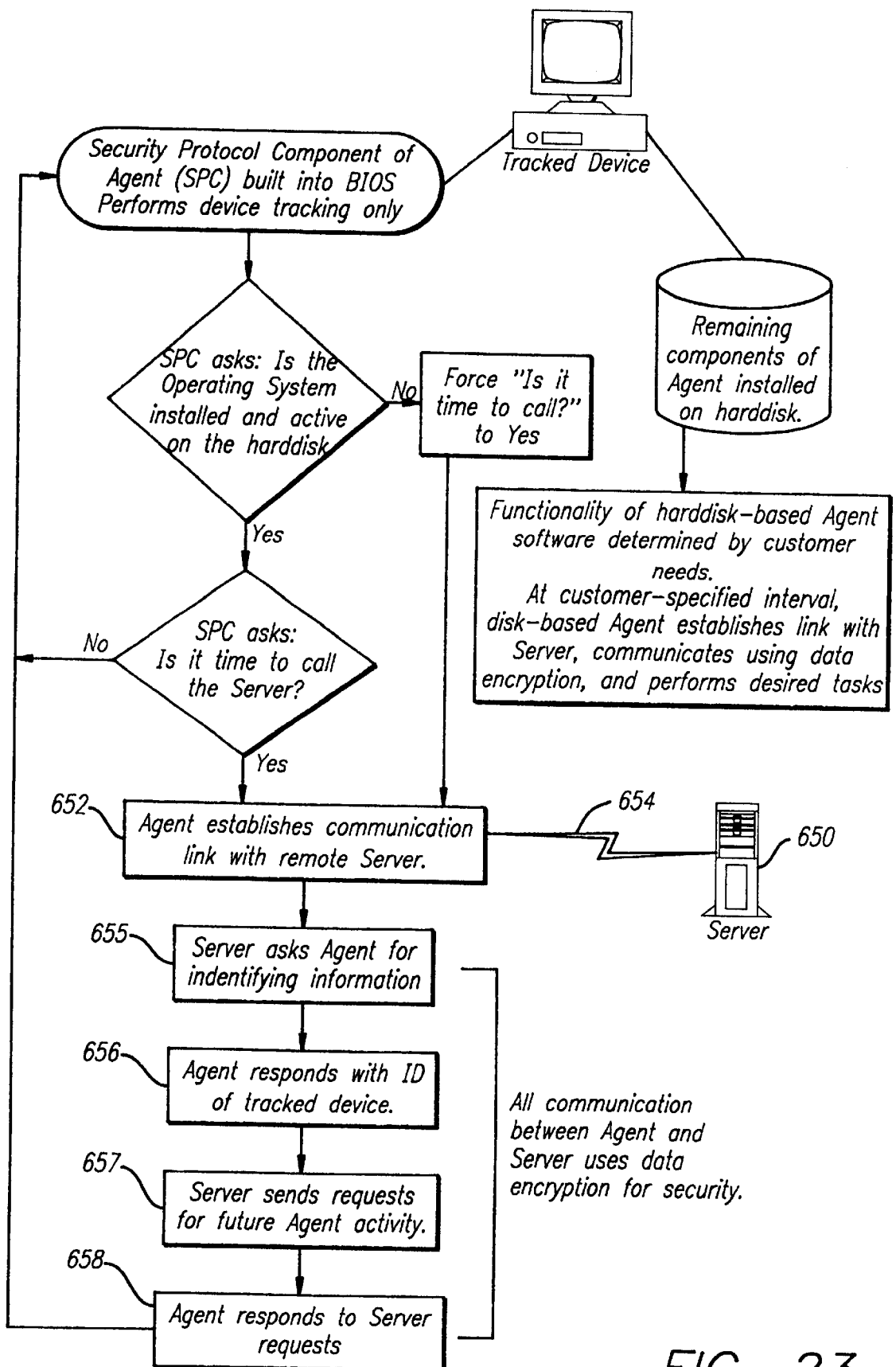
FIG. 23 is a high level diagram of the steps used by the secure protocol component.

An illustration of the relationship between the software drivers and the SPC is contained in FIG. 23. This figure shows how the SPC is a security backup for the drivers and is usually disabled by transactions with software drivers. If the software drivers have not communicated recently with the SPC, the SPC will automatically complete the transaction with the monitoring server.

OEM configurations of the SPC:

We have identified four potential OEM configurations which embed the SPC.

The SPC is disabled

Provided for future use by the full CompuTrace driver suite.

The SPC operates independently

Provided for protecting the unit from the point of manufacture, through the channel, then disabled when identified as a legitimate sale.

The SPC is bundled with the full CompuTrace driver suite.

Provided as a value-added service for end-users direct from the point of manufacture.

The SPC operates independently and is bundled with the full CompuTrace driver suite.

A combination of channel protection and value-added protection for the end-user.

This application contemplates sending and receiving signals from a client computer to a host system through a global network system. The Internet has been described in this application as merely one application of the invention. It is contemplated that this invention can and will be applied to other global network systems. Thus, the specific disclosure addressed to the Internet should not be construed as a limitation as to the scope of the invention, but rather should be considered to be merely one embodiment of the invention.

It will be understood by someone skilled in the art that many of the details described above are by way of example only and are not intended to limit the scope of the invention which is to be interpreted with reference to the claims which follow.

We claim:

1. A method for tracing an electronic device having an agent initiating communication and providing identifying indicia to a host system, said electronic device connectable to said host system through a global network, said method comprising the steps of:
   automatically providing said host system with said identifying indicia through said global network for determining the identity of said electronic device; and
   providing said host system with one or more global network communication links used to enable transmission between said electronic device and said host system, said transmission via said communication links used for determining the location of said electronic device.

2. The method of claim 1 wherein said global network includes Internet.

3. The method of claim 1 wherein said electronic device is further connected to said host system through a telephone network, and said method further comprising the steps of:
   providing said identifying indicia to said host system through said telephone network; and
determining the location of said electronic device by tracing the source of said identifying indicia within said telephone network.

4. The method of claim 1 wherein said electronic device is further connected to said host system through a cablevision network, and said method further comprising the steps of:
   providing said identifying indicia to said host system through said cablevision network; and
determining the location of said electronic device by tracing the source of said identifying indicia within said cablevision network.

5. The method of claim 1 wherein said electronic device is further connected to said host system through a wireless radio frequency network, and said method further comprising the steps of
   providing said identifying indicia to said host system through said wireless radio frequency network; and
   determining the location of said electronic device by tracing the source of said identifying indicia within said wireless radio frequency network.

6. The method of claim 1 wherein said electronic device is further connected to said host system through a wireless microwave network, and said method further comprising the steps of:
   providing said identifying indicia to said host system through said wireless microwave network; and
   determining the location of said electronic device by tracing the source of said identifying indicia within said wireless microwave network.

7. The method of claim 3 wherein said step of providing said host system with said identifying indicia through said global network, and said step of providing said identifying indicia to said host system through said telephone network occur at predetermined intervals.

8. The method of claim 7 wherein said electronic device is lost or stolen and said method further including the step of tracing lost or stolen electronic devices.

9. The method of claim 2 wherein said step of providing said host system with said one or more of the Internet communication links i accomplished using a traceroute routine.

10. The method of claim 1 wherein said step of providing said host system with said identifying indicia is accomplished by sending a data packet including address information relating to the source of the global network transmission.

11. The method of claim 2 wherein said step of providing said host system with said identifying indicia is accomplished by sending a domain name service query with said identifying indicia encoded therein.

12. The method of claim 2 further including the step of providing a list of lost or stolen electronic devices to said host system and comparing said list of lost or stolen electronic devices with said identifying indicia to determine if said electronic device is lost or stolen.

13. The method of claim 12 wherein said host system sends a signal through said Internet to said electronic device if it is determined to be lost or stolen indicating that said lost or stolen electronic device should initiate a traceroute routine.

14. The method of claim 12 wherein said host system sends a signal through said Internet to said electronic device if it has been determined to be lost or stolen indicating that said electronic device should initiate a call to said host system via said telephone network.

15. The method of claim 11 wherein said identifying indicia is encoded within said domain name service query according to a predetermined scheme.

16. The method of claim 15 wherein said host system decodes said identifying indicia to determine the identity of said electronic device.

17. The method of claim 1 wherein said electronic device is a computer having a hard drive.

18. The method of claim 17 further including the step of providing said agent with deflection means to enable said agent to resist disablement attempts and evade detection.

19. The method of claim 18 wherein said deflection means deflects read and write attempts to the location where said agent is disposed.

20. The method of claim 1 wherein said step of evading detection is accomplished by providing an agent which is operable without interfering with the normal operation of said electronic device.

21. The method of claim 17 wherein said step of loading said agent within said computer is accomplished by loading said agent within the boot sector of said hard drive.

22. The method of claim 17 wherein said step of loading said agent within said computer is accomplished by loading said agent within the partition sector of said hard drive.

23. The method of claim 17 wherein said step of loading said agent within said computer is accomplished by loading said agent within an operating system file on said hard drive.

24. The method of claim 23 wherein said operating system is MS-DOS and said operating system file is IO.SYS.

25. The method of claim 23 wherein said operating system is PC-DOS and said operating system file is IBM-BIO.COM.

26. The method of claim 17 wherein said step of loading said agent within said computer is accomplished by loading said agent on the ROM BIOS.

27. The method of claim 17 wherein said agent is a terminated and stay resident program.

28. The method of claim 17 wherein said agent is a virtual device driver program.

29. The method of claim 17 wherein said agent is an application program.

30. The method of claim 17 wherein said agent is a file filter program.

31. The method of claim 1 wherein said agent provides said identifying indicia automatically and without user intervention.

32. The method of claim 31 wherein said step of providing said host system with said identifying indicia occurs without causing audible or visible signals to be emitted from said electronic device.

33. The method of claim 2 wherein the communication link between said electronic device and said host system is provided through a link to a private network connection to the Internet.

34. The method of claim 2 wherein the communication link between said electronic device and said host system is provided through a telephone line connected to an Internet provider.

35. The method of claim 1 further comprising the step of assigning said identifying indicia to said agent wherein said identifying indicia comprises a unique electronic serial number, said electronic serial number for enabling the determination of the identity of said electronic device associated with said agent.

36. The method of claim 1 further comprising the step of loading said agent within said electronic device for with said host system such that said agent evades detection.

37. A method for monitoring an electronic device connectable to a host system through a global network, said electronic device having an agent, said agent providing identifying indicia for determining the identity of said electronic device, said method comprising the steps of:
    loading said agent within said device such that said agent evades detection; and
    automatically providing said host system with said identifying indicia through said network without causing audible or visual signals to be emitted from said electronic device.

38. The method of claim 37 wherein said electronic device is further connected to said host system through a telephone network, and said method further includes the step of providing said identifying indicia to said host system through said telephone network.

39. The method of claim 37 wherein said step of providing said identifying indicia occurs automatically and without human intervention.

40. The method of claim 38 wherein said step of providing said host system with said identifying indicia through said global network, and said step of providing said identifying indicia to said host system through said telephone network occur at predetermined intervals.

41. The method of claim 36 wherein said global network is the Internet and said step of providing said identifying indicia is accomplished by encoding a domain name service query to include said identifying indicia.

42. The method of claim 7 or 40 wherein said step of providing said host system with said identifying indicia through said global network, and said step of providing said identifying indicia to said host system through said telephone network occur simultaneously.

43. The method of claim 1 wherein the Agent is encoded in one or more forms, including software, firmware and hardware.

44. The method of claim 43 wherein the Agent is encoded in one or more device components in the electronic device, including internal non-volatile memory device, communication device, processor, digital signal processor, integrated circuit and hardware circuit.

45. The method of claim 44 wherein the internal non-volatile memory device includes one of ROM BIOS, ROM, EPROM, EEPROM and Flash ROM.

46. The method of claim 44 wherein the communication device is a modem.

47. The method of claim 46 wherein the Agent establishes communication with the host system by using a command function which initializes the communication and a call management function which interfaces with the host system.

48. The method of claim 44 wherein the Agent establishes communication with the host system independent of normal operations of the electronic device.

49. The method of claim 42 wherein the Agent is activated independent of normal system operations of the electronic device.

50. The method of claim 42 wherein the Agent is activated prior to normal system operations of the electronic device.

51. The method of claim 49 wherein the Agent is activated by loading into an internal volatile memory and running the Agent prior to activating normal system operations of the electronic device.

52. The method of claim 50 further comprising the steps of:
    checking whether the Agent is also found on a hard disk within the electronic device; and
    copying the Agent to the hard disk prior to loading and running the Agent.

53. The method of claim 44 wherein a first component of the Agent is provided in a first device component and a second component of the Agent is provided in a second device component.

54. The method of claim 53 wherein the first component of the Agent includes a secure protocol component of the Agent which communicates with the electronic device's operating system.

55. The method of claim 54 wherein the Agent immediately establishes the communication link with the host system to transmit the identifying indicia of the electronic device if the secure protocol component fails to establish communication with the operating system.

56. The method of claim 53 wherein the second device component includes a hard disk drive.

57. An apparatus within an electronic device including an agent for initiating communication with a host monitoring system and providing identifying indicia to a host monitoring system, said electronic device connectable to said host monitoring system through a global network, said apparatus comprising:
    means for automatically providing said host monitoring system with said identifying indicia through said global network for determining the identity of said electronic device;
    means for providing said host monitoring system with one or more global network communication links used to enable transmission between said electronic device and said host monitoring system; and
    means for assisting the host monitoring system to determine the location of said electronic device by tracing said communication links.

58. The apparatus of claim 57 wherein said electronic device is further connected to said host monitoring system through a cablevision network, and said apparatus further includes means for providing said identifying indicia to said host monitoring system through said cablevision network, and means for determining the location of said electronic device by tracing the source of said identifying indicia within said cablevision network.

59. The apparatus of claim 57 wherein said electronic device is further connected to said host monitoring system through a wireless radio frequency network, and said apparatus further includes mean, for providing said identifying indicia to said host monitoring system through said wireless radio frequency network, and means for determining the location of said electronic device by tracing the source of said identifying indicia within said wireless radio frequency network.

60. The apparatus of claim 57 wherein said electronic device is further connected to said host monitoring system through a wireless microwave network, and said apparatus further includes means for providing said identifying indicia to said host monitoring system through said wireless microwave network, and means for determining the location of said electronic device by tracing the source of said identifying indicia within said wireless microwave network.

61. The apparatus of claim 57 wherein said electronic device is a computer having a hard drive.

62. The apparatus of claim 57 wherein said agent evades detection by operating without interfering with the normal operation of said electronic device.

63. The apparatus of claim 57 wherein said means for providing said host monitoring system with said identifying indicia operates automatically and without user intervention.

64. The apparatus of claim 62 wherein said means for providing said host monitoring system with said identifying indicia for said electronic device occurs without causing audible or visible signals to be emitted from said electronic device.

65. The apparatus of claim 57 wherein said global network is the Internet.

66. The apparatus of claim 65 wherein said agent is provided with deflection means for evading detection and resisting disablement.

67. The apparatus of claim 66 wherein said deflection means deflect read and write attempts to the location on said hard drive where said agent is disposed.

68. The apparatus of claim 65 wherein said identifying indicia is encoded within a domain name service query.

69. The apparatus of claim 68 wherein said host monitoring system includes means for decoding said identifying indicia to determine the identity of said electronic device.

70. The apparatus of claim 65 wherein said means for providing said host monitoring system with said one or more global network communication links is accomplished using a traceroute routine.

71. The apparatus of claim 65 wherein said Internet connection between said electronic device and said host monitoring system is provided through a link to a private network connection to the Internet.

72. The apparatus of claim 69 wherein said link to a private network connection to the Internet is a wireless link.

73. The apparatus of claim 65 wherein said Internet connection between said electronic device and said host monitoring system is provided through a telephone line connected to an Internet provider.

74. The apparatus of claim 65 further including means for assigning said identifying indicia to said agent wherein said identifying indicia comprises a unique electronic serial number, said electronic serial number for enabling the determination of the identity of said electronic device associated with said agent.

75. The apparatus of claim 57 wherein said electronic device is further connected to said host monitoring system through a telephone network, and said apparatus further includes means for providing said identifying indicia to said host monitoring system through said telephone network, and means for determining the location of said electronic device by tracing the source of said identifying indicia within said telephone network.

76. The apparatus of claim 75 wherein said means for providing said host monitoring system with said identifying indicia through said global network, and said means for providing said identifying indicia to said host monitoring system through said telephone network operate at predetermined intervals.

77. The apparatus of claim 75 wherein said electronic device is lost or stolen.

78. The apparatus of claim 75 further including means for providing a list of lost or stolen electronic devices to said host monitoring system and means for comparing said list of lost or stolen electronic devices with said identifying indicia to determine if said electronic device is lost or stolen.

79. The apparatus of claim 78 wherein said host monitoring system includes means for sending a signal through the Internet to said electronic device if it is determined to be lost or stolen, indicating that said lost or stolen electronic device should initiate said traceroute routine.

80. The apparatus of claim 78 wherein said host monitoring system includes means for sending a signal through the Internet to said electronic device if it is determined to be lost or stolen indicating that said lost or stolen electronic device should initiate a call to said host monitoring system through said telephone network.

81. The apparatus of claim 57 wherein the Agent is encoded in one or more forms, including software, firmware and hardware.

82. The apparatus of claim 81 wherein the Agent is encoded in one or more device components in the electronic device, including internal non-volatile memory device, communication device, processor, digital signal processor, integrated circuit and hardware circuit.

83. The apparatus of claim 82 wherein the internal non-volatile memory device includes one of ROM BIOS, ROM, EPROM, EEPROM and Flash ROM.

84. The apparatus of claim 83 wherein the communication device is a modem.

85. The apparatus of claim 84 wherein the Agent comprises a command function which initializes communication with the host system and a call management function which interfaces with the host system.

86. The apparatus of claim 82 wherein the Agent is configured to establish communication with the host system independent of normal operations of the electronic device.

87. The apparatus of claim 83 wherein the Agent is configured to be activated independent of normal system operations of the electronic device.

88. The apparatus of claim 87 wherein the Agent is configured to be activated prior to normal system operations of the electronic device.

89. The apparatus of claim 87 wherein the Agent is configured to be loaded into an internal volatile memory and executed prior to activating normal system operations of the electronic device.

90. The apparatus of claim 88 wherein the Agent is further configured to check whether the Agent is also found on a hard disk within the electronic device and copying the Agent to the hard disk prior to loading and running the Agent.

91. The apparatus of claim 82 wherein a first component of the Agent is provided in a first device component and a second component of the Agent is provided in a second device component.

92. The apparatus of claim 91 wherein the first component of the Agent includes a secure protocol component of the Agent which communicates with the electronic device's operating system.

93. The apparatus of claim 92 wherein. the Agent is configured to immediately establish the communication link with the host system to transmit the identifying indicia of the electronic device if the secure protocol component fails to establish communication with the operating system.

94. The apparatus of claim 91 wherein the second internal memory device is a hard disk drive.

* * * * *

UNITED STATES PATENT AND TRADEMARK OFFICE
CERTIFICATE OF CORRECTION

PATENT NO. : 6,300,863 B1  
DATED : October 9, 2001  
INVENTOR(S) : Cotichini et al.

It is certified that error appears in the above-identified patent and that said Letters Patent is hereby corrected as shown below:

Column 13,
Line 1, after "ports" insert -- to --.

Column 34,
Line 9, "i" should read -- is --.
Line 40, after "drive" insert -- , and wherein the method further comprises the step of loading said agent within said computer --.
Line 47, "1" should read -- 18 --.

Column 35,
Line 60, after "claim" delete "7 or".

Column 37,
Line 10, "means," should read -- means --.
Line 38, "is" should read -- includes --.
Lines 54 and 60, "said Internet connection" should read -- communication --.
Line 58, "69" should read -- 71 --.

Column 38,
Line 26, after "78" insert -- wherein said global network include the Internet and --.

Signed and Sealed this

Second Day of September, 2003

JAMES E. ROGAN
*Director of the United States Patent and Trademark Office*

US006300863C1

(12) EX PARTE REEXAMINATION CERTIFICATE (8747th)

United States Patent
Cotichini et al.

(10) Number: US 6,300,863 C1
(45) Certificate Issued: *Dec. 13, 2011

(54) METHOD AND APPARATUS TO MONITOR AND LOCATE AN ELECTRONIC DEVICE USING A SECURED INTELLIGENT AGENT VIA A GLOBAL NETWORK

(75) Inventors: Christian Cotichini, Vancouver (CA); Fraser Cain, Vancouver (CA); David G. Ashworth, North Vancouver (CA); Peter Michael Bruce Livingston, Pitt Meadows (CA); Gabor Solymar, Stittsville (CA)

(73) Assignee: Absolute Software Corporation, Vancouver, BC (CA)

Reexamination Request:
No. 90/011,323, Dec. 23, 2010

Reexamination Certificate for:
Patent No.: 6,300,863
Issued: Oct. 9, 2001
Appl. No.: 09/047,030
Filed: Mar. 24, 1998

( * ) Notice: This patent is subject to a terminal disclaimer.

Certificate of Correction issued Sep. 2, 2003.

Related U.S. Application Data

(63) Continuation-in-part of application No. 08/826,098, filed on Mar. 24, 1997, now Pat. No. 6,244,758, which is a continuation-in-part of application No. 08/558,432, filed on Nov. 15, 1995, now Pat. No. 5,764,892, which is a continuation-in-part of application No. 08/339,978, filed on Nov. 15, 1994, now Pat. No. 5,715,174, said application No. 09/047,030, filed on Mar. 24, 1998, is a continuation-in-part of application No. 08/871,221, filed on Jun. 9, 1997.

(51) Int. Cl.
G06F 11/00 (2006.01)
G06F 1/00 (2006.01)
G06F 21/00 (2006.01)
H04L 12/24 (2006.01)
H04L 12/26 (2006.01)
H04Q 7/32 (2006.01)

(52) U.S. Cl. .................. 340/5.8; 340/10.42; 340/426.19; 340/426.28; 340/539.1; 340/539.13; 709/200; 709/217; 709/219; 714/45

(58) Field of Classification Search .................... 340/5.8
See application file for complete search history.

(56) References Cited

To view the complete listing of prior art documents cited during the proceeding for Reexamination Control Number 90/011,323, please refer to the USPTO's public Patent Application Information Retrieval (PAIR) system under the Display References tab.

Primary Examiner—Minh Dieu Nguyen

(57) ABSTRACT

A system for locating and monitoring electronic devices utilizing a security system that is secretly and transparently embedded within the software, firmware, or hardware of a computer. This security system initiates the client computer to periodically and conditionally call a host system to provide unique identifying indicia and location information. In one embodiment, the security system calls the host through a public switched telephone network (PSTN) and transmits the indicia in encoded form. In an alternative embodiment, which may be incorporated concurrently with the PSTN application, the security system calls the host system through the Internet and provides the host with indicia encoded within the DNS query sent. The host system is able to identify the calling computer from the indicia and is able to physically locate the computer through either caller identification or by referencing the Internet links which were used to connect the calling computer with the host system.

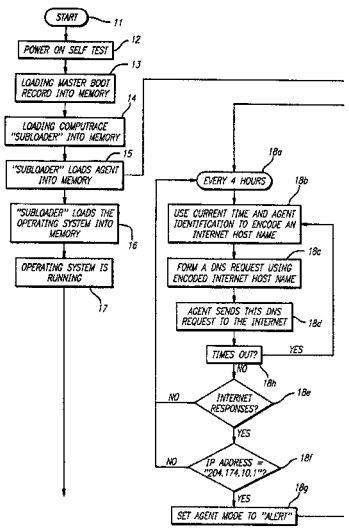

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-94 are cancelled.

* * * * *

US006300863C1

(12) EX PARTE REEXAMINATION CERTIFICATE (10215th)

United States Patent
Cotichini et al.

(10) Number: US 6,300,863 C1
(45) Certificate Issued: *Jun. 30, 2014

(54) METHOD AND APPARATUS TO MONITOR AND LOCATE AN ELECTRONIC DEVICE USING A SECURED INTELLIGENT AGENT VIA A GLOBAL NETWORK

(75) Inventors: Christian Cotichini, Vancouver (CA); Fraser Cain, Vancouver (CA); David G. Ashworth, North Vancouver (CA); Peter Michael Bruce Livingston, Pitt Meadows (CA); Gabor Solymar, Stittsville (CA)

(73) Assignee: Absolute Software Corporation, Vancuver, British Columbia (CA)

Reexamination Request:
No. 90/011,323, Dec. 23, 2010

Reexamination Certificate for:
Patent No.: 6,300,863
Issued: Oct. 9, 2001
Appl. No.: 09/047,030
Filed: Mar. 24, 1998

Certificate of Correction issued Sep. 2, 2003

(*) Notice: This patent is subject to a terminal disclaimer.

Related U.S. Application Data

(63) Continuation-in-part of application No. 08/826,098, filed on Mar. 24, 1997, now Pat. No. 6,244,758, which is a continuation-in-part of application No. 08/558,432, filed on Nov. 15, 1995, now Pat. No. 5,764,892, which is a continuation-in-part of application No. 08/339,978, filed on Nov. 15, 1994, now Pat. No. 5,715,174, said application No. 09/047,030 is a continuation-in-part of application No. 08/871,221, filed on Jun. 9, 1997.

(51) Int. Cl.
G06F 11/00 (2006.01)
G06F 1/00 (2006.01)
G06F 21/00 (2013.01)
H04L 12/26 (2006.01)
H04L 12/24 (2006.01)
H04Q 7/32 (2006.01)

(52) U.S. Cl.
USPC ............ 340/5.8; 340/10.42; 340/426.19; 340/426.28; 340/539.1; 340/539.13; 709/200; 709/217; 709/219; 714/45; 714/E11.019

(58) Field of Classification Search
None
See application file for complete search history.

(56) References Cited

To view the complete listing of prior art documents cited during the proceeding for Reexamination Control Number 90/011,323, please refer to the USPTO's public Patent Application Information Retrieval (PAIR) system under the Display References tab.

*Primary Examiner* — Minh Dieu Nguyen

(57) ABSTRACT

A system for locating and monitoring electronic devices utilizing a security system that is secretly and transparently embedded within the software, firmware, or hardware of a computer. This security system initiates the client computer to periodically and conditionally call a host system to provide unique identifying indicia and location information. In one embodiment, the security system calls the host through a public switched telephone network (PSTN) and transmits the indicia in encoded form. In an alternative embodiment, which may be incorporated concurrently with the PSTN application, the security system calls the host system through the Internet and provides the host with indicia encoded within the DNS query sent. The host system is able to identify the calling computer from the indicia and is able to physically locate the computer through either caller identification or by referencing the Internet links which were used to connect the calling computer with the host system.

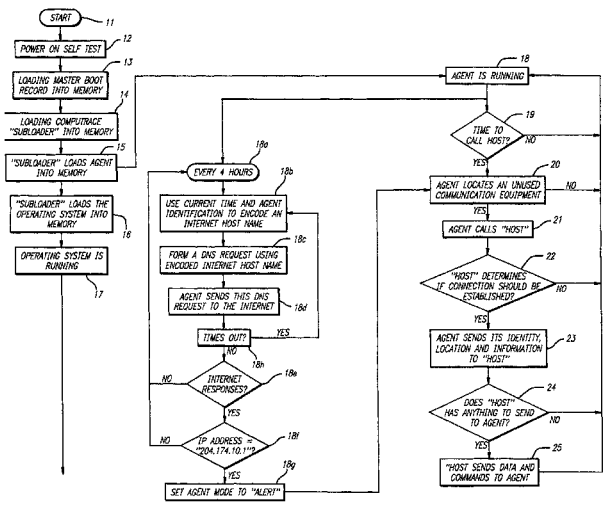

US 6,300,863 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-11, 15-17, 31, 33-35, 43-48 and 57-94 are cancelled.

Claims 12, 18, 21-23, 26-30, 32, 36-37 and 53 are determined to be patentable as amended.

Claims 13-14, 19-20, 24-25, 38-42, 49-52 and 54-56, dependent on an amended claim, are determined to be patentable.

New claims 95-118 are added and determined to be patentable.

12. [The method of claim 2 further including the step of] *A method for tracing an electronic device having an agent initiating communication and providing identifying indicia to a host system, said electronic device connectable to said host system through a global network, said method comprising the steps of:*
*automatically providing said host system with said identifying indicia through said global network for determining the identity of said electronic device;*
*providing said host system with one or more global network communication links used to enable transmission between said electronic device and said host system, said transmission via said communication links used for determining the location of said electronic device,* wherein said global network includes Internet; and
providing a list of lost or stolen electronic devices to said host system and comparing said list of lost or stolen electronic devices with said identifying indicia to determine if said electronic device is lost or stolen.

18. [The method of claim 17 further including the step of] *A method for tracing an electronic device having an agent initiating communication and providing identifying indicia to a host system, said electronic device connectable to said host system through a global network, said method comprising the steps of:*
*automatically providing said host system with said identifying indicia through said global network for determining the identity of said electronic device;*
*providing said host system with one or more global network communication links used to enable transmission between said electronic device and said host system, said transmission via said communication links used for determining the location of said electronic device;*
*wherein said electronic device is a computer having a hard drive, and wherein the method further comprises the step of loading said agent within said computer; and*
providing said agent with deflection means to enable said agent to resist disablement attempts and evade detection.

21. [The method of claim 17] *A method for tracing an electronic device having an agent initiating communication and providing identifying indicia to a host system, said electronic device connectable to said host system through a global network, said method comprising the steps of:*
*automatically providing said host system with said identifying indicia through said global network for determining the identity of said electronic device;*
*providing said host system with one or more global network communication links used to enable transmission between said electronic device and said host system, said transmission via said communication links used for determining the location of said electronic device; and*
*wherein said electronic device is a computer having a hard drive, and wherein the method further comprises the step of loading said agent within said computer, and*
wherein said step of loading said agent within said computer is accomplished by loading said agent within the boot sector of said hard drive.

22. [The method of claim 17] *A method for tracing an electronic device having an agent initiating communication and providing identifying indicia to a host system, said electronic device connectable to said host system through a global network, said method comprising the steps of:*
*automatically providing said host system with said identifying indicia through said global network for determining the identity of said electronic device;*
*providing said host system with one or more global network communication links used to enable transmission between said electronic device and said host system, said transmission via said communication links used for determining the location of said electronic device; and*
*wherein said electronic device is a computer having a hard drive, and wherein the method further comprises the step of loading said agent within said computer, and*
wherein said step of loading said agent within said computer is accomplished by loading said agent within the partition sector of said hard drive.

23. [The method of claim 17] *A method for tracing an electronic device having an agent initiating communication and providing identifying indicia to a host system, said electronic device connectable to said host system through a global network, said method comprising the steps of:*
*automatically providing said host system with said identifying indicia through said global network for determining the identity of said electronic device;*
*providing said host system with one or more global network communication links used to enable transmission between said electronic device and said host system, said transmission via said communication links used for determining the location of said electronic device; and*
*wherein said electronic device is a computer having a hard drive, and wherein the method further comprises the step of loading said agent within said computer, and*
wherein said step of loading said agent within said computer is accomplished by loading said agent within an operating system file on said hard drive.

26. [The method of claim 17] *A method for tracing an electronic device having an agent initiating communication and providing identifying indicia to a host system, said electronic device connectable to said host system through a global network, said method comprising the steps of:*
*automatically providing said host system with said identifying indicia through said global network for determining the identity of said electronic device;*
*providing said host system with one or more global network communication links used to enable transmission between said electronic device and said host system, said transmission via said communication links used for determining the location of said electronic device; and* wherein said electronic device is a computer having a hard drive, and wherein the method further comprises the step of loading said agent within said computer, and wherein said step of loading said agent within said computer is accomplished by loading said agent on the ROM BIOS.

27. [The method of claim 17] *A method for tracing an electronic device having an agent initiating communication and providing identifying indicia to a host system, said electronic device connectable to said host system through a global network, said method comprising the steps of:*

*automatically providing said host system with said identifying indicia through said global network for determining the identity of said electronic device;*

*providing said host system with one or more global network communication links used to enable transmission between said electronic device and said host system, said transmission via said communication links used for determining the location of said electronic device; and*

*wherein said electronic device is a computer having a hard drive, and wherein the method further comprises the step of loading said agent within said computer, and* wherein said agent is a terminated and stay resident program.

28. [The method of claim 17] *A method for tracing an electronic device having an agent initiating communication and providing identifying indicia to a host system, said electronic device connectable to said host system through a global network, said method comprising the steps of:*

*automatically providing said host system with said identifying indicia through said global network for determining the identity of said electronic device;*

*providing said host system with one or more global network communication links used to enable transmission between said electronic device and said host system, said transmission via said communication links used for determining the location of said electronic device; and*

*wherein said electronic device is a computer having a hard drive, and wherein the method further comprises the step of loading said agent within said computer, and* wherein said agent is a virtual device driver program.

29. [The method of claim 17] *A method for tracing an electronic device having an agent initiating communication and providing identifying indicia to a host system, said electronic device connectable to said host system through a global network, said method comprising the steps of:*

*automatically providing said host system with said identifying indicia through said global network for determining the identity of said electronic device;*

*providing said host system with one or more global network communication links used to enable transmission between said electronic device and said host system, said transmission via said communication links used for determining the location of said electronic device; and*

*wherein said electronic device is a computer having a hard drive, and wherein the method further comprises the step of loading said agent within said computer, and* wherein said agent is an application program.

30. [The method of claim 17] *A method for tracing an electronic device having an agent initiating communication and providing identifying indicia to a host system, said electronic device connectable to said host system through a global network, said method comprising the steps of:*

*automatically providing said host system with said identifying indicia through said global network for determining the identity of said electronic device;*

*providing said host system with one or more global network communication links used to enable transmission between said electronic device and said host system, said transmission via said communication links used for determining the location of said electronic device; and*

*wherein said electronic device is a computer having a hard drive, and wherein the method further comprises the step of loading said agent within said computer, and* wherein said agent is a file filter program.

32. [The method of claim 31] *A method for tracing an electronic device having an agent initiating communication and providing identifying indicia to a host system, said electronic device connectable to said host system through a global network, said method comprising the steps of:*

*automatically providing said host system with said identifying indicia through said global network for determining the identity of said electronic device;*

*providing said host system with one or more global network communication links used to enable transmission between said electronic device and said host system, said transmission via said communication links used for determining the location of said electronic device;*

*wherein said agent provides said identifying indicia automatically and without user intervention, and* wherein said step of providing said host system with said identifying indicia occurs without causing audible or visible signals to be emitted from said electronic device.

36. [The method of claim 1 further comprising the step of] *A method for tracing an electronic device having an agent initiating communication and providing identifying indicia to a host system, said electronic device connectable to said host system through a global network, said method comprising the steps of:*

*automatically providing said host system with said identifying indicia through said global network for determining the identity of said electronic device;*

*providing said host system with one or more global network communication links used to enable transmission between said electronic device and said host system, said transmission via said communication links used for determining the location of said electronic device; and* loading said agent within said electronic device for *communication* with said host system such that said agent evades detection.

37. A method for monitoring an electronic device connectable to a host system through a global network, said electronic device having an agent, said agent providing identifying indicia for determining the identity of said electronic device, said method comprising the steps of:

loading said agent within said *electronic* device *after starting up an operating system of the electronic device when needed for proper operation of the agent* such that said agent evades detection; and automatically providing said host system with said identifying indicia through said network without causing audible or visual signals to be emitted from said electronic device.

53. [The method of claim 44] *A method for tracing an electronic device having an Agent initiating communication and providing identifying indicia to a host system, said electronic device connectable to said host system through a global network, said method comprising the steps of:*

*automatically providing said host system with said identifying indicia through said global network for determining the identity of said electronic device; and*

*providing said host system with one or more global network communication links used to enable transmission* between said electronic device and said host system, said transmission via said communication links used for determining the location of said electronic device, wherein the Agent is encoded in one or more forms, including software, firmware and hardware, wherein the Agent is encoded in one or more device components in the electronic device, including internal nonvolatile memory device, communication device, processor, digital signal processor, integrated circuit and hardware circuit, and wherein a first component of the Agent is provided in a first device component and a second component of the Agent is provided in a second device component.

95. A method for tracing an electronic device having an agent initiating communication and providing identifying indicia to a host system, said electronic device connectable to said host system through a global network, said method comprising the steps of:

automatically providing said host system with said identifying indicia through said global network for determining the identity of said electronic device;

providing said host system with one or more global network communication links used to enable transmission between said electronic device and said host system, said transmission via said communication links used for determining the location of said electronic device; and determining whether the electronic device is lost or stolen.

96. A method for tracing an electronic device having an agent initiating communication and providing identifying indicia to a host system, said electronic device connectable to said host system through a global network, said method comprising the steps of:

automatically providing said host system with said identifying indicia through said global network for determining the identity of said electronic device;

providing said host system with one or more global network communication links used to enable transmission between said electronic device and said host system, said transmission via said communication links used for determining the location of said electronic device; and determining whether the electronic device is lost or stolen based on said transmission.

97. The method of claim 95 or 96, further comprising notifying one or more appropriate parties of the status of the electronic device.

98. The method of claim 97, wherein the appropriate parties include an owner or end user of the electronic device, who is notified via an electronic mail.

99. The method of claim 97, further comprising determining the location of said electronic device when lost or stolen.

100. The method of claim 99, further comprising using said transmission via said communication links to determine the location of said electronic device.

101. A method for tracing an electronic device having an agent initiating communication and providing identifying indicia to a host system, said electronic device connectable to said host system through a global network, said method comprising the steps of:

automatically providing said host system with said identifying indicia through said global network for determining the identity of said electronic device; and providing said host system with one or more global network communication links used to enable transmission between said electronic device and said host system, said transmission via said communication links used for determining the location of said electronic device, wherein said global network includes Internet, wherein said one or more global network communication links include an IP address, and wherein said IP address is the IP address of a router between the electronic device and the host system.

102. A method for tracing an electronic device having an agent initiating communication and providing identifying indicia to a host system, said electronic device connectable to said host system through a global network, said method comprising the steps of:

automatically providing said host system with said identifying indicia through said global network for determining the identity of said electronic device; and providing said host system with one or more global network communication links used to enable transmission between said electronic device and said host system, said transmission via said communication links used for determining the location of said electronic device, wherein said global network includes Internet, wherein said one or more global network communication links include an IP address, and wherein said IP address is unique.

103. A method for tracing an electronic device having an agent initiating communication and providing identifying indicia to a host system, said electronic device connectable to said host system through a global network, said method comprising the steps of:

automatically providing said host system with said identifying indicia through said global network for determining the identity of said electronic device; and providing said host system with one or more global network communication links used to enable transmission between said electronic device and said host system, said transmission via said communication links used for determining the location of said electronic device, wherein said global network includes Internet, wherein said one or more global network communication links include an IP address, and wherein the IP address is not unique or wherein at least one of the global network communication links includes a proxy server, the method further comprising:

determining one or more additional IP addresses used to enable the transmission between the electronic device and the host system; and using said one or more additional IP addresses for determining the location of the electronic device therefrom.

104. The method of claim 103, wherein using said one or more additional IP addresses for determining the location of the electronic device further comprises determining the IP address of the electronic device.

105. The method of claim 103, wherein the global network communication links include a proxy server, and using said one or more additional IP addresses for determining the location of the electronic device further comprises comparing log data from the proxy server to determine the location of the electronic device.

106. A method for tracing an electronic device having an agent initiating communication and providing identifying indicia to a host system, said electronic device connectable to said host system through a global network, said method comprising the steps of:

automatically providing said host system with said identifying indicia through said global network for determining the identity of said electronic device;

providing said host system with one or more global network communication links used to enable transmission between said electronic device and said host system, said transmission via said communication links used for determining the location of said electronic device; and
sending a signal from the host to the agent after the agent initiated communications with the host,
wherein the signal comprises a command from the host to configure at least a parameter or function of the agent beyond updating a communication address of the host.

107. A method for tracing an electronic device having an agent initiating communication and providing identifying indicia to a host system, said electronic device connectable to said host system through a global network, said method comprising the steps of:
automatically providing said host system with said identifying indicia through said global network for determining the identity of said electronic device; and
providing said host system with one or more global network communication links used to enable transmission between said electronic device and said host system, said transmission via said communication links used for determining the location of said electronic device;
loading the agent in non-volatile memory; and
executing the agent from the non-volatile memory when necessary to prevent interference with the operation of the agent.

108. A method for tracing an electronic device having an agent initiating communication and providing identifying indicia to a host system, said electronic device connectable to said host system through a global network, said method comprising the steps of:
automatically providing said host system with said identifying indicia through said global network for determining the identity of said electronic device;
providing said host system with one or more global network communication links used to enable transmission between said electronic device and said host system, said transmission via said communication links used for determining the location of said electronic device; and
loading at least a portion of the agent in non-volatile memory so that the at least a portion of the agent can be copied into volatile memory when needed enable determining the location of the electronic device.

109. A method for tracing an electronic device having an agent initiating communication and providing identifying indicia to a host system, said electronic device connectable to said host system through a global network, said method comprising the steps of:
automatically providing said host system with said identifying indicia through said global network for determining the identity of said electronic device;
providing said host system with one or more global network communication links used to enable transmission between said electronic device and said host system, said transmission via said communication links used for determining the location of said electronic device;
determining if the agent is in communication with an operating system of the electronic device; and,
if not, initiating communication between the agent and the host system.

110. A method for tracing an electronic device having an agent initiating communication and providing identifying indicia to a host system, said electronic device connectable to said host system through a global network, said method comprising the steps of:
automatically providing said host system with said identifying indicia through said global network for determining the identity of said electronic device;
providing said host system with one or more global network communication links used to enable transmission between said electronic device and said host system, said transmission via said communication links used for determining the location of said electronic device, wherein said one or more global network communication links includes a MAC address; and
determining the location of said electronic device, wherein the identifying indicia includes said MAC address.

111. The method of claim 110, further comprising determining the source of said transmission via said MAC address.

112. The method of claim 111, wherein determining the source of said transmission further comprises determining the location of said MAC address.

113. The method of claim 110, wherein said MAC address is a MAC address of the electronic device to be traced.

114. The method of claim 110, wherein said MAC address is a MAC address of a router used to enable said transmission between the electronic device to be traced and the host system.

115. The method of 95, further comprising:
communicating by the agent with a web server; and
executing by the agent commands received from the web server to search for, upload and/or delete files on the electronic device at the direction of an authorized user.

116. A method for tracing an electronic device having an agent initiating communication and providing identifying indicia to a host system, said electronic device connectable to said host system through a global network, said method comprising the steps of:
automatically providing said host system with said identifying indicia through said global network for determining the identity of said electronic device; and
providing said host system with one or more global network communication links used to enable transmission between said electronic device and said host system, said transmission via said communication links used for determining the location of said electronic device,
wherein said one or more global network communication links includes a MAC address, and
wherein said MAC address is a MAC address of the electronic device to be traced.

117. A method for tracing an electronic device having an agent initiating communication and providing identifying indicia to a host system, said electronic device connectable to said host system through a global network, said method comprising the steps of:
automatically providing said host system with said identifying indicia through said global network for determining the identity of said electronic device; and
providing said host system with one or more global network communication links used to enable transmission between said electronic device and said host system, said transmission via said communication links used for determining the location of said electronic device,
wherein said one or more global network communication links includes a MAC address, and
wherein said MAC address is a MAC address of a router used to enable said transmission between the electronic device to be traced and the host system.

118. A method for tracing an electronic device having an agent initiating communication and providing identifying indicia to a host system, said electronic device connectable to said host system through a global network, said method comprising the steps of:

*automatically providing said host system with said identifying indicia through said global network for determining the identity of said electronic device;*

*providing said host system with one or more global network communication links used to enable transmission between said electronic device and said host system, said transmission via said communication links used for determining the location of said electronic device;*

*communicating by the agent with a web server; and*

*executing by the agent commands received from the web server to search for, upload and/or delete files on the electronic device at the direction of an authorized user.*

\* \* \* \* \*